(12) United States Patent
Zhao et al.

(10) Patent No.: US 11,772,906 B2
(45) Date of Patent: Oct. 3, 2023

(54) CONTROL SYSTEM FOR AUTOMATED SINGULATION SYSTEM

(71) Applicant: Amazon Technologies, Inc., Seattle, WA (US)

(72) Inventors: Longyu Zhao, Seattle, WA (US); Tri Minh Quach, Edgewood, WA (US); Xujie Wang, Edgewood, WA (US); Canaan Seaton, Evansville, IN (US); Joseph Eaton, Indianapolis, IN (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/543,307

(22) Filed: Dec. 6, 2021

(65) Prior Publication Data

US 2022/0089379 A1 Mar. 24, 2022

Related U.S. Application Data

(60) Continuation of application No. 17/026,835, filed on Sep. 21, 2020, now Pat. No. 11,192,726, which is a division of application No. 16/219,655, filed on Dec. 13, 2018, now Pat. No. 10,781,053.

(51) Int. Cl.
*B65G 47/31* (2006.01)
*B65G 47/26* (2006.01)
*B65G 15/24* (2006.01)
*B65G 47/29* (2006.01)

(52) U.S. Cl.
CPC ............. *B65G 47/31* (2013.01); *B65G 15/24* (2013.01); *B65G 47/268* (2013.01); *B65G 47/295* (2013.01); *B65G 2201/025* (2013.01)

(58) Field of Classification Search
None
See application file for complete search history.

(56) References Cited

U.S. PATENT DOCUMENTS

| | | | | |
|---|---|---|---|---|
| 4,227,607 | A | * | 10/1980 | Malavenda ............. B64F 1/368 198/572 |
| 4,527,937 | A | | 7/1985 | Tomasello, Jr. |
| 5,170,877 | A | * | 12/1992 | Francioni ............... B65G 43/08 198/572 |
| 5,170,880 | A | | 12/1992 | Low |
| 5,314,055 | A | | 5/1994 | Gordon |
| 5,423,431 | A | * | 6/1995 | Westin .................. B07C 5/3412 209/539 |
| 5,950,800 | A | | 9/1999 | Terrell et al. |
| 6,199,684 | B1 | | 3/2001 | Huth |

(Continued)

*Primary Examiner* — Kavel Singh
(74) *Attorney, Agent, or Firm* — Eversheds Sutherland (US) LLP

(57) ABSTRACT

A control system for an automated singulation system is provided. The control system detects a presence of a first item on a first conveyor and detects a presence of a second item on a second conveyor while the first item is present on the first conveyor. The second conveyor transfers items onto the first conveyor and is at a lower height than the second conveyor. The first conveyor is oriented perpendicularly with respect to the second conveyor. In response to detecting the presence of the second item, a location of the first item along a length of the first conveyor is determined. The first conveyor and the second conveyor are controlled based at least on the location of the first item.

17 Claims, 46 Drawing Sheets

(56) References Cited

U.S. PATENT DOCUMENTS

| | | | |
|---|---|---|---|
| 6,478,138 B1 | 11/2002 | Edwards et al. | |
| 6,491,154 B2 | 12/2002 | Ydoate et al. | |
| 6,609,607 B2* | 8/2003 | Woltjer | B65G 47/71 |
| | | | 198/457.03 |
| 7,311,191 B2 | 12/2007 | Bahr | |
| 7,360,638 B2 | 4/2008 | Ko et al. | |
| 8,060,243 B2* | 11/2011 | Ogawa | B65G 47/54 |
| | | | 209/552 |
| 8,612,050 B2 | 12/2013 | Lee et al. | |
| 9,038,810 B2 | 5/2015 | Schroader | |
| 9,359,150 B2 | 6/2016 | Jodoin et al. | |
| 9,527,672 B2 | 12/2016 | Batchelder et al. | |
| 9,540,174 B2 | 1/2017 | Josserond et al. | |
| 10,053,299 B1 | 8/2018 | Vadakkanmaruveedu et al. | |
| 10,221,015 B2 | 3/2019 | Battles et al. | |
| 10,239,690 B2 | 3/2019 | Battles et al. | |
| 10,315,859 B1 | 6/2019 | Zhao et al. | |
| 10,486,915 B2 | 11/2019 | Kim | |
| 10,494,179 B1 | 12/2019 | Alspaugh et al. | |
| 10,501,269 B2 | 12/2019 | Walter et al. | |
| 10,647,520 B2 | 5/2020 | Hartmann et al. | |
| 10,773,898 B2 | 9/2020 | Perrot et al. | |
| 10,781,053 B1 | 9/2020 | Zhao et al. | |
| 10,882,703 B2 | 1/2021 | Phillips et al. | |
| 10,961,060 B1 | 3/2021 | Zhao et al. | |
| 11,180,321 B2 | 11/2021 | Naito | |
| 11,192,726 B2 | 12/2021 | Zhao et al. | |
| 11,407,595 B2 | 8/2022 | Green et al. | |
| 11,420,828 B1 | 8/2022 | Cerra et al. | |
| 2009/0152074 A1 | 6/2009 | Wolf | |
| 2017/0362036 A1 | 12/2017 | Hartmann et al. | |
| 2017/0369244 A1 | 12/2017 | Battles et al. | |
| 2021/0155414 A1 | 5/2021 | Zhao et al. | |
| 2021/0323772 A1 | 10/2021 | Henze | |

\* cited by examiner

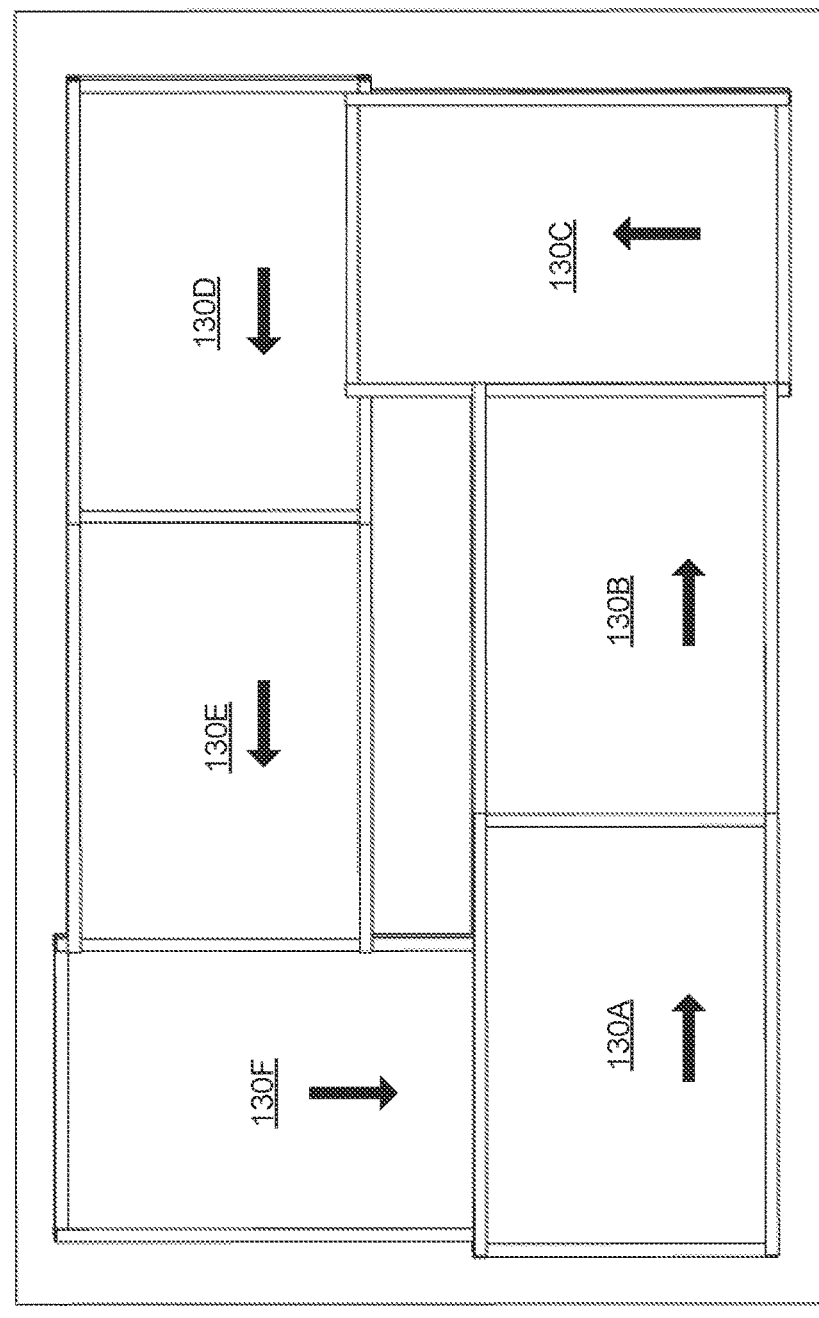

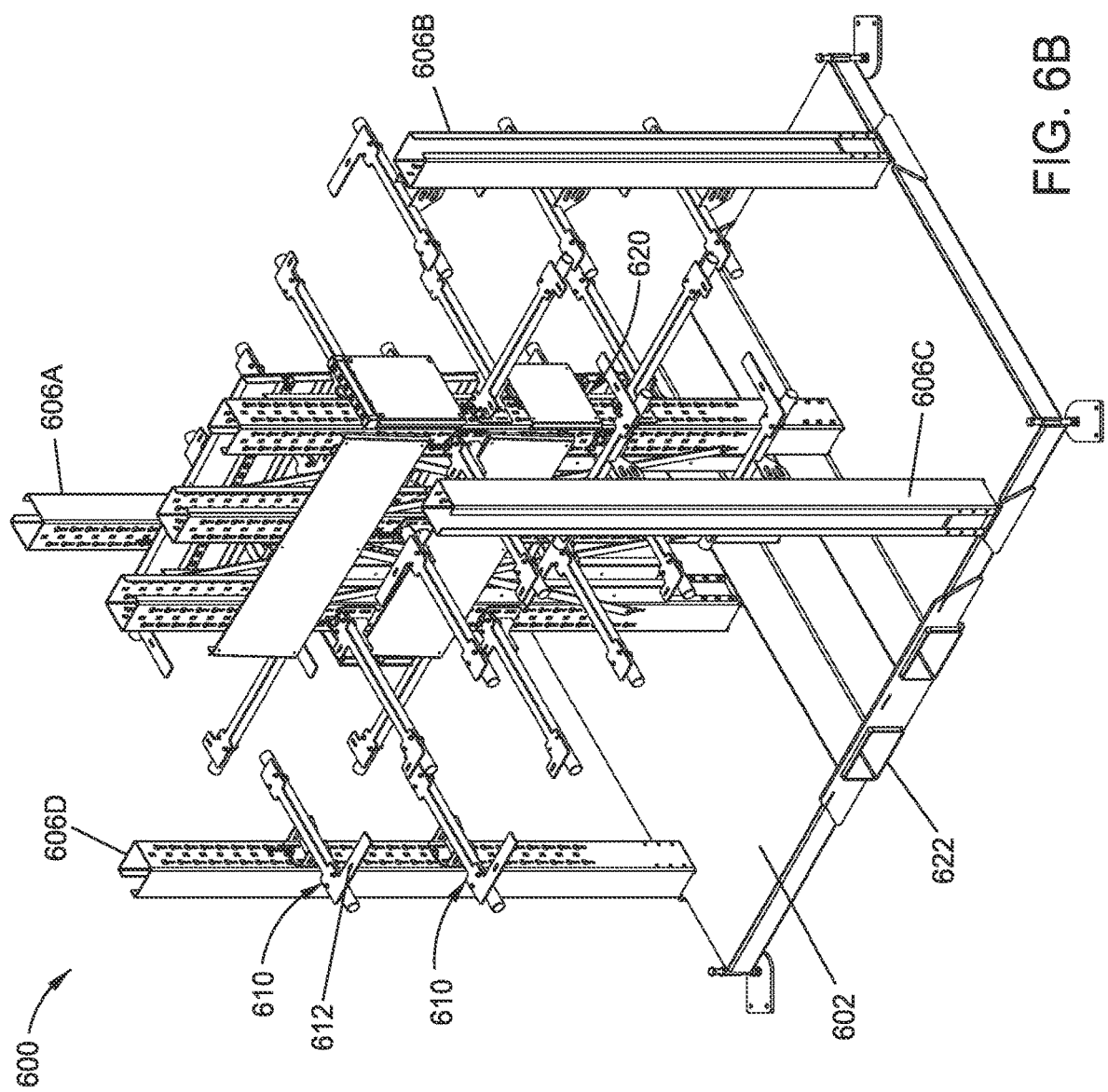

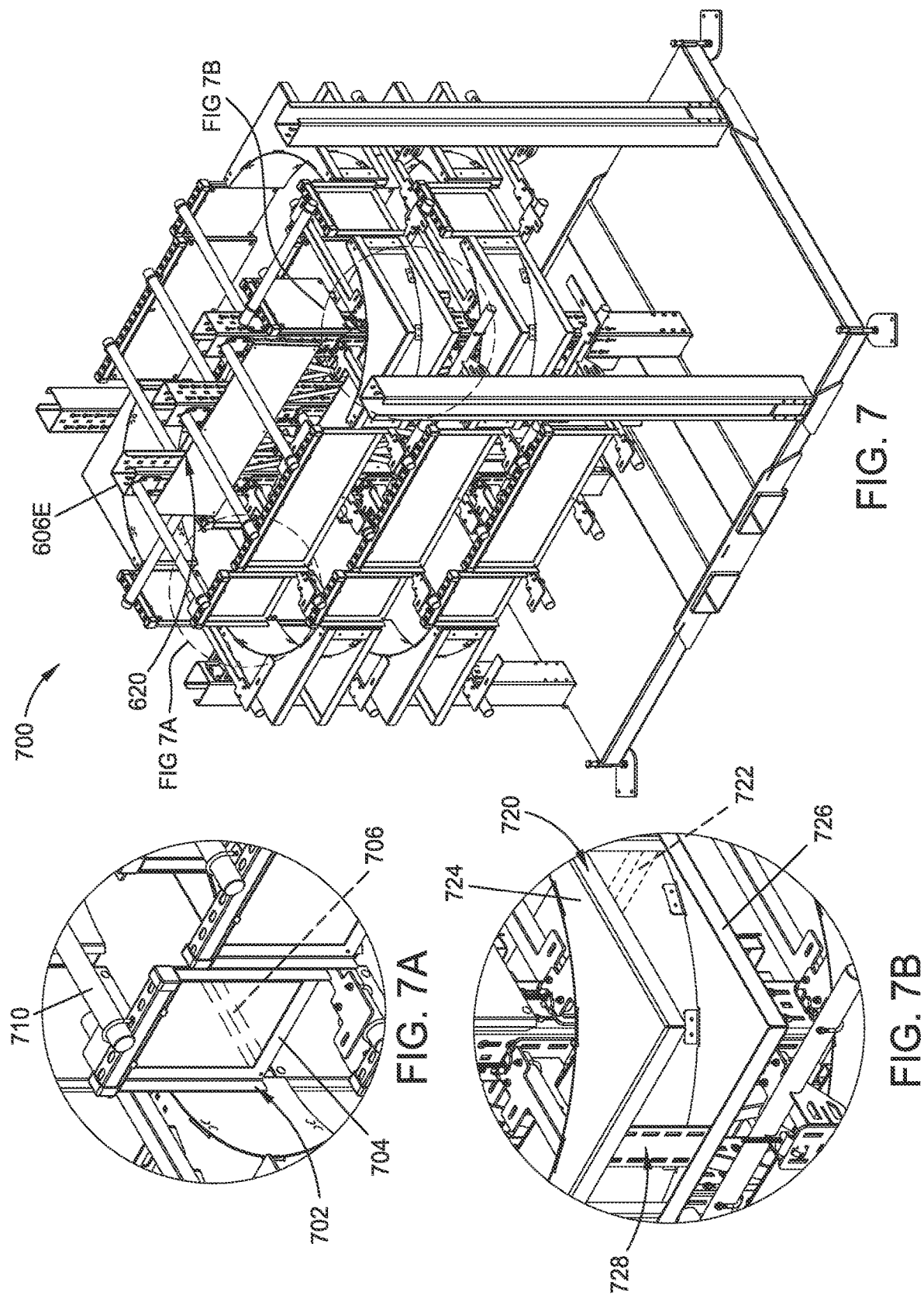

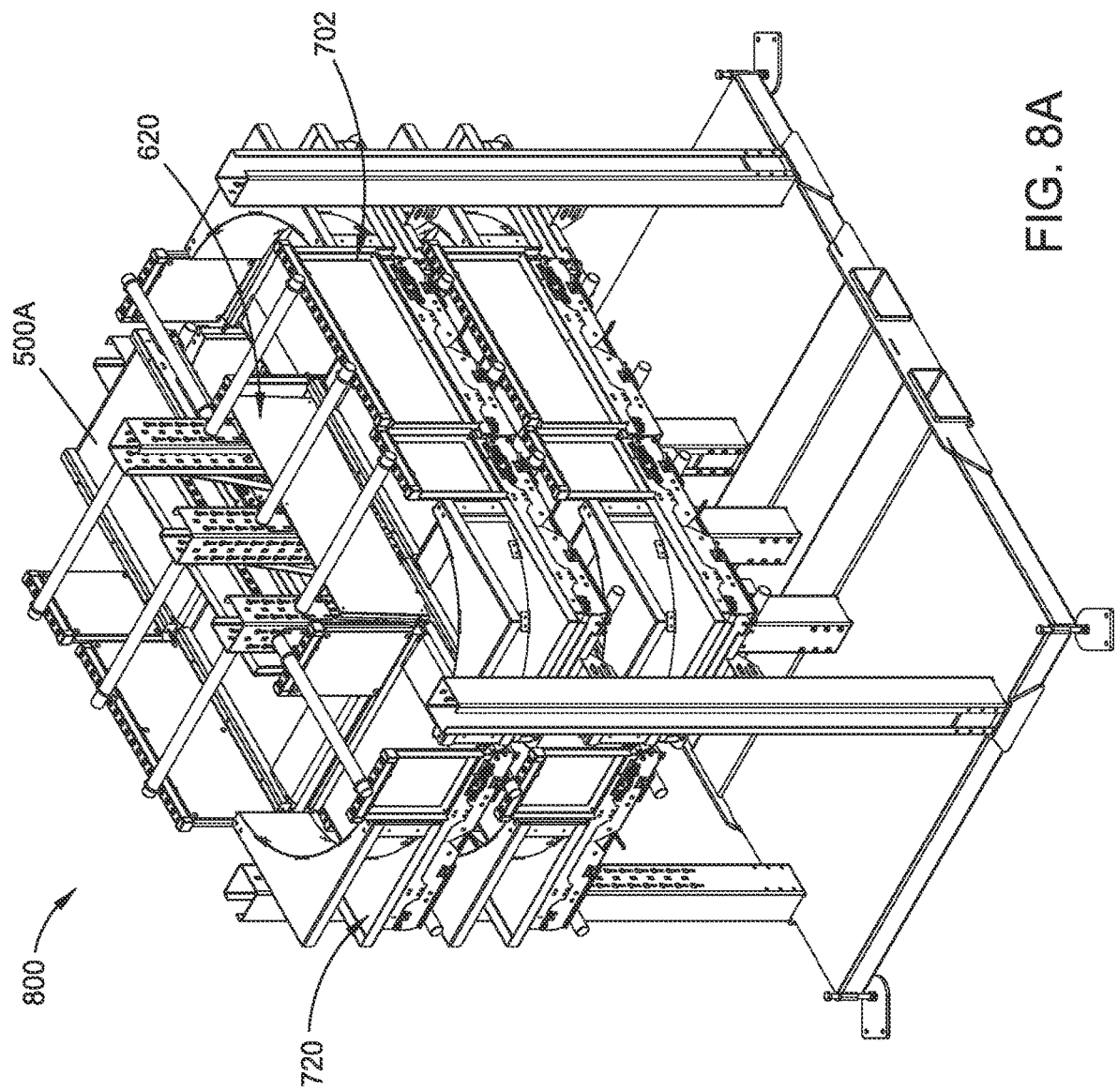

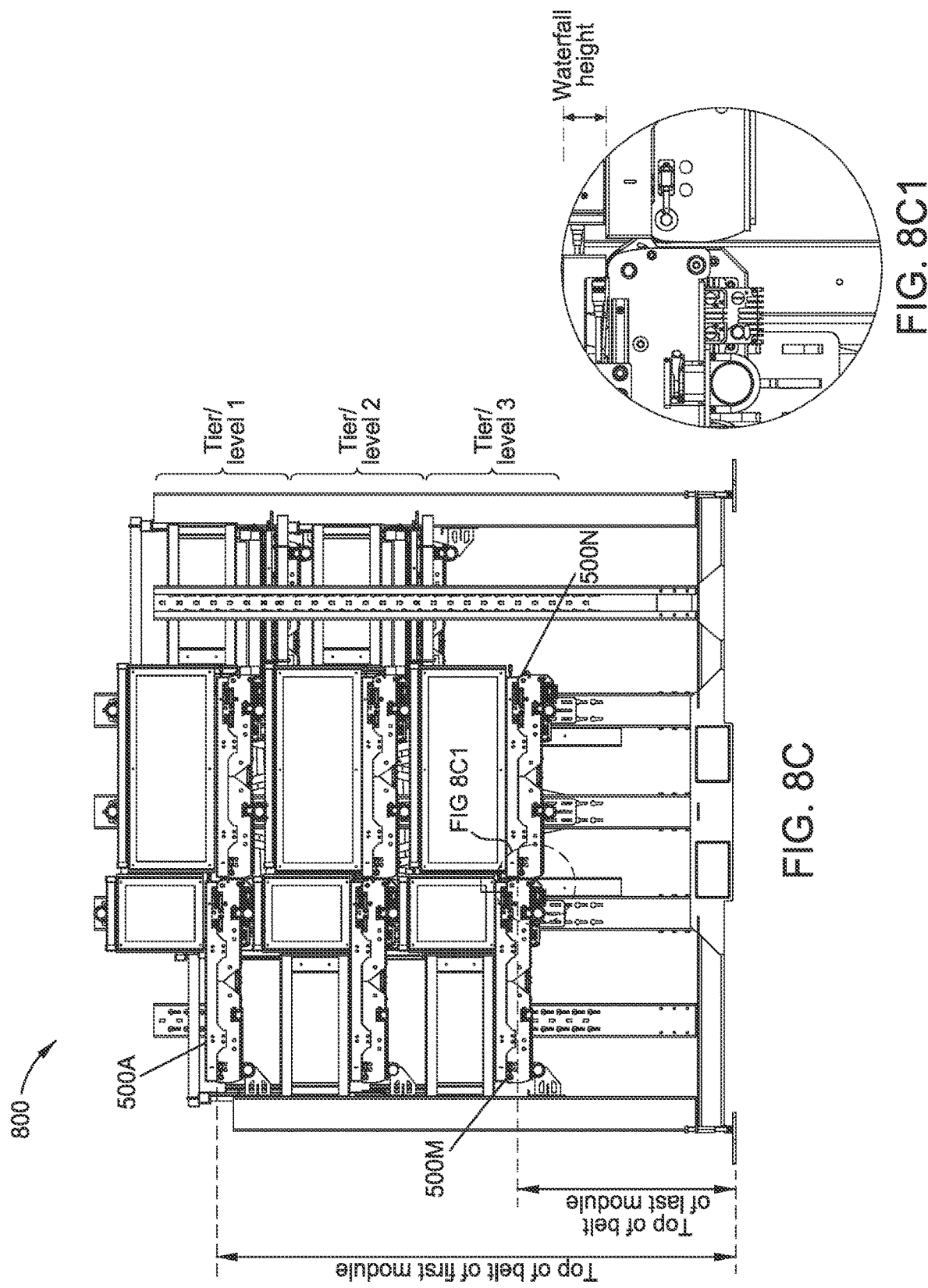

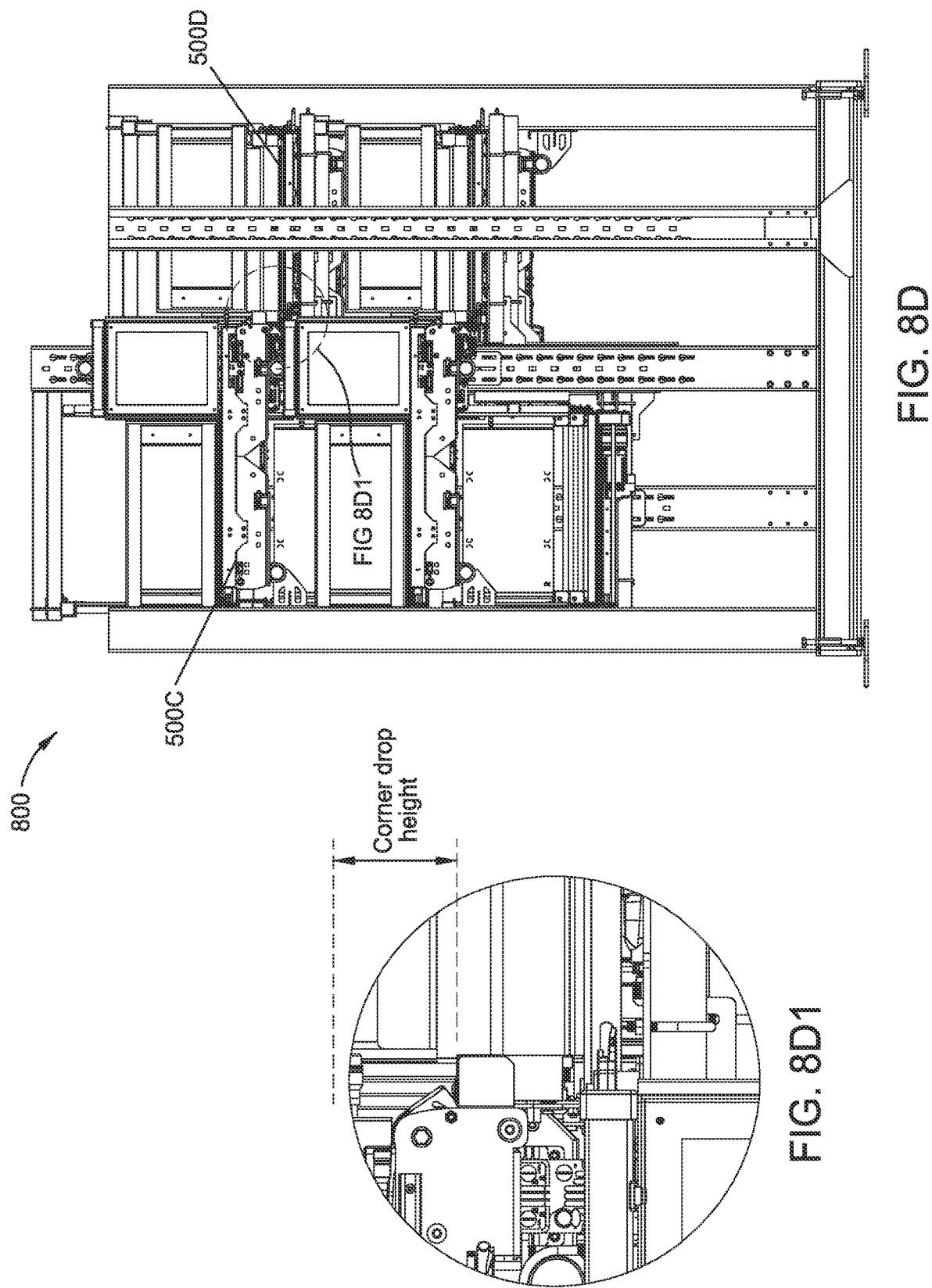

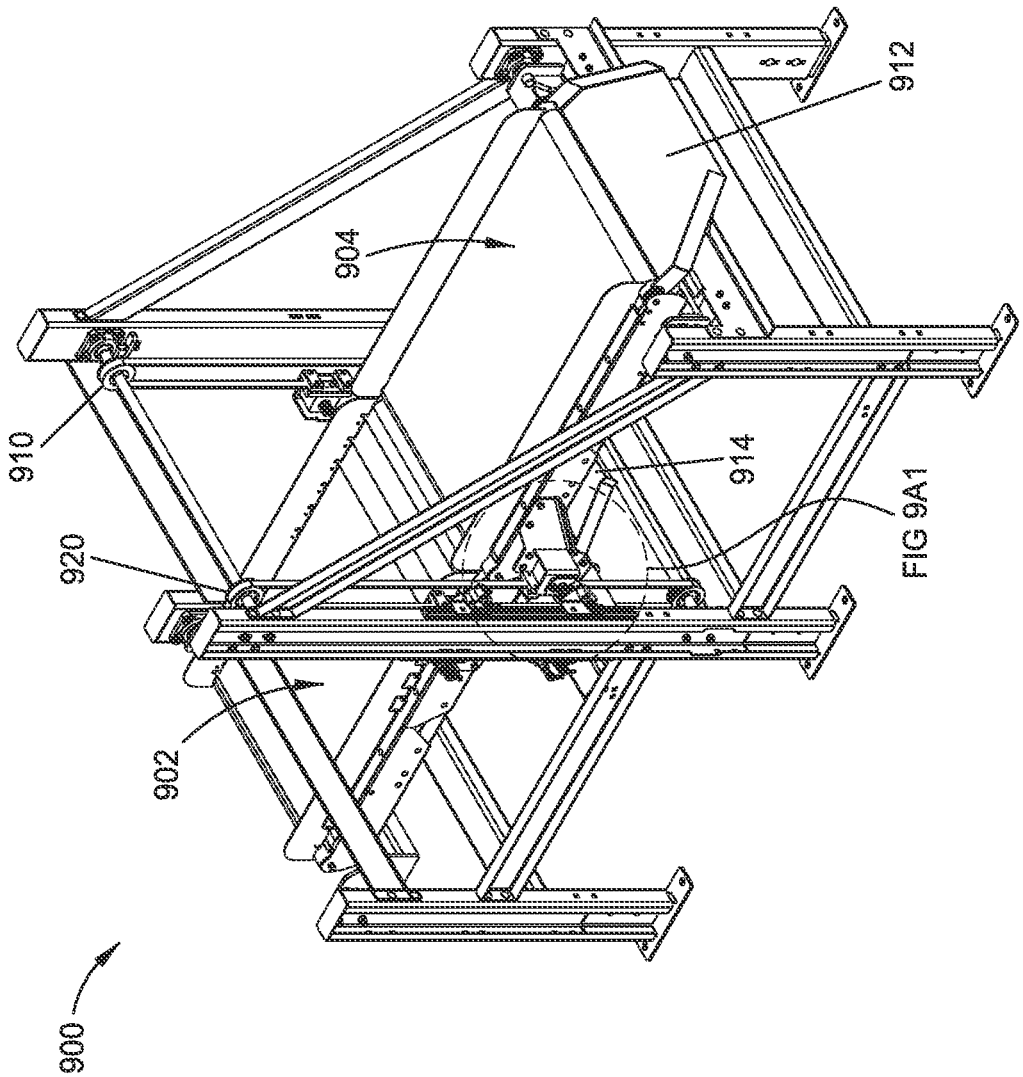
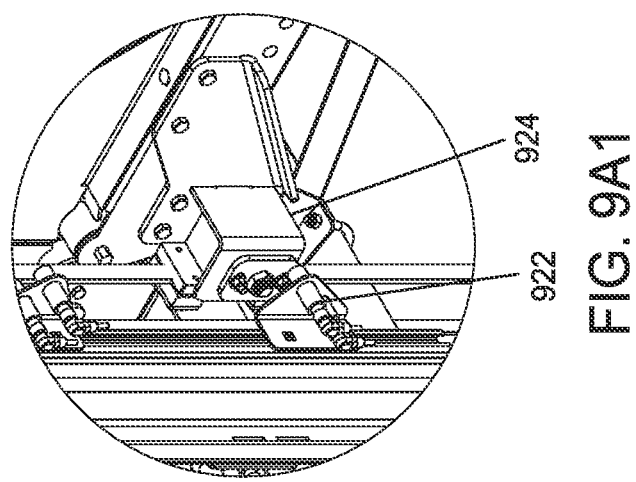

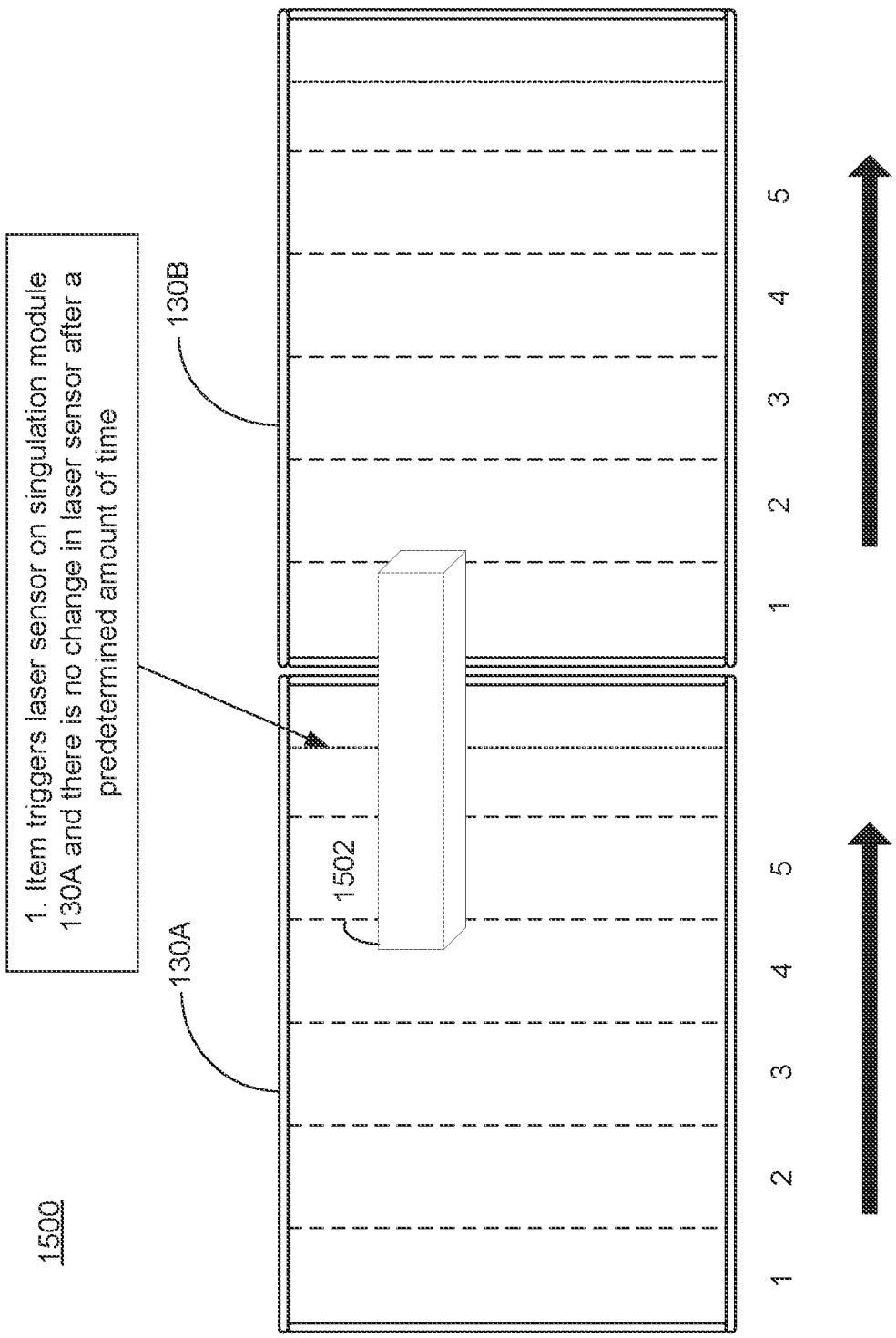

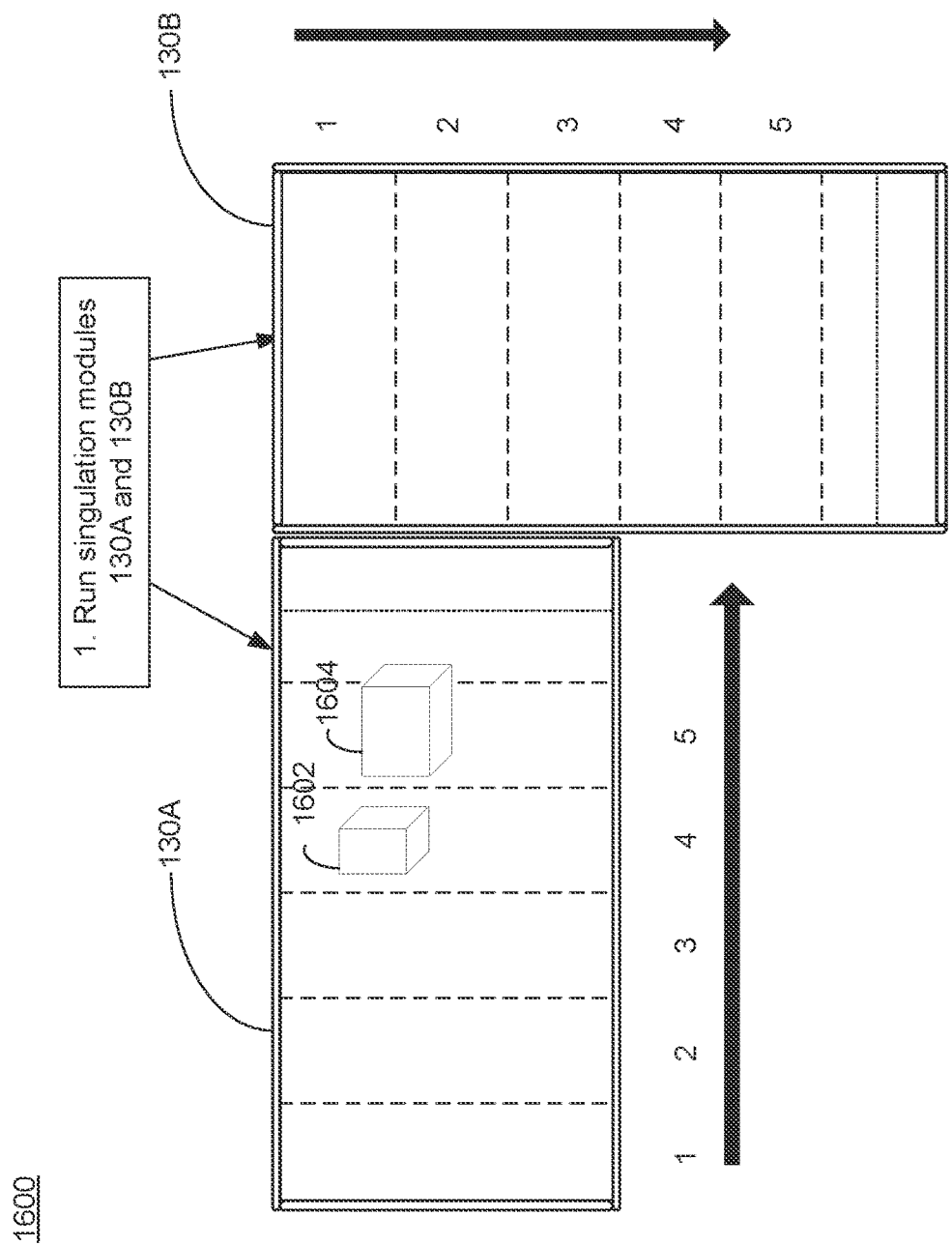

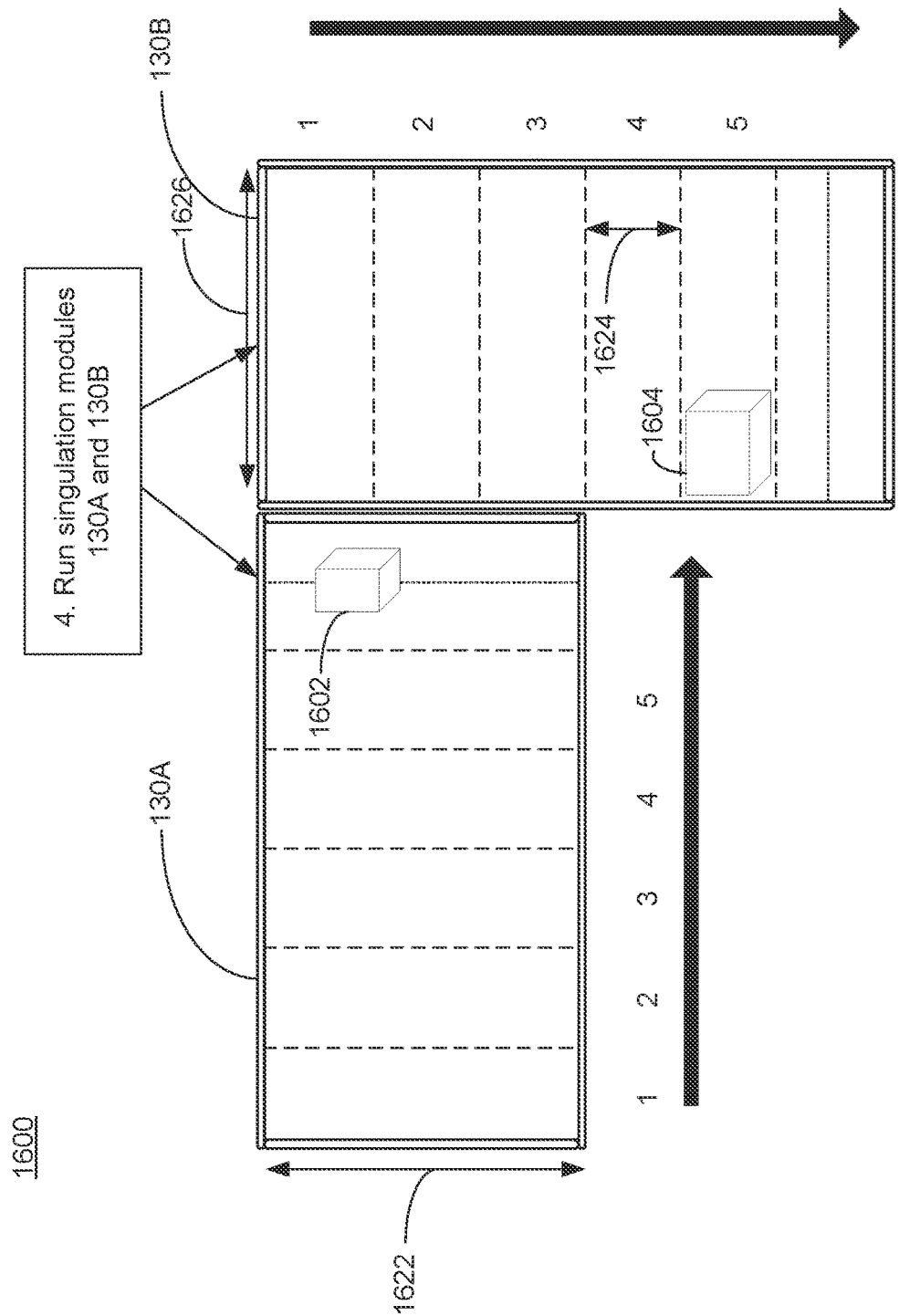

CONTROL SYSTEM FOR AUTOMATED SINGULATION SYSTEM

CROSS-REFERENCE TO RELATED APPLICATIONS

This application is a continuation of co-pending U.S. patent application Ser. No. 17/026,835, filed on Sep. 21, 2020, which is a divisional of U.S. patent application Ser. No. 16/219,655, filed Dec. 13, 2018 and patented on Sep. 22, 2020 as U.S. Pat. No. 10,781,053. The aforementioned related patent applications are herein incorporated by reference in their entirety.

BACKGROUND

The present disclosure generally relates to singulating items, and more specifically, to an automated system that uses multiple conveyor belts for singulating items.

Many companies store, package, and ship items and/or groups of items from different types of facilities (e.g., warehouse, plant, distribution center, storehouse, factory, etc.). These various activities and the overall flow or movement of items within the facility (e.g., from receiving the item(s) to storing the item(s), from storing the item(s) to shipping the item(s), etc.) is often labor intensive. The process of singulating generally involves separating (or isolating) an item from a larger group of items (e.g., in a container, on a conveyor belt, etc.) for downstream processing.

BRIEF DESCRIPTION OF DRAWINGS

Various embodiments in accordance with the present disclosure will be described with reference to the drawings, where like designations denote like elements.

FIG. 2B illustrates a top view of an example spiral configuration for a singulation tool, according to one embodiment.

FIG. 6B illustrates a perspective view of an example frame structure for a singulation tool, according to one embodiment.

FIG. 7 illustrates a perspective view of another example frame structure for a singulation tool, according to one embodiment.

FIG. 7A further illustrates a portion of the example frame structure illustrated in FIG. 7, according to one embodiment.

FIG. 7B further illustrates another portion of the example frame structure illustrated in FIG. 7, according to one embodiment.

FIG. 8A illustrates a perspective view of an example singulation tool, according to one embodiment.

FIG. 8C illustrates a side view of an example singulation tool, according to one embodiment.

FIG. 8C1 further illustrates a portion of the example singulation tool illustrated in FIG. 8C, according to one embodiment.

FIG. 8D illustrates another side view of an example singulation tool, according to one embodiment.

FIG. 8D1 further illustrates a portion of the example singulation tool illustrated in FIG. 8D, according to one embodiment.

FIG. 9A illustrates a perspective view of an example divert tool, according to one embodiment.

FIG. 9A1 further illustrates a portion of the example divert tool illustrated in FIG. 9A, according to one embodiment.

FIGS. 15A-B illustrate an example scenario of controlling singulation modules to prevent a jamming condition, according to one embodiment.

FIGS. 16A-C illustrate an example scenario of controlling singulation modules in a perpendicular configuration, according to one embodiment.

DETAILED DESCRIPTION

Embodiments herein describe an automated system for singulating items, e.g., for shipping, sorting, etc. The system includes a singulation tool (or machine) that singulates items to a specified gap distance (e.g., to achieve a certain processing rate of units per hour (UPH)), a scan tool that scans and processes items output from the singulation tool, and a kickback (or divert) tool that is configured to divert (or re-direct) non-singulated items (output from the singulation tool) back to the singulation tool via a recirculation line of conveyor belts. The singulation tool is a multi-tier conveyor belt system with multiple identical conveyor belts arranged at different orientations and heights. Each of the conveyor belts is equipped with multiple sensors to detect (e.g., presence and position of) item(s) on the conveyor belt. Items may transition onto an initial upstream conveyor belt and subsequently move through several (intermediary) downstream conveyor belts until reaching a last downstream conveyor belt of the singulation tool. As items are transitioned into the singulation tool, some of the items may be touching, partially overlapping, and/or laying on one another. As described further below, each of the conveyor belts in the singulation tool is independently controlled such that the items are singulated (e.g., separated in distance with respect to one another such that the items are no longer touching, overlapping, and/or laying on one another) as they move from the initial upstream conveyor belt to the last downstream conveyor belt in the singulation tool.

After exiting the singulation tool, items are transitioned through the scan tool. The scan tool captures identifying information (e.g., radio frequency identification (RFID) tag, barcodes, such as universal product code (UPC), stock keeping unit (SKU), etc.) associated with each item and verifies the item based on the information. In one embodiment, the scan tool can determine whether an item output from the singulation tool is properly singulated (e.g., separated by a determined gap distance from another item) based on the verification. After passing through the scan tool, items are transitioned through the divert tool, which is configured to divert items that are not singulated to a recirculation line. For example, items that the scan tool is unable to read and/or that fail verification are recirculated back to the singulation tool to undergo singulation again.

Figure 1A:
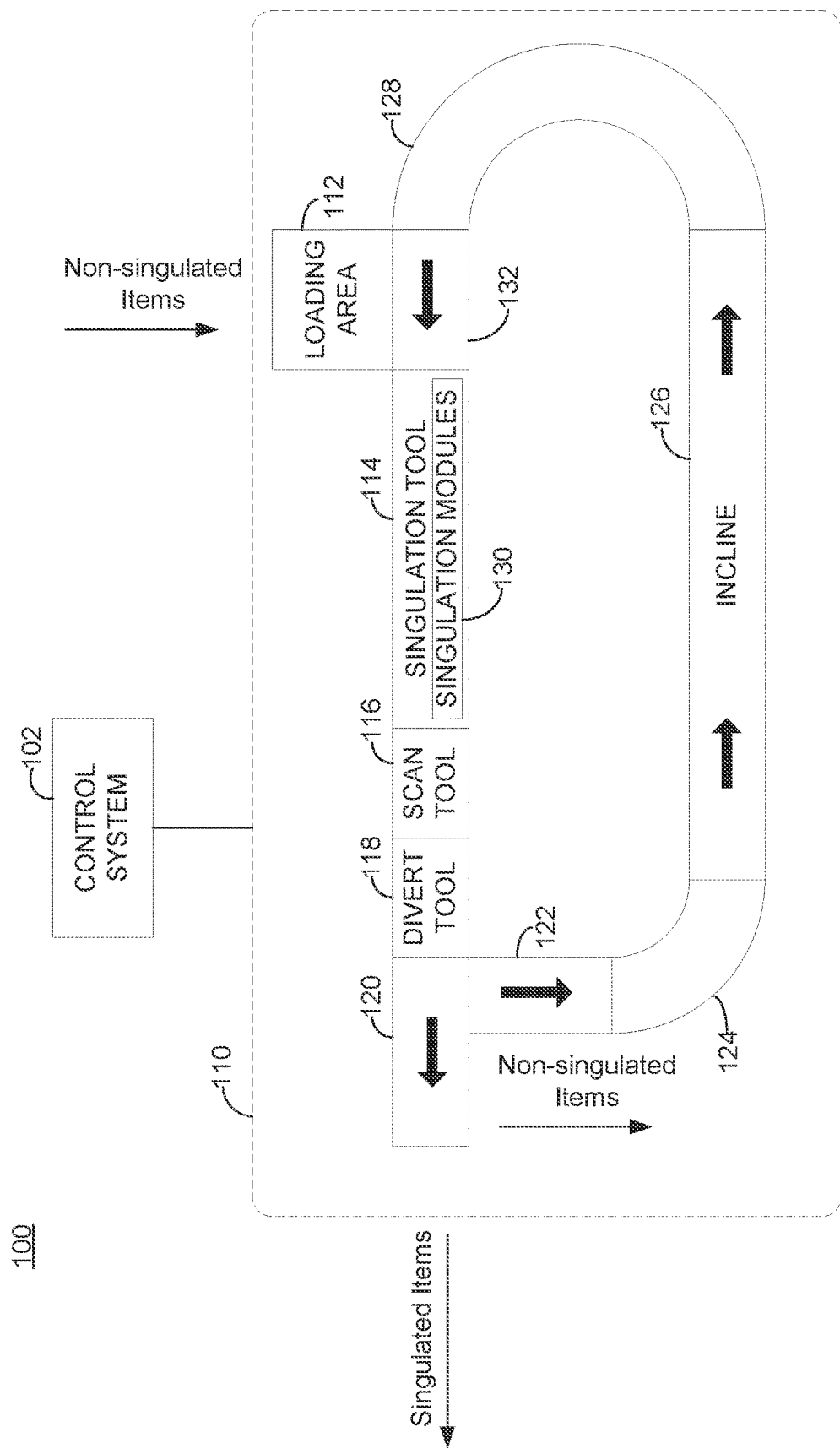
FIG. 1A is a block diagram illustrating an example automated singulation system, according to one embodiment.

FIG. 1A illustrates an example automated singulation system 100, according to one embodiment. As shown, the automated singulation system 100 includes a master control system 102 and an equipment (or machine) area 110. The automated singulation system 100 may be included in any suitable phase(s) of facility operations known to a person of ordinary skill in the art. In one example, the automated singulation system 100 may be used at a receiving station to singulate disparate items as they are initially received into the facility. In another example, the automated singulation system 100 may be used at a sorting station to singulate picked items so they can be routed to different packaging stations (e.g., for order fulfillment). Other examples of suitable facility operations may include staging at loading zones or other predefined regions within a facility, loading onto and/or off vehicles, and so forth.

In this particular embodiment, the equipment area 110 includes a loading area 112, singulation tool 114, scan tool 116, divert tool 118, and junction segments 120, 122, 124, 126, 128, and 132. The junction segments 120, 122, 124, 126, 128, and 132 generally represent sections of the automated singulation system 100 in which items are moved (or transitioned) within the equipment area 110. The junction segments 120, 122, 124, 126, 128, and 132 can have a variety of different configurations (e.g., shape, material, angle, height (or elevation), etc.) suitable for a given equipment area 110 within a facility. For example, one or more of the junction segments 120, 122, 124, 126, 128, and 132 can be oriented horizontally, tilted (e.g., with an inclination), etc. In some examples, one or more of the junction segments 120, 122, 124, 126, 128, and 132 may be at a different height (or elevation) than another one or more of the junction segments 120, 122, 124, 126, 128, and 132. In some examples, one or more of the junction segments 120, 122, 124, 126, 128, and 132 can have a surface shape that is substantially planar, crowned, domed, concave, convex, irregular, or any other shape or combination of shapes. Additionally, the material(s) that forms the top surface of the junction segments 120, 122, 124, 126, 128, and 132 may be formed of one or more of a variety of materials (e.g., metal, plastic, rubber, fabric, carpet, wood, tile, etc.). In one embodiment, one or more of the junction segments 120, 122, 124, 126, 128, and 132 includes a conveyor belt or a series of conveyor belts (that may have different configurations).

The loading area 112 generally represents an area in which non-singulated items are received by the automated singulation system 100. In one embodiment, the non-singulated items may be received through loaded totes (or containers) (e.g., totes filled with multiple non-singulated items). For example, the loading area 112 may receive a pallet or cart with multiple totes, each including multiple items. In some examples, the totes may include items that were picked from an inventory area and that correspond to various shipment sets. The totes may be of various sizes and shapes. In one embodiment, the non-singulated items may be received at the loading area 112 as individual items. The loading area 112 may receive loaded totes and/or individual items using mechanical movement (e.g., using conveyor belts), motorized movement (e.g., using forklifts or carts), robotic movement, manual placement, and so forth.

The loading area 112 may be any space or configuration suitable for operation(s) in a given facility. That is, the loading area 112 can have a variety of shapes, sizes, surface materials, and/or other properties. In one particular embodiment, at least a portion of the loading area 112 may be at a different height (or elevation) than the entrance to the singulation tool 114. For example, the loading area 112 can include an incline (cleated) conveyor belt that transitions items from the ground floor of a facility to the singulation tool 114. In another example, the loading area 112 can include a series of conveyor belts at the elevated height of the singulation tool 114 that transition items to the singulation tool 114 from another location within the facility.

Figure 2A:
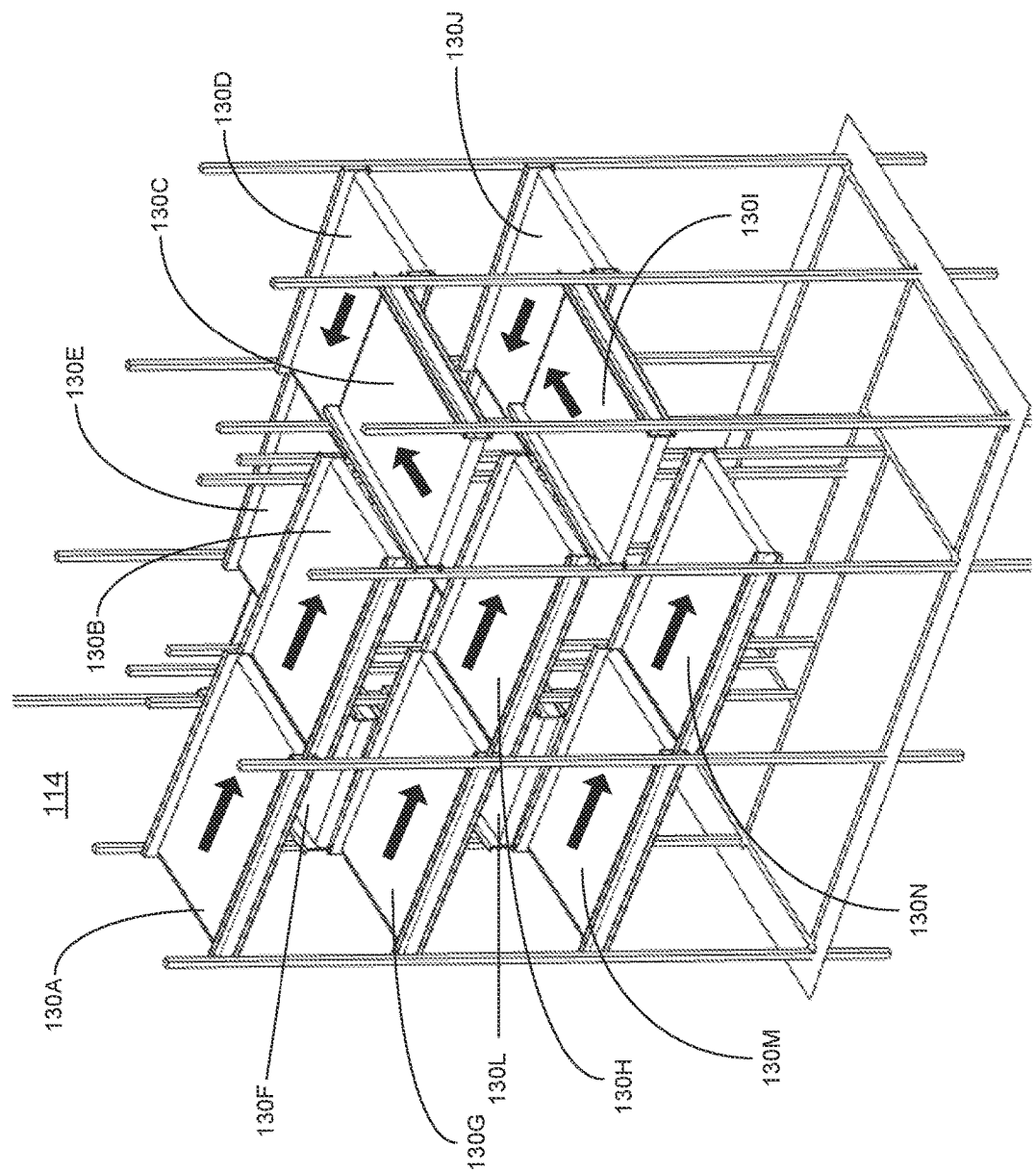
FIG. 2A illustrates a front perspective view of an example spiral configuration for a singulation tool, according to one embodiment.
Figure 2C:
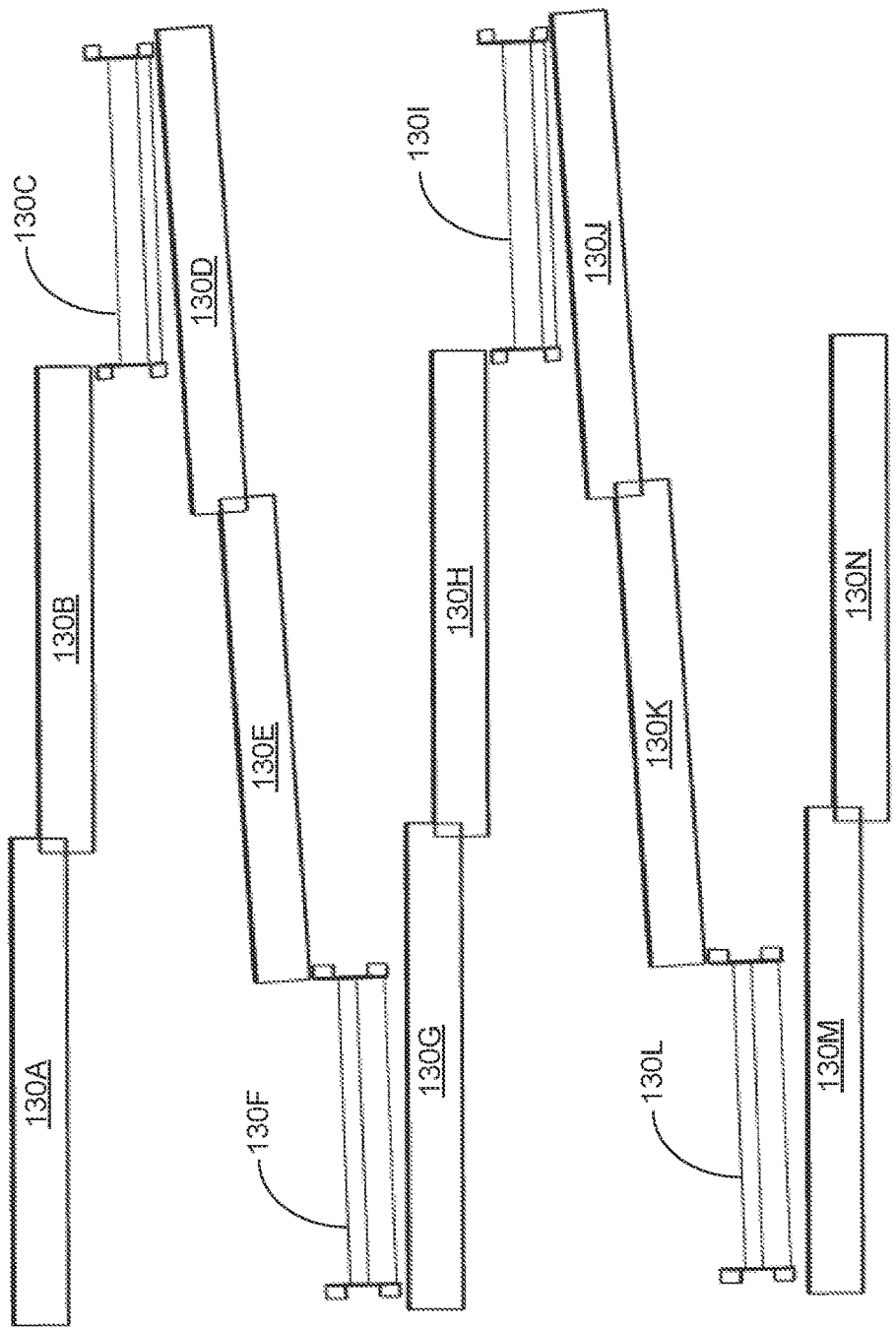
FIG. 2C illustrates a side view of an example spiral configuration for a singulation tool, according to one embodiment.
Figure 3:
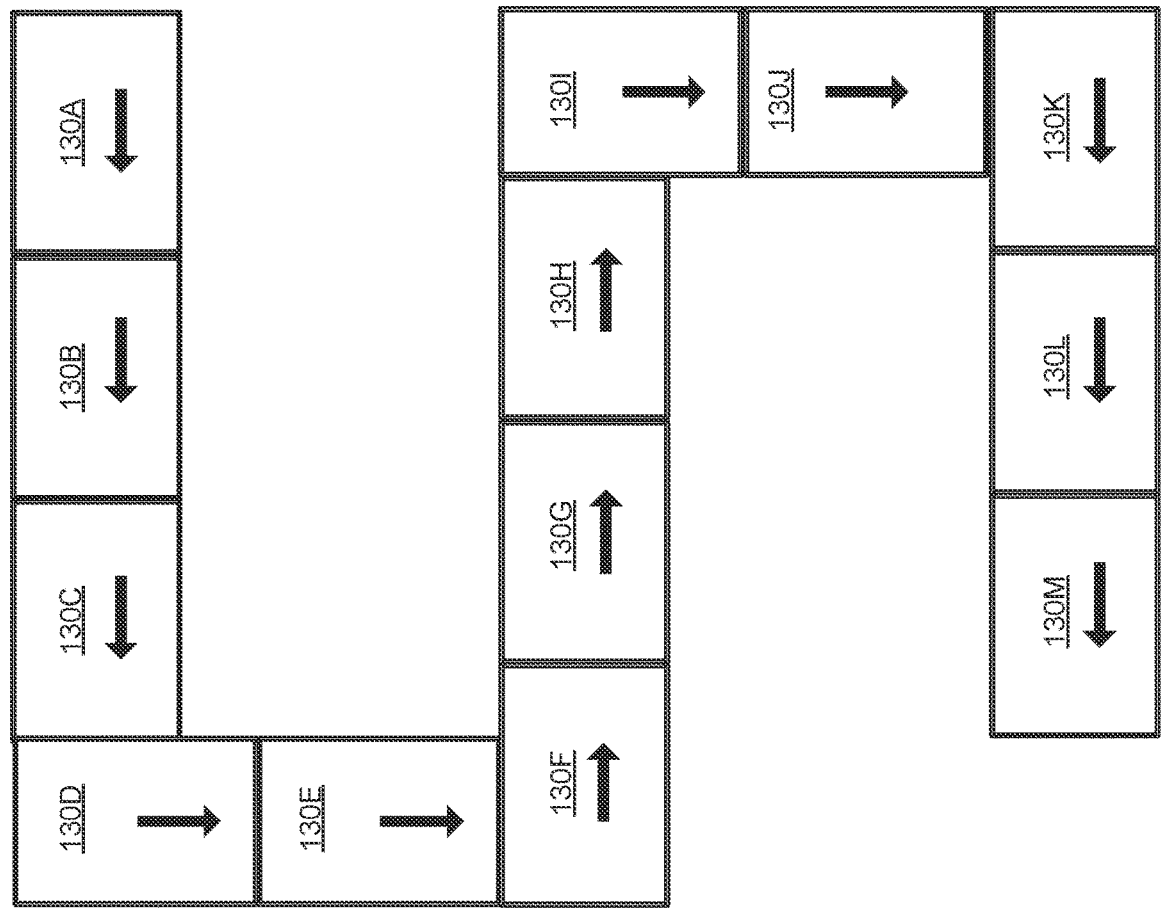
FIG. 3 illustrates a top view of an example S-shaped configuration for a singulation tool, according to one embodiment.
Figure 4:
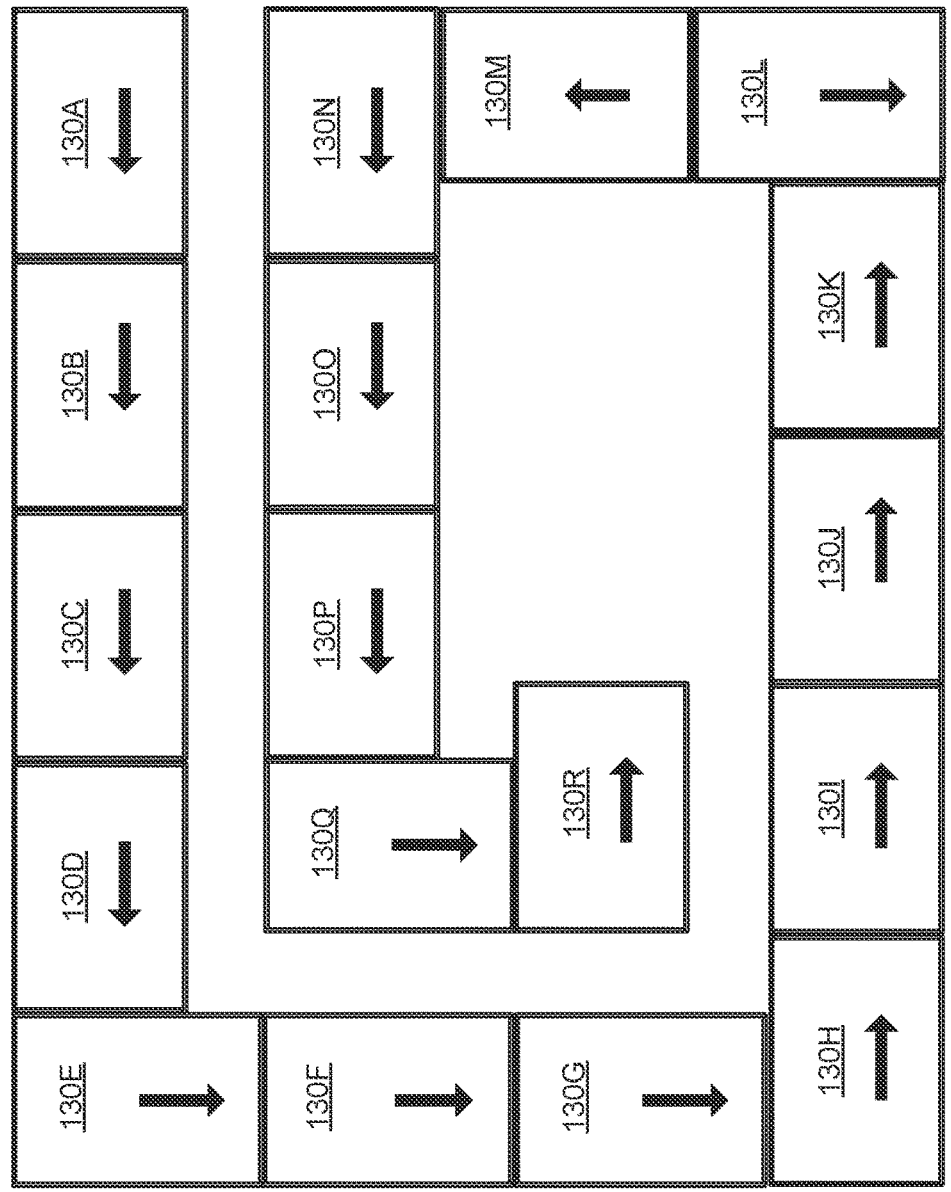
FIG. 4 illustrates a top view of an example whirlpool configuration for a singulation tool, according to one embodiment.

From the loading area 112, loaded totes and/or individual items transition to the singulation tool 114 via junction segment 132. The singulation tool 114 includes multiple singulation modules 130 (also referred to as conveyor belts) deployed in multiple tiers (or levels or hierarchies). As described further below, each singulation module 130 is a conveyor belt equipped with multiple sensors for detecting items on the conveyor belt. In one embodiment, each singulation module 130 within the singulation tool 114 has an identical physical structure (e.g., size, shape, material), but a different orientation and/or placement within the singulation tool 114. The singulation tool 114 may have various configurations (or shapes), e.g., depending on how the singulation modules 130 are deployed. In one embodiment, the singulation modules 130 may be mounted in a spiral configuration. For example, FIGS. 2A, 2B, and 2C show a front perspective view, a top view, and a side view, respectively, of singulation modules 130 A-N mounted in a spiral configuration. In another embodiment, the singulation modules 130 may be mounted in an S-shaped (or "snake") configuration, e.g., as shown in the (top view) of a singulation tool 114 in FIG. 3. In yet another embodiment, the singulation modules 130 may be mounted in a whirlpool configuration, e.g., as shown in the (top view) of a singulation tool 114 in FIG. 4. In general, the singulation modules 130 can be mounted in any configuration suitable for the equipment area 110 of a facility.

Within a given configuration of the singulation tool 114, each singulation module 130 is placed at a different height with respect to another singulation module 130, such that the singulation tool 114 includes a series (or sequence) of singulation modules 130 waterfalling from one to the next. That is, each singulation module 130 is an upstream singulation module and/or a downstream singulation module 130 with respect to another singulation module 130. As shown in FIG. 2C, for example, singulation module 130A is an upstream singulation module with respect to singulation module 130B, singulation module 130B is a downstream singulation module with respect to singulation module 130A and an upstream singulation module with respect to singulation module 130C, and so on. In some embodiments, one or more of the singulation modules 130 can be oriented horizontally, titled (e.g., with an inclination), etc. By deploying singulation modules 130 in the various configurations described herein, embodiments can reduce the area footprint of the automated singulation system 100 within the facility and improve accessibility to the automated singulation system 100 (e.g., for maintenance, repairs, troubleshooting, etc.).

Figure 1B:
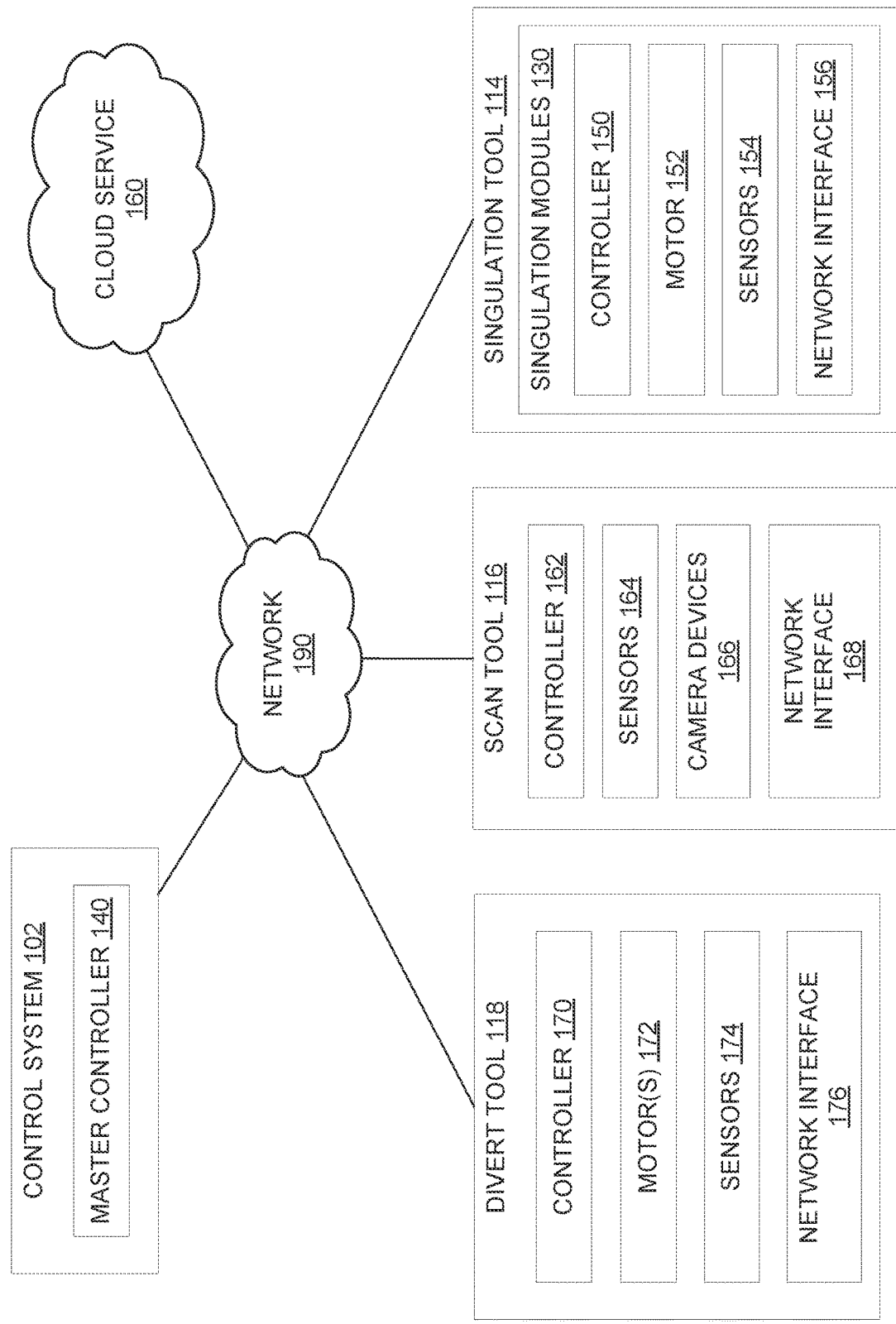
FIG. 1B is a block diagram further illustrating components of the automated singulated system described relative to FIG. 1A, according to one embodiment.

As shown in FIG. 1B, the control system 102 is connected to the singulation tool 114, the scan tool 116, the divert tool 118, and the cloud computing service 160 via network 190. Network 190, in general, is representative of a local area network (LAN) (e.g., Ethernet), wide area network (WAN), wireless LAN (WLAN), personal area network (PAN), cellular network, etc. As items enter the singulation tool 114, the control system 102 independently controls each of the singulation modules 130 such that items are singulated when the items exit the singulation tool 114. As shown, the control system 102 includes a master controller 140 and each singulation module 130 includes a (local) controller 150, a motor 152, sensors 154, and a network interface 156. The master controller 140 provides control signals (or commands) to the (local) controller 150 and/or motor 152 in order to control the operation of each singulation module 130. For example, the master controller 140 may send stop commands, start commands, accelerate commands, decelerate commands, and the like which control the operation (e.g., on/off control, speed, acceleration, etc.) of the singu-lation modules 130. In one embodiment, the master controller 140 can include processors or micro-controllers. The master controller 140 can include solely hardware and firmware or can include combinations of hardware and software elements. In one particular embodiment, the master controller 140 is a programmable logic controller (PLC).

The (local) controller 150 can be a processor or a micro-controller which receives commands from the master controller 140 (e.g., using the network interface 156) and issues corresponding commands to the motor 152, which controls the conveyor belt of the singulation module 130. In addition to receiving information from the master controller 140, the controller 150 can transmit information to the master controller 140 using the network interface 156. For example, the controller 150 can send information from sensors 154 (e.g., indicating detection and/or position of items on the singulation module 130), information from motor 152 (e.g., regarding current speed of the singulation module), and the like to the master controller 140. As described further below, the master controller 140 may use the information received from each controller 150 to determine which commands (e.g., stop command, start command, etc.) to send to the controllers 150. The controller 150 can include solely hardware and firmware or can include combinations of hardware and software elements. The network interface 156 may communicate using a wired communication protocol (e.g., Ethernet), a wireless communication protocol (e.g., WiFi), etc.

Note that while FIG. 1B depicts each singulation module 130 with a (local) controller 150, in some embodiments, each singulation module 130 may not be equipped with a local controller (e.g., controller 150). In these embodiments, the master controller 140 can send commands directly to the motor 152 to control a singulation module 130. Similarly, the master controller 140 can receive feedback information from the singulation module 130 directly from the motor 152 and/or sensors 154 via the network interface 156.

The motor 152 controls the on/off operation and speed of the singulation module 130, based on commands received from the controller 150 and/or master controller 140. The motor 152 can include, for example, an alternating current (AC) motor, direct current (DC) motor, motor driven roller, servo motor (e.g., integrated servo motor), etc. Sensors 154 are generally used for detecting items and/or location (or position) of items on the singulation module 130. The sensors 154, for example, can include proximity sensors, infrared (IR) sensors, laser (detection) sensors, array sensors, etc. In one embodiment, each singulation module 130 includes a position sensor (e.g., array sensor) for detecting presence and position (or location) of items on the singulation module 130. In addition to the presence sensor, in some embodiments, each singulation module can include a presence sensor (e.g., laser sensor) for detecting low profile (or thin) items, such as envelopes, letters, etc. In one embodiment, the position sensor (e.g., array sensor) is a light curtain array with multiple zones for item detection and position determination.

As shown in FIG. 1A, after exiting the singulation tool 114, items transition through the scan tool 116. The scan tool 116 is generally configured to capture identifying information associated with each item and interact with the control system 102 and/or the cloud computing service 160 for verification of the item. That is, the scan tool 116 can determine whether the item belongs in the particular phase of the facility operations (in which the automated singulation system 100 is being used), whether the item is properly singulated, the subsequent destination for the item, etc. The identifying information associated with the item can include a barcode (e.g., SKU, UPC, etc.), a RFID tag, etc.

As shown in FIG. 1B, the scan tool 116 includes a (local) controller 162, sensors 164, camera devices 166, and network interface 168. The controller 162 can be a processor or a micro-controller that controls sensors 164 and camera devices 166. The controller 162 can include solely hardware and firmware or can include combinations of hardware and software elements. For example, in one embodiment, upon detecting (via sensors 164) that an item has transitioned into the scan tool 116 or an area (e.g., conveyor belt) in proximity to the scan tool 116, the controller 162 uses camera devices 166 to capture the identifying information (e.g., barcode) associated with the item. Similar to sensors 154, the sensors 164 may include, for example, proximity sensors, IR sensors, laser sensors, array sensors, etc. In one embodiment, the scan tool 116 includes six camera devices 166 for scanning all (six) sides of an item for the identifying information. In this embodiment, the scan tool 116 may include the six camera devices 166 mounted within an enclosed structure (e.g., tunnel). The scan tool 116 may send information associated with the captured identifying information to the master controller 140 and/or the cloud computing service 160 via the network interface 168. The network interface 168 may communicate using a wired communication protocol (e.g., Ethernet), a wireless communication protocol (e.g., WiFi), etc.

Note that while FIG. 1B depicts the scan tool 116 with a (local) controller 162, in some embodiments, the scan tool 116 may not be equipped with a local controller (e.g., controller 162). In these embodiments, the master controller 140 can send commands directly to the camera devices 166 and/or sensors 164 to control the scan tool 116. Similarly, the master controller 140 can receive feedback information from the scan tool 116 directly from the sensors 164, camera devices 166, etc. via the network interface 168.

Based on the identifying information, the master controller 140 and/or the cloud computing service 160 can determine whether the item associated with the identifying information was successfully singulated within the singulation tool 114. For example, if the master controller 140 and/or the cloud computing service 160 receives multiple valid barcodes from the scan tool 116 for a single item, the master controller 140 and/or the cloud computing service 160 can determine that the item was not successfully singulated within the singulation tool 114. In another example, if the master controller 140 and/or the cloud computing service 160 receives valid barcodes for different items within a predetermined amount of time, the master controller 140 and/or the cloud computing service 160 can determine that the items were not successfully singulated (e.g., since they are within a specified gap distance).

As items exit the scan tool 116, the items are transitioned through the divert tool 118. The divert tool 118 is configured to pass through singulated items via junction segments 120 (e.g., to other phases of the facility) and divert (or recirculate) non-singulated items back to the singulation tool 114 via junction segments 122, 124, 126, 128, and 132. As shown in FIG. 1B, the divert tool 118 includes a (local) controller 170, one or more motors 172, sensors 174, and a network interface 176. The controller 170 can be a processor or a micro-controller which receives commands from the master controller 140 (e.g., using the network interface 176) and issues corresponding commands to the motor(s) 172, which control the divert tool 118. The motor(s) 172 can include, for example, AC motors, DC motors, motor driven rollers, servo motors (e.g., integrated servo motors), etc. In one embodiment, the divert tool 118 is a dual conveyor belt system controlled by a single motor 172. In this embodiment, the dual conveyors may be, for example, motor driven roller conveyors and the motor 172 may be, for example, a servo motor. The network interface 176 may communicate using a wired communication protocol (e.g., Ethernet), a wireless communication protocol (e.g., WiFi), etc.

Note that while FIG. 1B depicts the divert tool 118 with a (local) controller 170, in some embodiments, the divert tool 118 may not be equipped with a local controller (e.g., controller 170). In these embodiments, the master controller 140 can send commands directly to the motor(s) 172 and/or sensors 174 to control the scan tool 116. Similarly, the master controller 140 can receive feedback information directly from the motor(s) 172, sensors 174, etc. of the divert tool 118.

In some cases, horizontal divert systems (also referred to as horizontal diverting systems, horizontal recirculating systems, etc.) may not be suitable for diverting a wide variety of different items (e.g., different sizes, different shapes, etc.) at a high rate. As such, in some embodiments, the divert tool 118 may be implemented as a vertical divert system (e.g., as opposed to a horizontal divert system). Assuming the vertical divert system includes two conveyor belts, each of the conveyor belts may pivot vertically (in different directions) around an end hinge point. A first of the two conveyor belts may pivot vertically around a first hinge point in a first direction (e.g., downwards) and a second of the two conveyor belts may pivot vertically around a second hinge point in a second direction (e.g., upwards). Upon detecting an item (e.g., via sensors 174), the divert tool 118 may determine whether the item is a singulated item or a non-singulated item based on information received from the master controller 140 (e.g., via network interface 176). If the item is singulated, the controller 170 and/or master controller 140 may refrain from actuating the motor 172 to pivot the conveyor belts. Instead, the controller 170 and/or master controller 140 may control the conveyor belts to transition the item through the divert tool 118. On the other hand, if the item is non-singulated, the controller 170 and/or master controller 140 may control the motor 172 to pivot the conveyor belts. When pivoted, the item may fall from the dual conveyor belts to another conveyor belt (e.g., junction segment 122) beneath junction segment 120 that transitions the item back to the singulation tool 114 for another singulation attempt.

FIGS. 5A-5E depict different views of an apparatus 500 that can be deployed within a singulation tool 114, according to one embodiment. In particular, FIGS. 5A-5E show a perspective view, a first side view, a second side view, a top view, and a bottom view, respectively, of the apparatus 500. The apparatus 500 is one example of the singulation module 130 depicted in FIGS. 1A-1B.

The apparatus 500 includes a frame 530, which provides a structure for housing and/or mounting various components (e.g., sensors, motors, locking mechanisms, belt, rollers, etc.) of the apparatus 500. In one embodiment, the frame 530 includes a lightweight metallic material (e.g., aluminum, aluminum alloy, etc.) that enables the apparatus 500 to have a modular structure. For example, the frame 530 allows for apparatus 500 to be easily handled for maintenance and transportation, components of the apparatus 500 to be removed/replaced, and the like. The frame 530 includes a first side member 532 and a second side member 534, which are connected to each other via connecting members 536 and 538. As shown, e.g., in FIG. 5E, the connecting members 536 and 538 may include one or more cutouts 540 to reduce weight of the frame 530. Note the frame 530 is merely one example of a suitable structure for the apparatus 500. In general, the frame 530 can have any other suitable structure and/or material that provides a modular structure for the apparatus 500.

The apparatus 500 includes a (front) roller 520, a (rear) roller 522, and a belt 512 (collectively referred to as a conveyor belt) that rotates around the rollers 520 and 522. As shown, each end of the rollers 520 and 522 is attached to a different side of the frame 530 (e.g., via screws, bolts, brackets, etc.). For example, one end of the roller 520 is attached to the side member 534 of the frame 530 and the opposite end of the roller 520 is attached to the side member 532 of the frame 530. Similarly, one end of the roller 522 is attached to the side member 534 of the frame 530 and the opposite end of the roller 520 is attached to the side member 532 of the frame 530. A guide rail 516 is attached to the side member 532 of the frame 530 and a guide rail 514 is attached to the side member 534 of the frame 530. The frame 530 houses a motor 550 (e.g., servo motor) and pulley drive system 580 for rotating the belt 512 around the rollers 520 and 522. In particular, the motor 550 is attached to the side member 534 of the frame 530 below the belt 512. In one embodiment, the pulley drive system 580 is a tooth belt drive system. A power port 590 and a network interface 570 (e.g., Ethernet interface) for the apparatus 500 are attached to the connecting member 538 of the frame 530. The network interface 570 is one example of the network interface 156 of the singulation module 130 depicted in FIGS. 1A-1B.

Figure 5A:
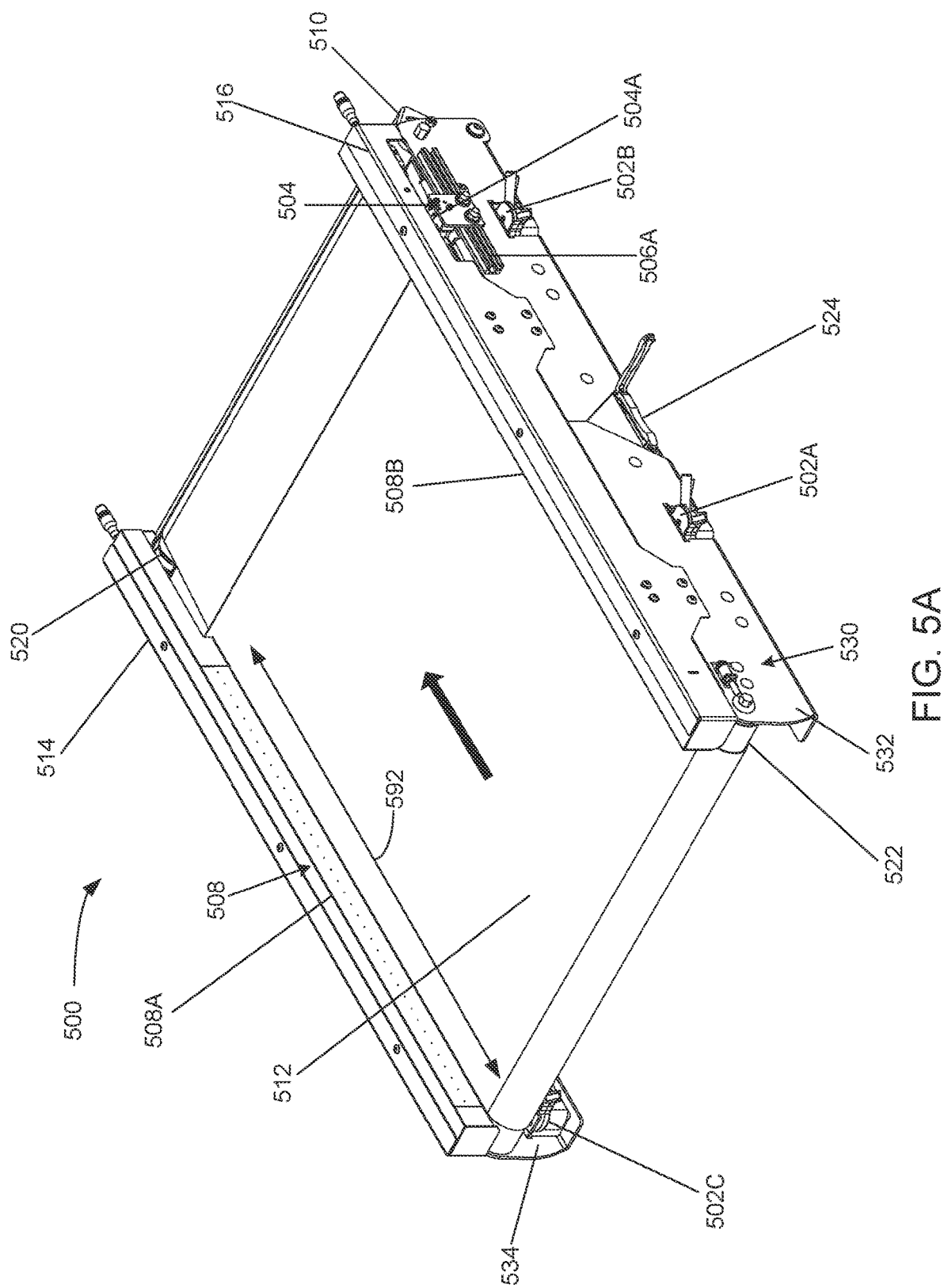
FIG. 5A illustrates a perspective view of an example singulation module, according to one embodiment.
Figure 5B:
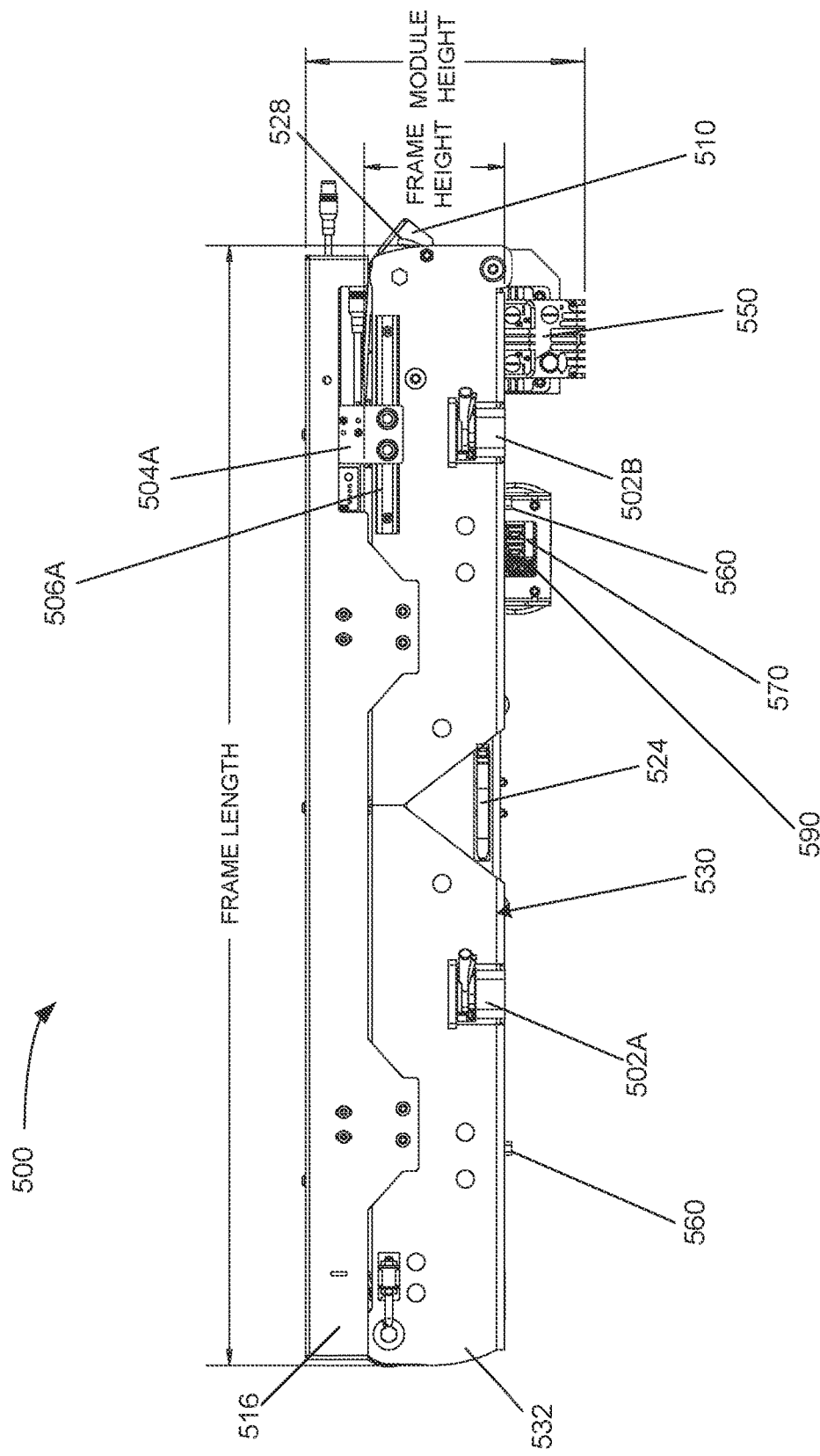
FIG. 5B illustrates a side view of an example singulation module, according to one embodiment.
Figure 5C:
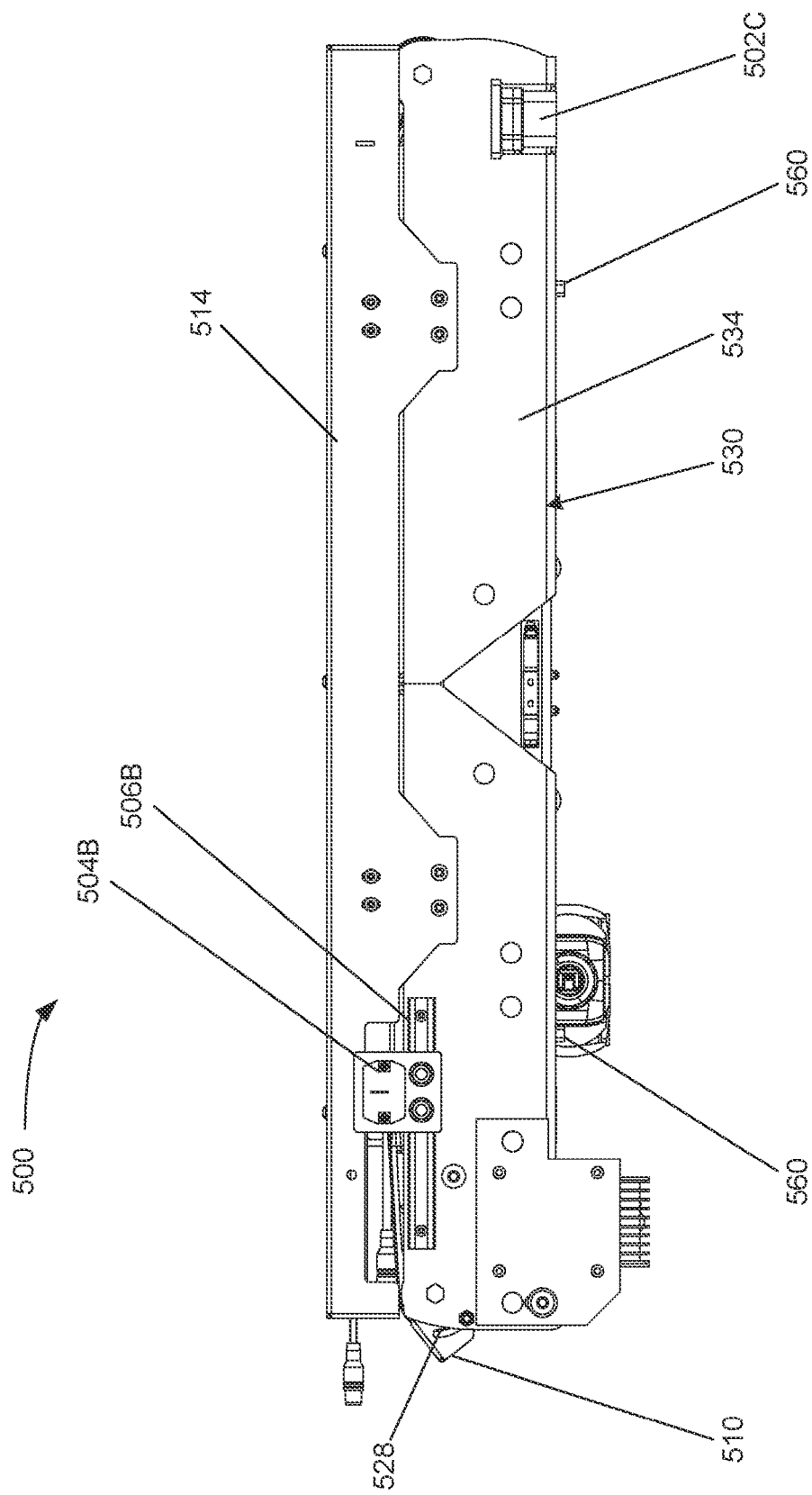
FIG. 5C illustrates another side view of an example singulation module, according to one embodiment.
Figure 5D:
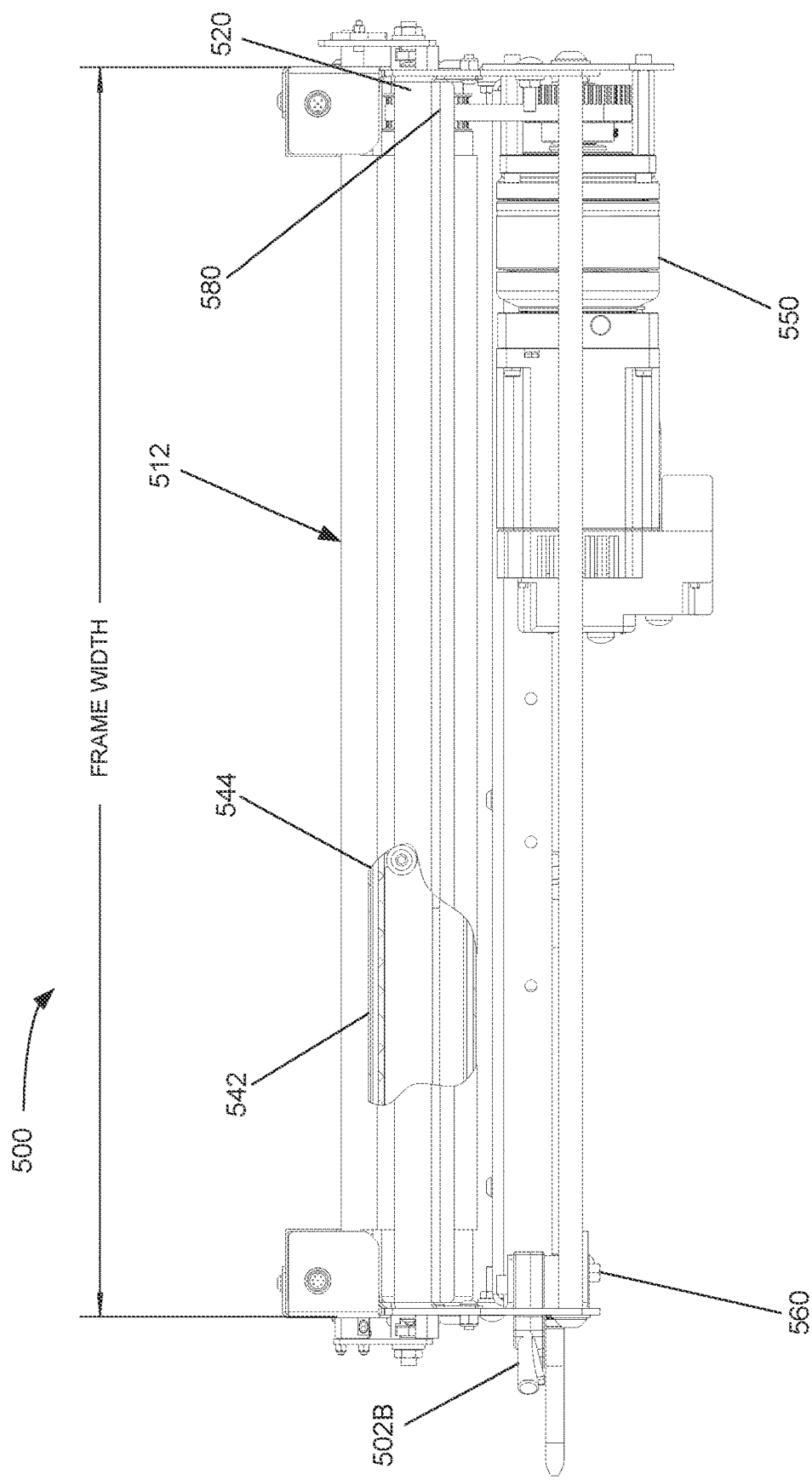
FIG. 5D illustrates a front view of an example singulation module, according to one embodiment.
Figure 5E:
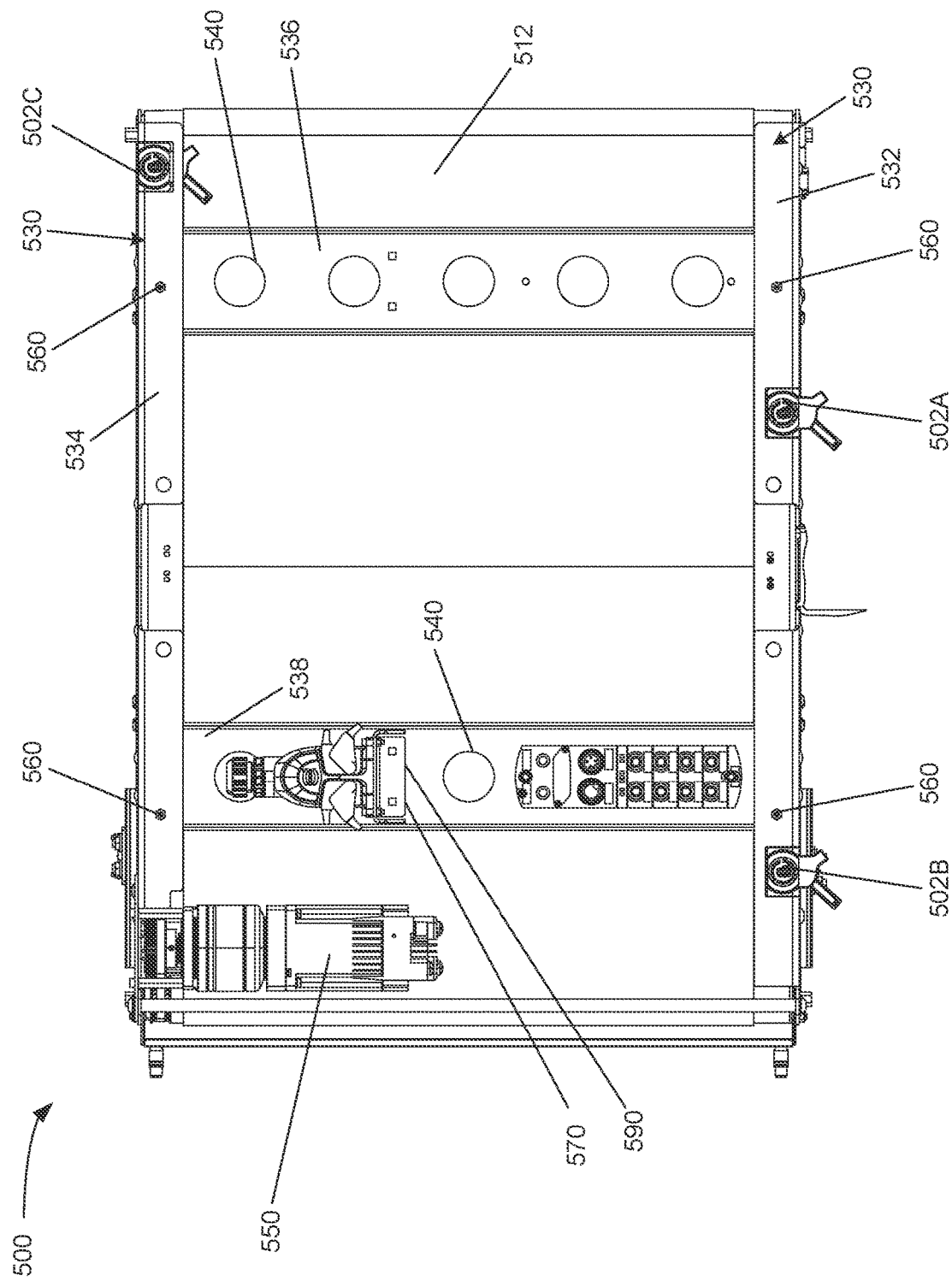
FIG. 5E illustrates a bottom view of an example singulation module, according to one embodiment.

In some embodiments, the belt 512 may include multiple layers, e.g., in order to reduce likelihood of items being damaged when they impact the surface of the belt 512. As shown in FIG. 5D, the belt 512 includes a first layer 542 and a second layer 544 disposed beneath the first layer 542. In one embodiment, the first layer 542 includes a plastic material (e.g., a polyethylene, such as ultra-high-molecular-weight polyethylene (UHMW)). When used as the surface layer of the belt 512, the first layer 542 may provide a rigid surface to grip items that impact the belt 512. The second layer 544 is used under the first layer 542 and provides additional dampening to the belt 512 (e.g., for absorbing impacts of items on the belt 512). In one embodiment, the second layer 544 includes a foam. The foam can include sheet foam, spray foam (e.g., an open cell spray foam, such as polyurethane open cell spray foam), etc. In one embodiment, the second layer 544 may have a thickness less than or equal to approximately 3/16 of an inch. With a thickness in this range, the second layer 544 can provide additional dampening to the belt 512 and reduce the chances of the first layer 542 being pierced by sharp objects that impact the belt 512.

As shown, the apparatus 500 also includes magnetic locks 502A-C that are fixed to the frame 530 (e.g., via screws, bolts, brackets, etc.). In particular, magnetic locks 502A and 502B are attached to a bottom portion of the side member 532 of the frame 530 and magnetic lock 502C is attached to a bottom portion of the side member 534 of the frame 530. As described further below, the magnetic locks 502A-C are used to secure the apparatus 500 to the (frame of the) singulation tool 114. For example, the magnetic locks 502A-C provide a quick mechanism for engaging/disengaging the apparatus 500 to/from a (horizontal) mounting location of the singulation tool 114. This allows for the apparatus 500 to be quickly changed out for maintenance, relocated to a different location of the singulation tool 114, etc. Note, that the magnetic locks 502A-C are just one example of a suitable locking mechanism for securing the apparatus 500 to the singulation tool 114. In general, the apparatus 500 can be secured to the singulation tool 114 via a variety of mechanical locking mechanisms (e.g., clamps, pins, etc.) and electric locking mechanisms that allow the apparatus 500 to have modularity.

In addition to the magnetic locks 502A-C, the apparatus 500 includes four locating pins 560 for aligning the apparatus to the particular mounting location of the singulation tool 114. Two locating pins 560 are attached to the bottom of side member 532 of the frame 530 and two locating pins 560 are attached to the bottom of side member 534 of the frame 530. As described further below, the singulation tool 114 may include a set of frame members (or connectors) that define a particular mounting location for each apparatus 500. The set of frame members may include holes with locations corresponding to the locating pins 560, such that the locating pins 560 can drop into the holes when the apparatus 500 is aligned over the hole locations. This feature allows the apparatus 500 to sit in place within the frame 530 of the singulation tool 114 and provides a fail-safe during operation of the apparatus 500. For example, the locating pins 560 can reduce the likelihood of the apparatus 500 coming out of position during operation in situations where the apparatus 500 is not properly secured to the frame via the magnetic locks 502A-C.

As noted, the singulation module 130 may include multiple sensors for detecting items placed on the singulation module 130. Here, the apparatus 500 includes an array sensor 508 housed within the guide rails 514 and 516. The array sensor 508 is used for detecting items that may be present on the belt 512, e.g., along sensing length 592. The array sensor 508 includes multiple emitter elements 508A housed within the guide rail 514 and multiple receiver elements 508B housed within the guide rail 516. The multiple emitter elements 508A and the multiple receiver elements 508B are closely spaced apart (e.g., on the order of millimeters) along the sensing length 592. The array sensor 508 can detect item(s) on the belt 512, based on the particular beams blocked by the item(s). As described further below with reference to FIG. 12, the array sensor 508 can be configured to detect position of item(s) on the belt 512 within one or more location zones, where each location zone corresponds to a particular area along the length of the belt 512. The number of location zones that can be detected may be based in part on the beam spacing of the emitter elements 508A.

In addition to the array sensor 508, the apparatus 500 includes a laser sensor 504 with a transmitting element 504A and a receiving element 504B. The transmitting element 504A is attached to a track 506A, which is attached to the side member 532 of the frame 530 (e.g., via screws, bolts, brackets, etc.). The receiving element 504B is attached to a track 506B, which is attached to the side member 534 of the frame 530 (e.g., via screws, bolts, brackets, etc.). The tracks 506A and 506B allow for adjusting the position of the laser sensor 504 (e.g., along a length of the tracks 506A and 506B). The laser sensor 504 is used for detecting thin (or low profile or low height) items (e.g., envelopes, credit cards, giftcards, mail, etc.) that may not be detected by the array sensor 508.

The apparatus 500 includes a sensor configuration module 524 attached to the side member 523 of the frame 530. The sensor configuration module 524 provides easy accessibility to the laser sensor 504, e.g., for sensor calibration. The apparatus 500 also includes a plate 510 attached between the side members 532 and 534 of the frame 530 at the front of the apparatus 500. The plate 510 helps to reduce jams that may occur in the gaps between the apparatus and another (downstream) apparatus 500 when items transition from the apparatus 500 to the other (downstream) apparatus 500. As shown in FIGS. 5B-C, the plate 510 includes a slot 528 for adjusting (e.g., rotation of) the plate 510.

By using the apparatus 500 for the structure of the singulation module 130, the singulation module 130 can be quickly changed out with any other singulation module 130 within the singulation tool 114 in cases of, e.g., failure of a singulation module 130, maintenance of a singulation module 130, etc. In this manner, embodiments provide a modular singulation tool with multiple identical singulation modules 130.

Figure 6A:
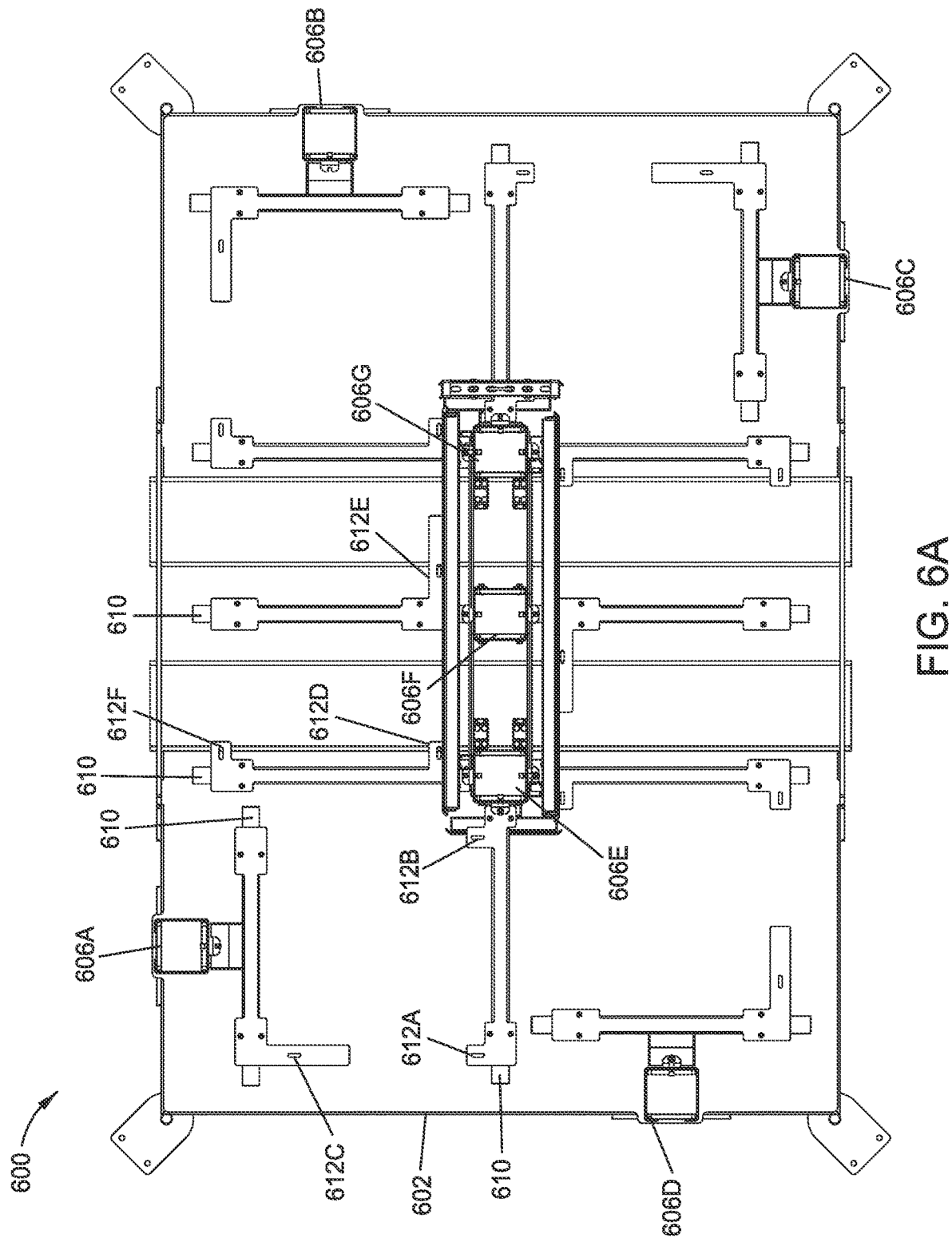
FIG. 6A illustrates a top view of an example frame structure for a singulation tool, according to one embodiment.

FIGS. 6A-6B depict a top view and perspective view, respectively, of an example frame structure 600 for a singulation tool 114, according to one embodiment. The frame structure 600 includes vertical support members 606A-G attached to the base 602 (e.g., via screws, bolts, brackets, etc.). In this embodiment, each vertical support member 606 includes one or more frame members 610 attached to the vertical support member 606 at different heights. As shown in FIG. 6B, for example, vertical support member 606A includes two frame members 610 and vertical support member 606B includes three frame members 610.

The frame members 610 provide a flat horizontal mounting surface for attaching to a singulation module 130. Here, each frame member 610 includes one or more clamp plates 612 that provides a flat mounting surface for magnetic lock(s) 502 of the apparatus 500. In general, the number of frame members 610 attached to a vertical support member 606 and/or the number of clamp plates attached to a frame member 610 may depend on the particular configuration (e.g., spiral, whirlpool, etc.) of the singulation tool 114.

In this embodiment, a mounting location for each singulation module 130 (e.g., apparatus 500) is provided by two frame members 610. Referring to FIG. 6A, the frame member 610 attached to the vertical support member 606A and the frame member 610 attached to the vertical support member 606E provide a first mounting location for a first apparatus 500. In this example, the magnetic locks 502A-C of the first apparatus 500 can secure to the frame structure 600 via clamp plates 612A-C, respectively. Still referring to FIG. 6A, a second mounting location for a second apparatus 500 is provided by the frame member 610 attached to the vertical support member 606E and the frame member 610 attached to the vertical support member 606. For example, the magnetic locks 502A-C of the second apparatus 500 can secure to the frame structure 600 via clamp plates 612D-F, respectively.

In some embodiments, the frame structure 600 can include an internal guard structure (or shielding) 620 to protect vertical support members 606E-G (e.g., from damage), prevent items from falling out of the singulation modules 130 into an interior of the frame structure 600, etc. The guard structure 620 can include any suitable material, e.g., plastic, metal, etc. In one particular embodiment, the guard structure 620 includes a polycarbonate material housed within a metallic (e.g., aluminum) frame. In some embodiments, the frame structure 600 can include pockets 622 integrated within the base 602 for transporting the singulation tool 114. For example, in one embodiment, the base 602 can be a pallet base with forklift pockets 622 (e.g., for easy transportation and reconfiguration on site).

FIG. 7 depicts a perspective view of an example frame structure 700 for a singulation tool 114, according to one embodiment. Compared to the frame structure 600, the frame structure 700 includes additional guard structure (or shielding) 702 at the opposite ends of vertical support members 606E-G. In particular, the guard structure 702 is located between each level (or tier) of singulation modules 130. The guard structure 702 can include any suitable material, e.g., plastic, metal, etc. In one particular embodiment shown in FIG. 7A, the guard structure 702 includes a polycarbonate material 706 housed within a metallic (e.g., aluminum) frame 704. The guard structures 702 may be mounted to the frame structure 700 via connecting members 710 (e.g., pipes, rods, etc.) which attach to one of vertical support members 606E-G. As shown in FIG. 7A, for example, a first end of the connecting member 710 is attached to the vertical support member 606E and a second (opposite) end of the connecting member 710 is attached to the guard structure 702 (e.g., via a strut channel, clamp plate, bolts, etc.). The guard structures 702 can be used to prevent items from falling out of the singulation modules 130 outside of the frame structure 700 (e.g., at the exterior sides).

As shown in FIG. 7B, in addition to the guard structure 702, the frame structure 700 includes corner structure members 720 located at the corners of the frame structure 700. Each corner structure member 720 includes a guard structure 722 (e.g., polycarbonate material) housed within a top frame member 724 and a bottom frame member 726. The top and bottom frame members 724 and 726 can be attached to each other via a clamp plate 728. The corner structure members 720 form curved corner guards that can be used to prevent items from falling out of the singulation modules 130 (e.g., at the corners). Further, in some cases, the corner structure members 720 can aid in singulation of items being transitioned through the singulation tool 114, e.g., by changing position of the items at the corners.

Figure 8B:
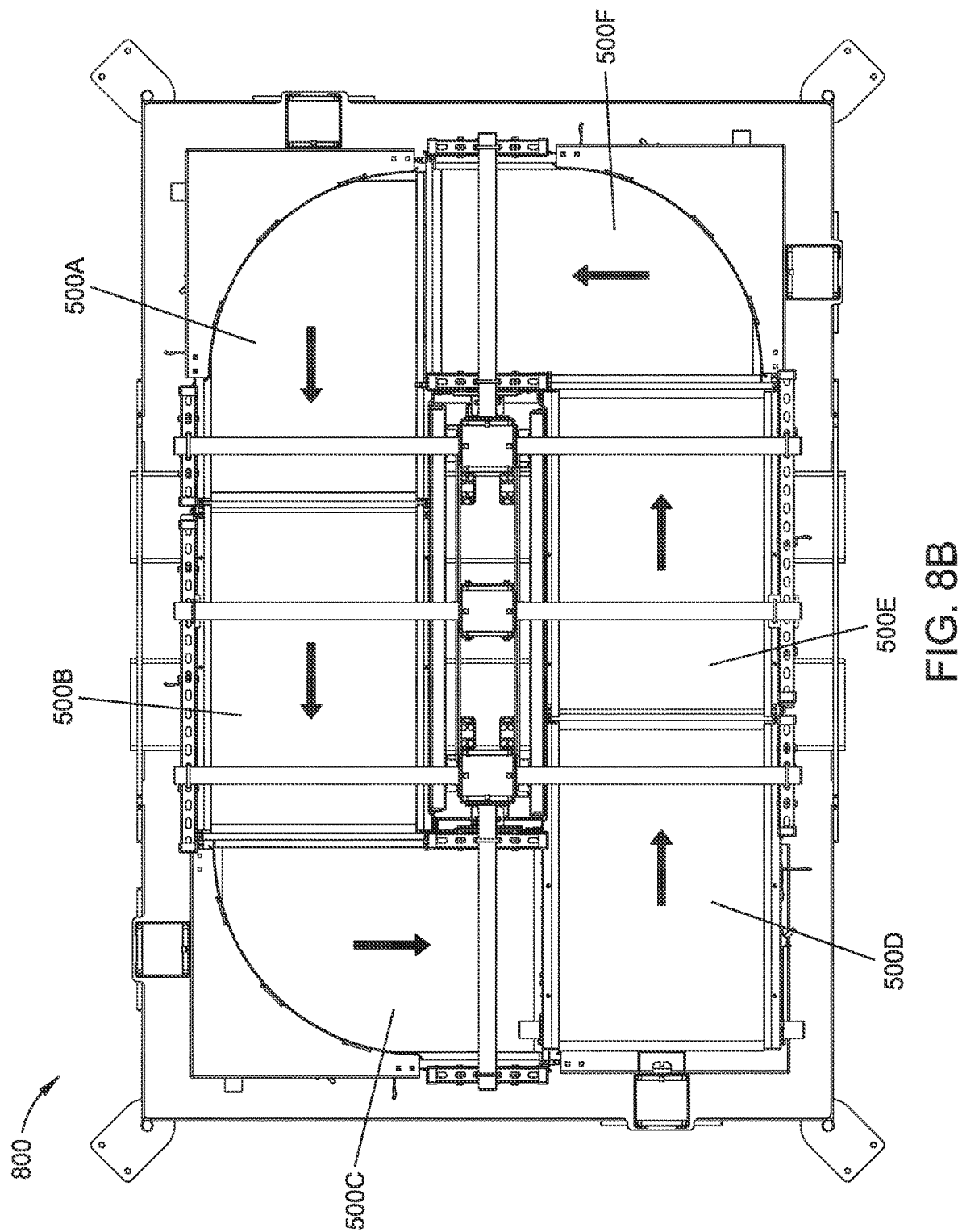
FIG. 8B illustrates a top view of an example singulation tool, according to one embodiment.

FIGS. 8A-8D depict different views of an apparatus 800 that can be used as the singulation tool 114, according to one embodiment. In particular, FIGS. 8A and 8B show a perspective view and a top view, respectively, of the apparatus 800 and FIGS. 8C and 8D show different side views of the apparatus 800. The apparatus 800 is one example of the singulation tool 114 depicted in FIGS. 1A-1B.

In this particular embodiment, the apparatus 800 includes multiple identical apparatuses 500A-N (e.g., singulation modules 130) deployed in a spiral configuration. Each apparatus 500 is an upstream singulation module and/or a downstream singulation module with respect to another apparatus 500 in the apparatus 800. That is, each apparatus 500 is disposed adjacent to another apparatus 500, such that the belt 512 of the apparatus 500 is at a height above or below the belt 512 of the other apparatus. For example, the first apparatus 500A is an upstream singulation module with respect to apparatus 500B, apparatus 500B is a downstream singulation module with respect to apparatus 500A and an upstream singulation module with respect to apparatus 500C, and so on. FIG. 8C1 shows one reference example of the waterfall height difference between apparatus 500M and apparatus 500N. FIG. 8D1 shows another reference example of the waterfall (corner) height difference between apparatus 500C and apparatus 500D.

The apparatus 800 may include apparatuses 500 deployed in multiple levels (or tiers) (e.g., as shown in FIG. 8C) of progressively lower heights. Each level corresponds to a predefined elevation (or height) range with respect to the ground. In this example, tier/level 1 includes apparatuses 500A-F, tier/level 2 includes apparatuses 500G-L, and tier/level 3 includes apparatuses 500M-N.

Figure 9B:
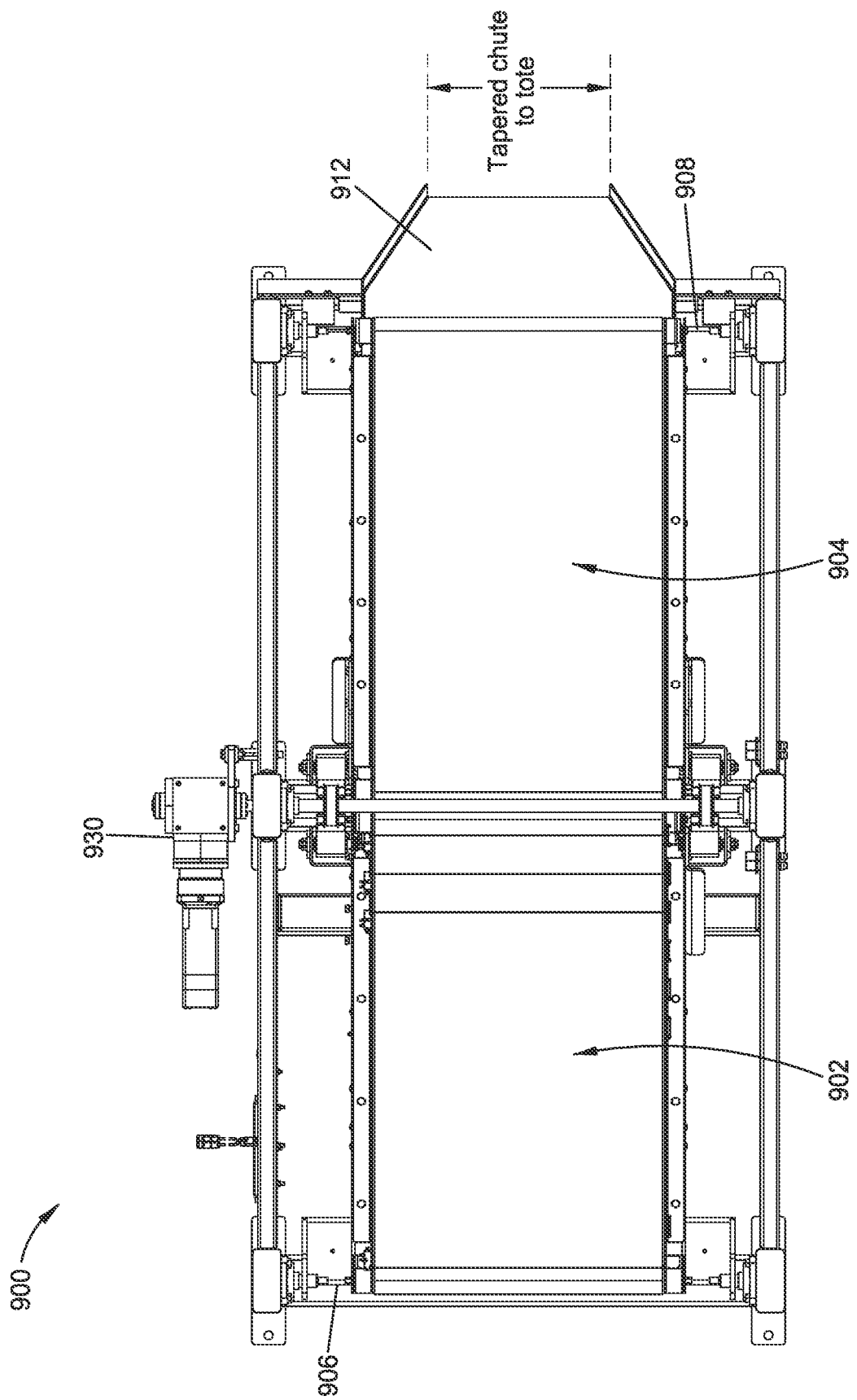
FIG. 9B illustrates a top view of an example divert tool, according to one embodiment.
Figure 9C:
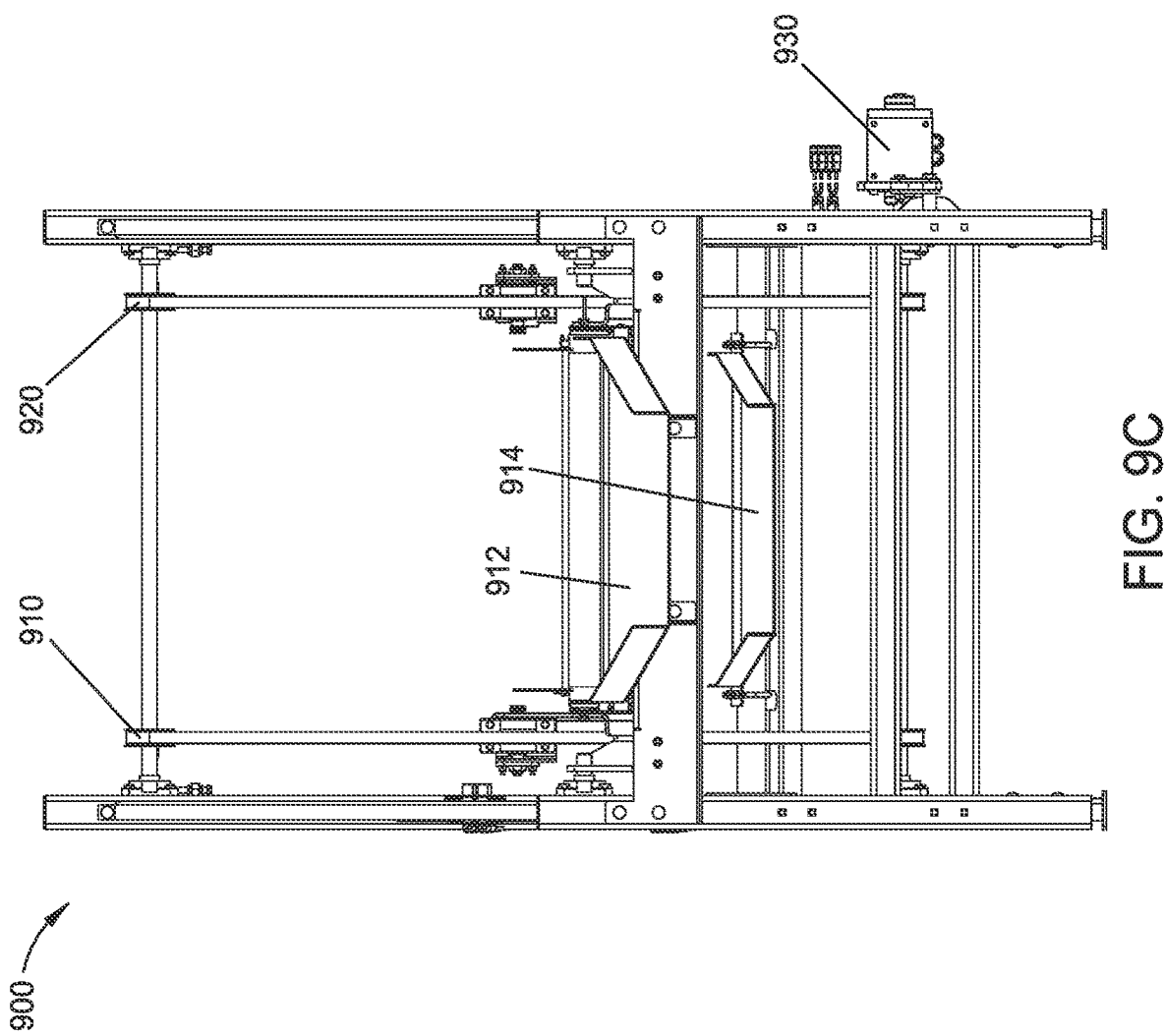
FIG. 9C illustrates a front view of an example divert tool, according to one embodiment.

FIGS. 9A-9C depict different views of an apparatus 900 that can be used for diverting (and/or passing through) items that exit the singulation tool 114, according to one embodiment. In particular, FIGS. 9A-9C show a perspective view, a top view, and a front view of the apparatus 900. The apparatus 900 is one example of the divert tool 118 depicted in FIGS. 1A-1B.

The apparatus 900 includes a first conveyor belt 902 and a second conveyor belt 904, each configured to rotate vertically around an end hinge point at the same time. For example, the first conveyor belt 902 is configured to rotate around roller 906 in a first vertical direction (e.g., negative z direction) and the second conveyor belt 904 is configured to rotate around roller 908 in a second vertical direction (e.g., positive z direction). The apparatus 900 includes a motor (e.g., servo motor) that drives two pulleys 910 and 920, e.g., in order to actuate both conveyor belts 902 and 904 simultaneously. As shown in FIG. 9A1, in some embodiments, the apparatus 900 can use a clamping mechanism 924 to suspend the end of the conveyor belt 904, e.g., in order to create identical ranges of motion between the two conveyor belts 902 and 904.

In one embodiment, the apparatus 900 can be used to pass through successfully singulated items that exit the scan tool 116 and/or divert unsuccessfully singulated (e.g., non-singulated) items back to the singulation tool 114. As shown in FIG. 9, the apparatus 900 includes a (tapered) chute 912 for passing through successfully singulated items from the second conveyor belt 904 and a chute 914 for diverting non-singulated items from the first conveyor belt 902. As shown in FIG. 9A1, in some embodiments, the apparatus 900 can include one or more sensors 922 (e.g., proximity sensors, over-travel sensors, etc.) attached to each conveyor belt to detect position of the conveyor belt (e.g., as it rotates). In one reference example of the conveyor belt 902 shown in FIG. 10, the conveyor belt 902 includes multiple laser sensors (or photoeyes) 1008 and 1006A-C for detecting items on the belt 1010. The laser sensors 1006A-C are used to trigger actuation of the conveyor belts 902 and 904. In one embodiment, for example, when all of the laser sensors 1006A-C are triggered (indicating presence of an item), the master controller 140 triggers rotation of the conveyor belt 902 and the conveyor belt 904.

Figure 11:
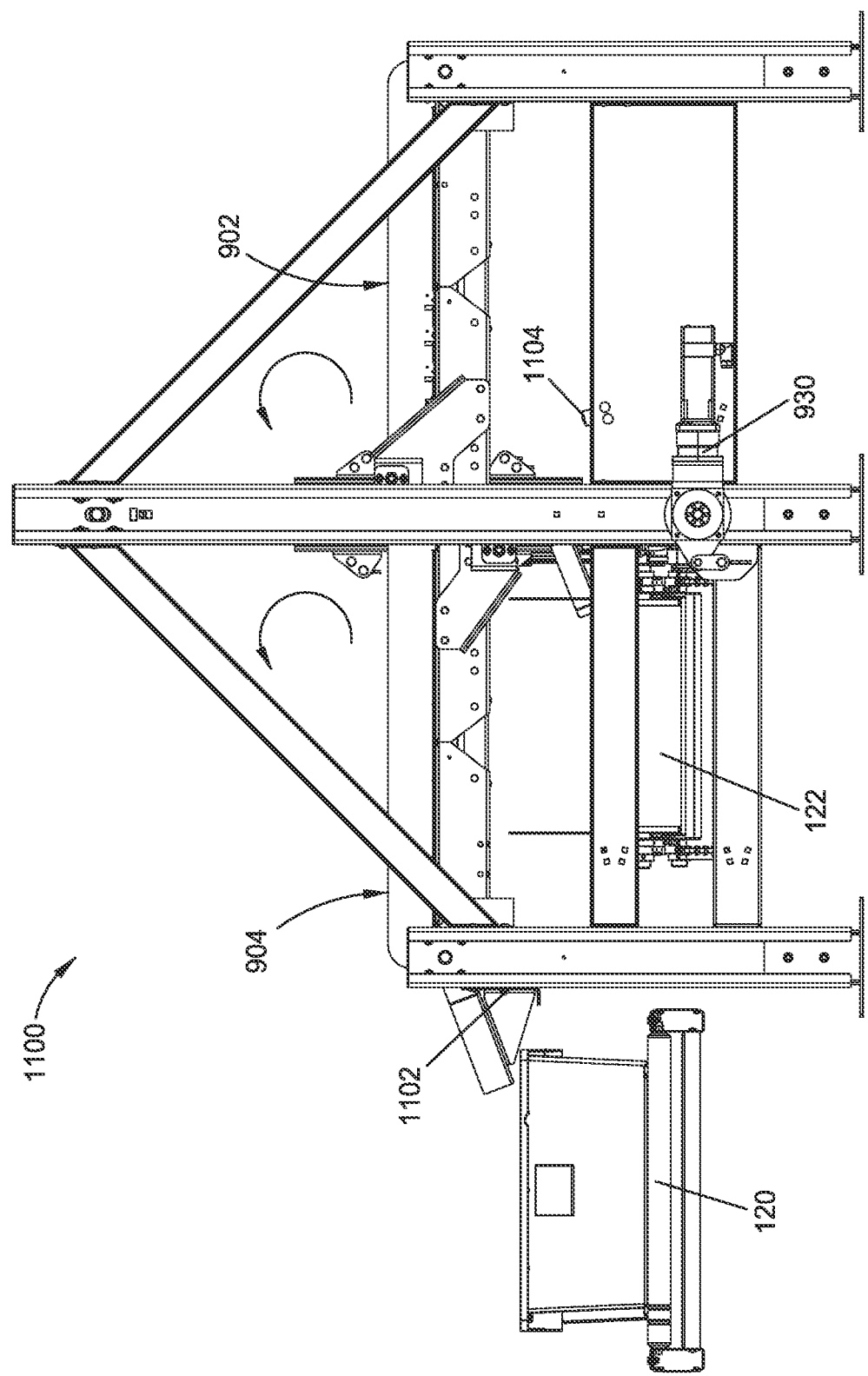
FIG. 11 illustrates a side view of an example divert tool, according to one embodiment.

FIG. 11 depicts a side view of an apparatus 1100 that can be used for diverting items that exit the singulation tool 114, according to one embodiment. The apparatus 1100 is one example of the divert tool 118. In this particular embodiment, the apparatus 1100 is configured to pass successfully singulated items through the conveyor belts 902 and 904 to a tote on the junction segment 120. Similarly, the apparatus 1100 is configured to divert (e.g., by rotating the conveyor belts 902 and 904 around their respective end hinge points) unsuccessfully singulated items to the junction segment 122, which is underneath the conveyor belt 904, for recirculation through the singulation tool 114.

In some embodiments, the apparatus 1100 includes stops (e.g., rubber stops) 1102 and 1104 as an additional fail-safe, e.g., to prevent the over-travel of the switching motion of conveyor belts 904 and 902, respectively. As shown, the motor 930 and control system 1006 (e.g., similar to controller 170) are mounted outside of the switch frame to improve access for maintenance.

Figure 12:
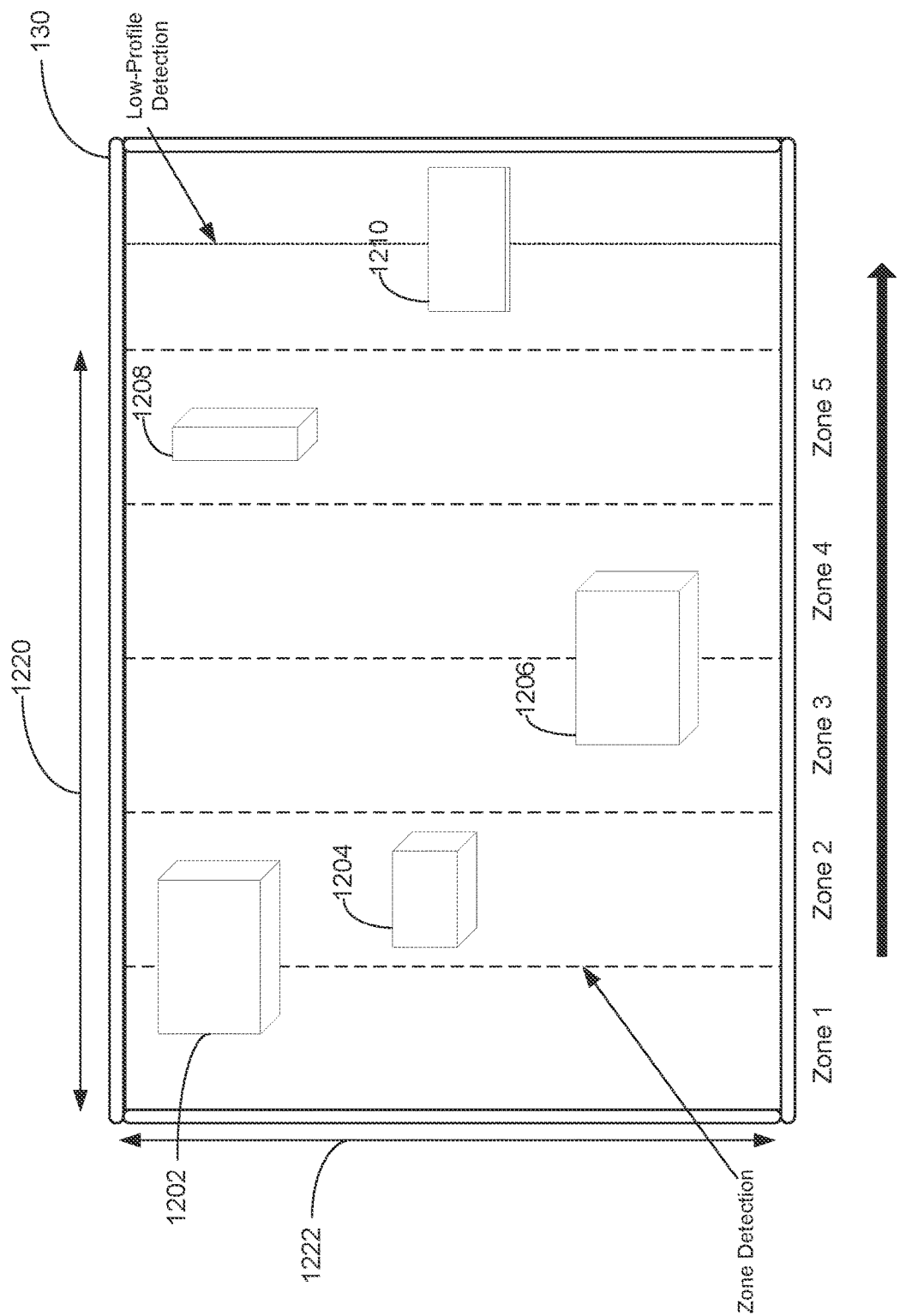
FIG. 12 illustrates an example scenario of item detection using multiple sensors on a singulation module, according to one embodiment.

As discussed above, each singulation module 130 can include multiple sensors (e.g., array sensors, laser sensors, etc.) for detecting items on the singulation module 130. In some embodiments, the singulation module 130 can use position (e.g., array) sensors to detect position of items on the singulation module 130. FIG. 12 illustrates one example of a singulation module 130 using an array sensor to detect location of items on the singulation module, according to one embodiment. In this embodiment, the singulation module 130 can detect items along a length 1220 (e.g., similar to sensing length 592) of the singulation module 130. In this example, the length 1220 is divided into five different (location) zones 1-5, where each location zone represents a different portion of the length 1220. Note that FIG. 12 uses five zones merely as a reference example of the number of location zones that can be detected with the array sensor. Those of ordinary skill in the art will recognize that the resolution (e.g., number of location zones) can be higher or lower (e.g., more or less than five). In general, the number of location zones is dependent on the number of emitter elements of the array sensor and the beam spacing between those emitter elements. Further, the "box" shaped items 1202, 1204, 1206, 1208, and 1210 generally represent items of various different shapes, sizes, configurations, etc.

In this particular embodiment, the singulation module 130 can determine which of the zones 1-5 a particular item is located in based on the particular beams (e.g., in the zone) that are blocked by an item. Using item 1208 as an example, the singulation module 130 can detect that item 1208 is in zone 5 based on the beams that are blocked by item 1208 (e.g., in zone 5). In another example, the singulation module can detect that an item (e.g., item 1206) is in multiple zones 3 and 4.

In some cases, the singulation module 130 may be unable to determine if there are multiple items present on the singulation module from the array sensor. For example, items 1202 and 1204 may appear as a single item to the array sensor, since at least a portion of the items 1202 and 1204 are in parallel. Additionally, in some cases, the array sensor may not be able to detect low-profile items (e.g., item 1210) on the singulation module. In these cases, the singulation module can use a laser sensor to detect low-profile items, such as item 1210. While the singulation module 130 can use the array sensor to detect position of items along length 1220, the array sensor may not be able to determine position of items along width 1222.

The master controller 140 independently controls the speed of each singulation module 130 within the singulation tool 114, based on sensor feedback from one or more of the singulation modules 130, the configuration of the singulation modules 130 (e.g., linear or perpendicular orientation with respect to other singulation modules 130), etc. In some embodiments, the master controller 140 controls the singulation modules 130, so that items are singulated to a specified gap distance in order to maintain a predetermined rate (e.g., UPH). In one example, the rate may be a predetermined number of units that exit the singulation tool 114 in a given time period. In another example, the rate may be a predetermined number of units that are scanned by the scan tool 116 (e.g., after exiting the singulation tool 114). As described below, to maintain the rate, the master controller 140 can control the singulation modules 130 to increase gaps between items as they transition through the singulation tool 114 and/or decrease gaps between items as they transition through the singulation tool 114.

Figure 13A:
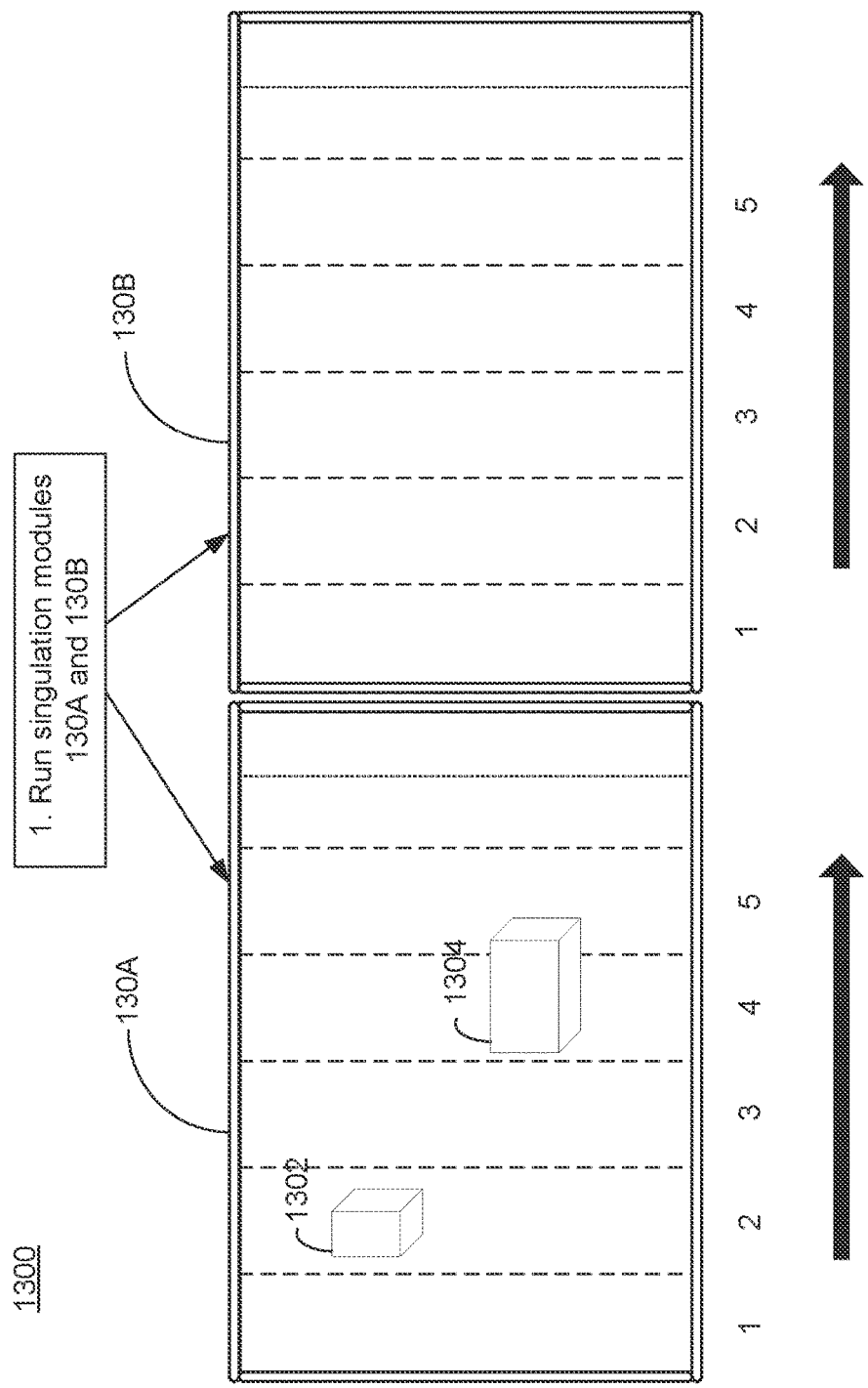
FIGS. 13A-C illustrate an example scenario of controlling singulation modules in a linear configuration, according to one embodiment.
Figure 13B:
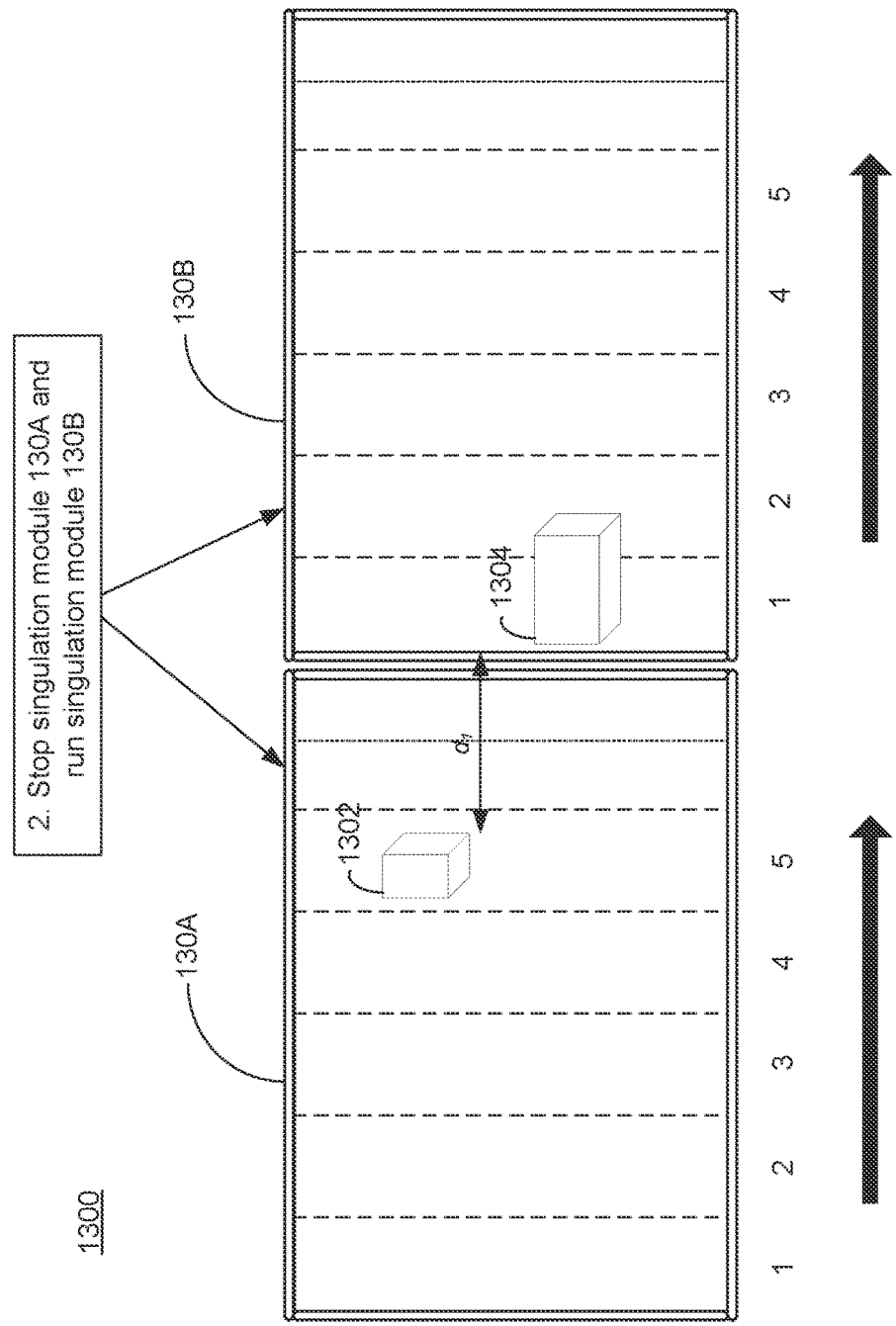
Figure 13C:
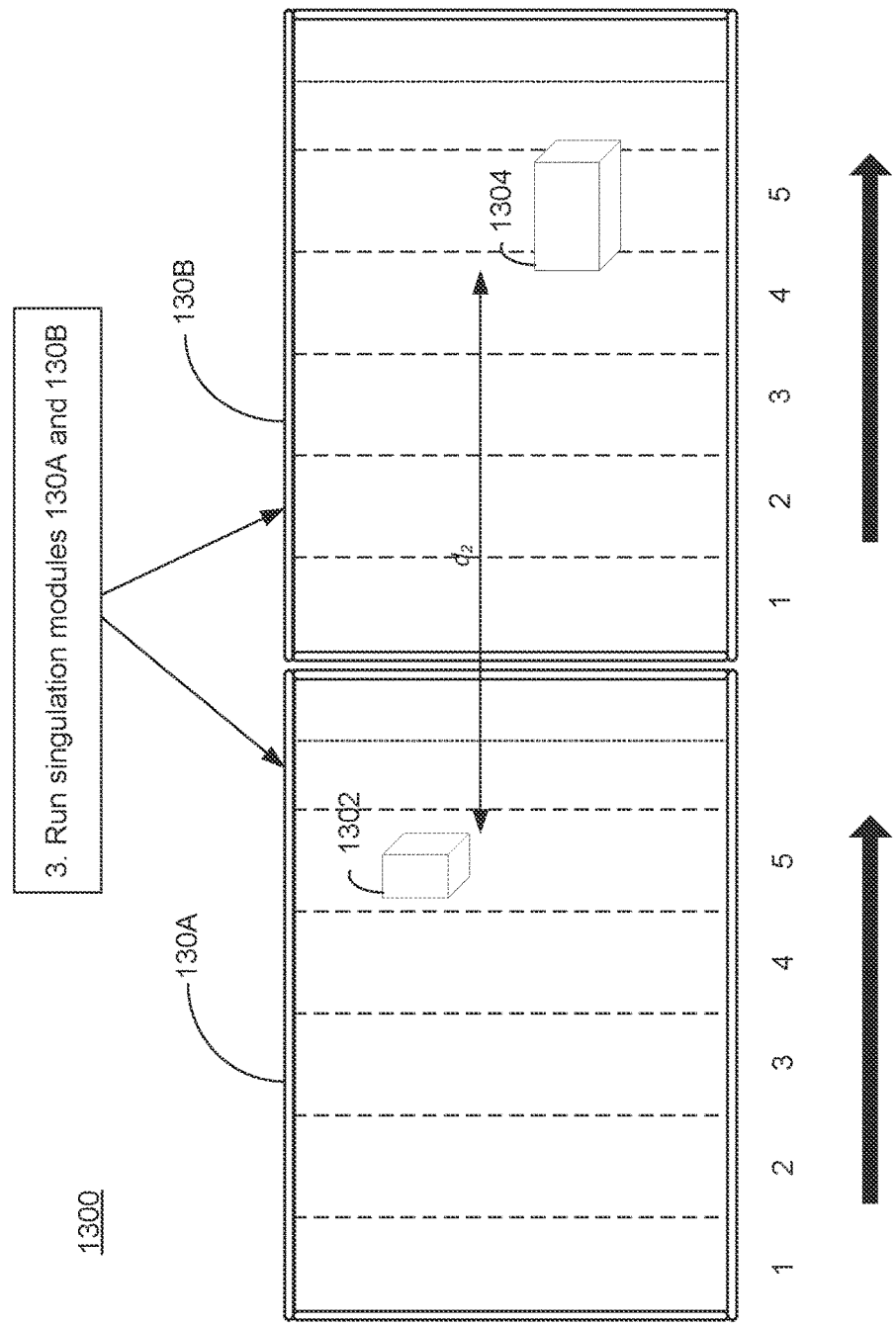

FIGS. 13A-C illustrate an example scenario 1300 of controlling singulation modules 130A-B that are in a linear configuration, according to one embodiment. Here, in FIG. 13A, the master controller 140 runs singulation modules 130A and 130B and can detect items 1302 and 1304 on singulation module 130A. In FIG. 13B, as the item 1304 transitions onto the singulation module 130B, the master controller 140 can determine whether the distance between items 1302 and 1304 satisfies a gap condition (e.g., gap is below a threshold distance for a predetermined rate), based on sensor feedback from singulation modules 130A and 130B regarding the triggered zones in each singulation module 130A and 130B.

Here, as shown in FIG. 13B, the master controller 140 determines that the distance ($d_1$) between the items 1302 and 1304 does not satisfy the gap condition (e.g., $d_1$ is below a threshold gap distance). In response, the master controller 140 stops singulation module 130A and runs singulation module 130B. Subsequently, as shown in FIG. 13C, the master controller 140 runs singulation modules 130A and 130B (e.g., after detecting that the distance $d_2$ between the items 1302 and 1304 satisfies the gap condition). In some embodiments, as opposed to stopping singulation module 130A and running singulation module 130B (e.g., after determining $d_1$ is below a threshold gap distance), the master controller 140 can reduce the speed of singulation module 130A relative to singulation module 130B or increase the speed of singulation module 130B relative to singulation module 130A. In some embodiments, the master controller 140 can determine the distance $d_1$ and $d_2$ based on sensor feedback indicating the zones that are triggered and motor feedback indicating the speeds of each of the singulation modules 130A and 130B.

Figure 14A:
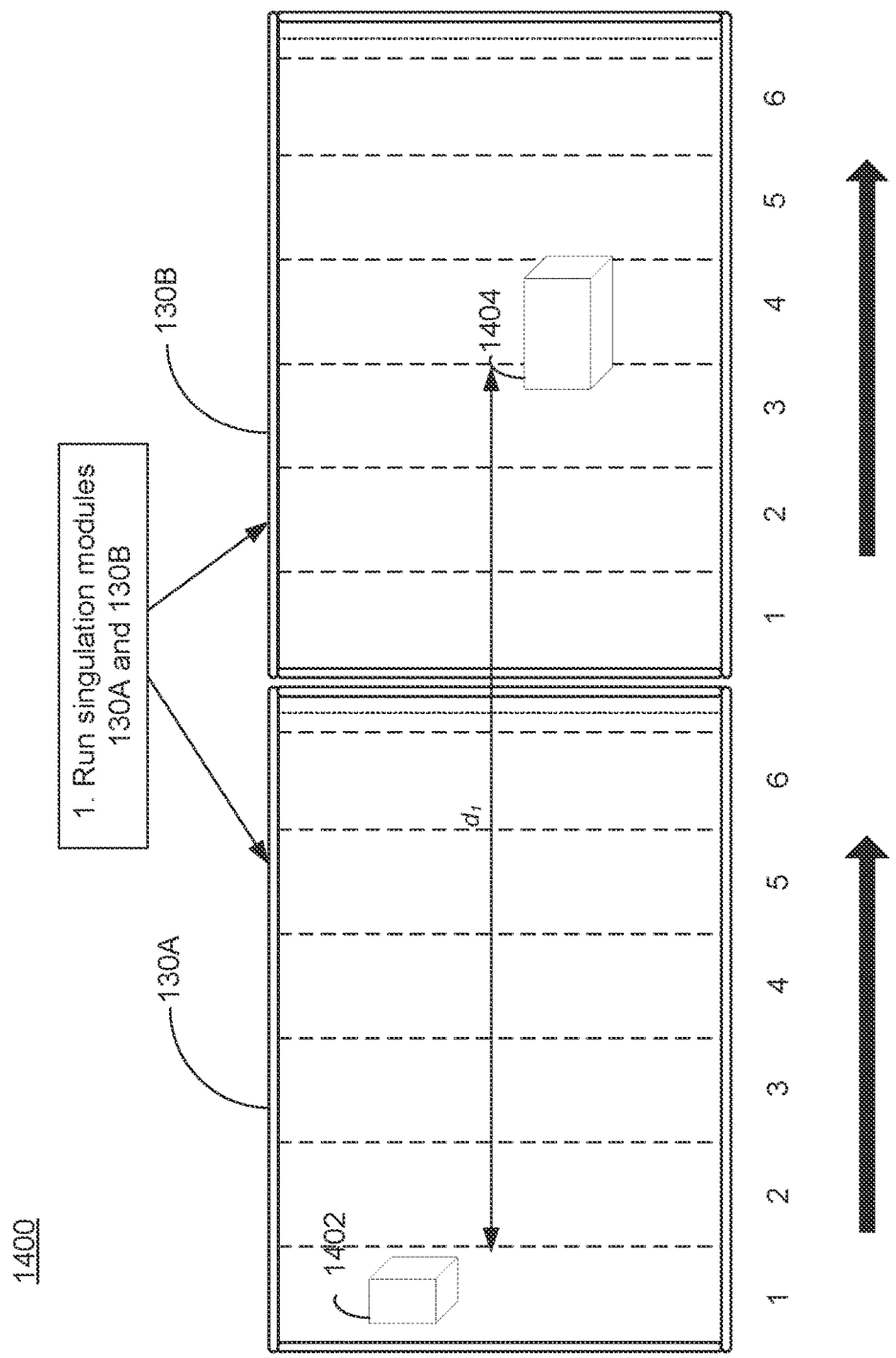
FIGS. 14A-C illustrate another example scenario of controlling singulation modules in a linear configuration, according to one embodiment.
Figure 14B:
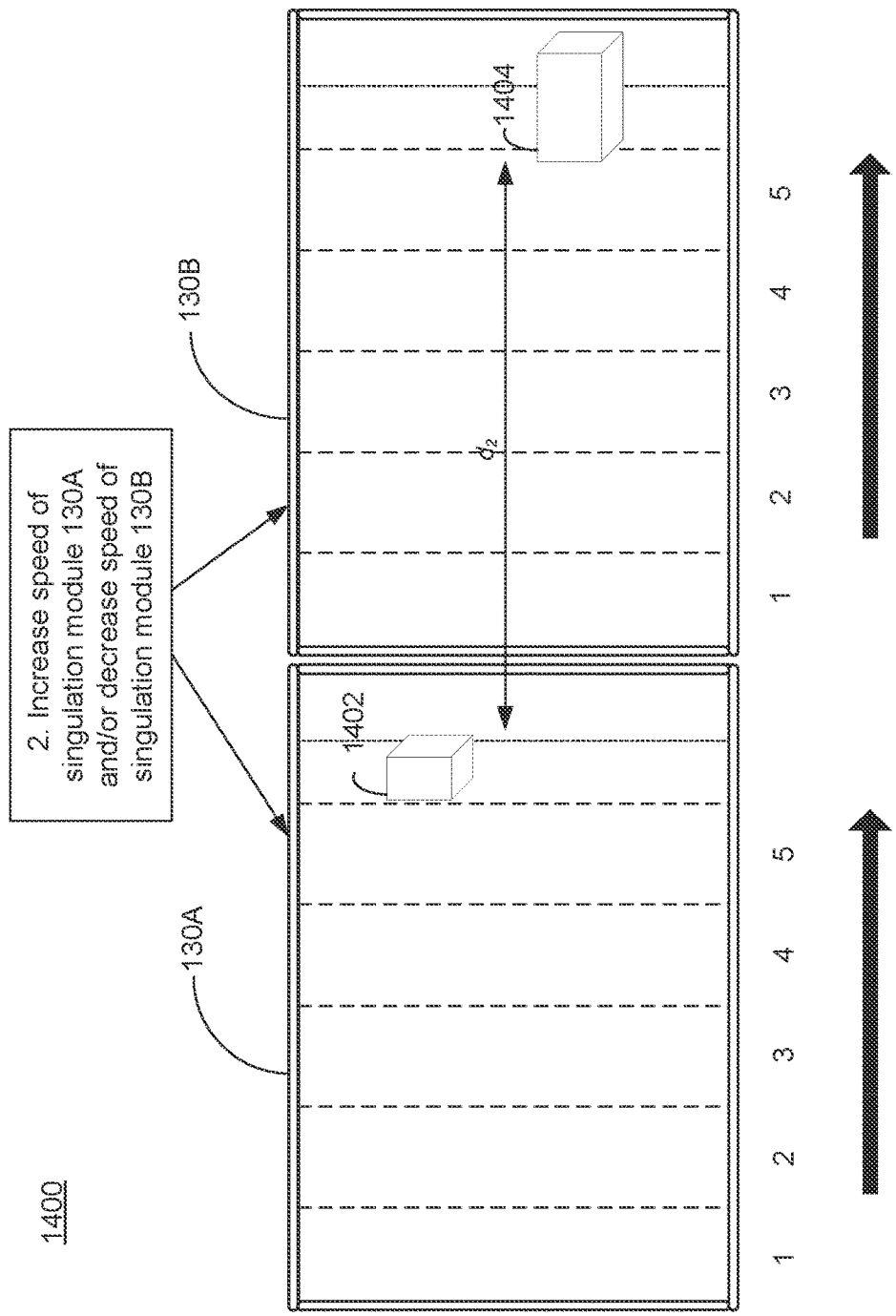
Figure 14C:
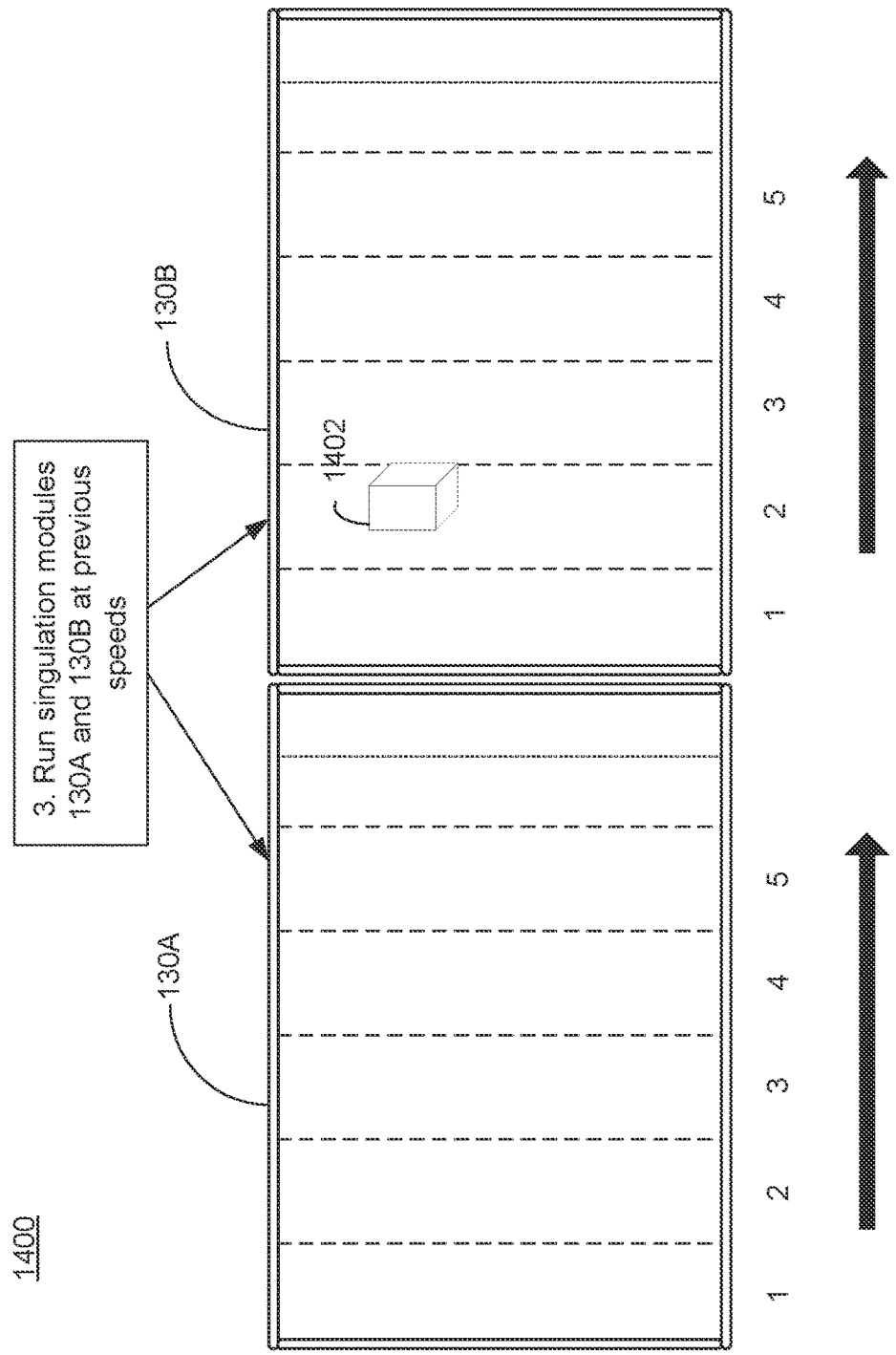

FIGS. 14A-C illustrate an example scenario 1400 of controlling singulation modules 130A-B that are in a linear configuration, according to one embodiment. As shown in FIG. 14A, when item 1404 is in zone 4 of singulation module 130B, the item 1402 is in zone 1 of singulation module 130A. The master controller 140 can determine that the distance $d_1$ between items 1402 and 1404 does not satisfy a gap condition (e.g., $d_1$ is greater than a threshold distance) for a predetermined rate. In response, the master controller 140 (as shown in FIG. 14B) increases the speed of singulation module 130A, e.g., to decrease the gap distance between items 1402 and 1404 from $d_1$ to $d_2$. As shown in FIG. 14C, the master controller 140 resumes running singulation modules 130A and 130B at their respective previous speeds. In some embodiments (not shown), the master controller 140 may stop singulation module 130B (or decrease the speed of singulation module 130B) and continue to run singulation module 130A, e.g., to decrease the gap distance between items 1402 and 1404 from $d_1$ to $d_2$.

Figure 15B:
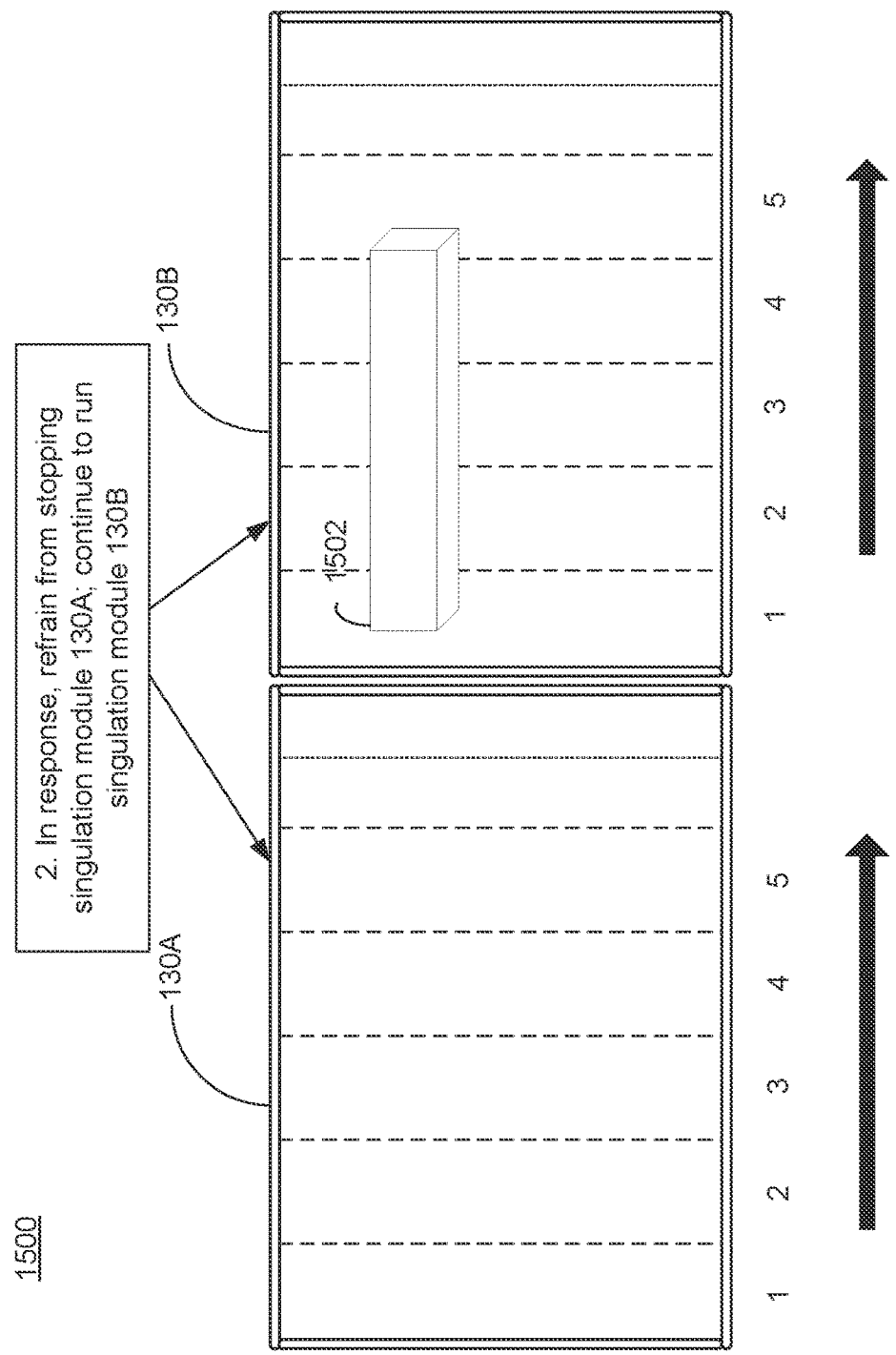

FIGS. 15A-B illustrate an example scenario 1500 of controlling singulation modules 130A-B in jamming conditions, according to one embodiment. In some cases, a jamming condition can occur in scenarios where long items (or obtuse or irregular items) transition from one singulation module (e.g., singulation module 130A) to another singulation module (e.g., singulation module 130B). In FIG. 15A, for example, as the item 1502 begins to transition onto the singulation module 130B, the item 1502 is detected by the presence (e.g., laser) sensor on singulation module 130A. In one reference example, the presence sensor on singulation module 130A can return to the master controller 140 a value of "1" for "item detected" to indicate that an item is present at the edge of the singulation module 130A. In this particular scenario, if the master controller 140 determines there has been no change in the state of the presence sensor for a predetermined amount of time, the master controller 140 may refrain from stopping singulation module 130A. Here in FIG. 15A, for example, the master controller 140 determines that there has been no change in the value for "item detected" from the presence sensor for a predetermined amount of time (e.g., the value of "1" has not changed). In response, master controller 140 continues to run singulation modules 130A and 130B (e.g., as opposed to stopping singulation module 130A when a portion of item 1502 is detected on singulation module 130B) to prevent item 1502 from getting stuck (or jammed) between singulation module 130A and singulation module 130B. In this manner, the master controller 140 can prevent jamming conditions that may occur in the singulation tool 114.

Figure 16B:
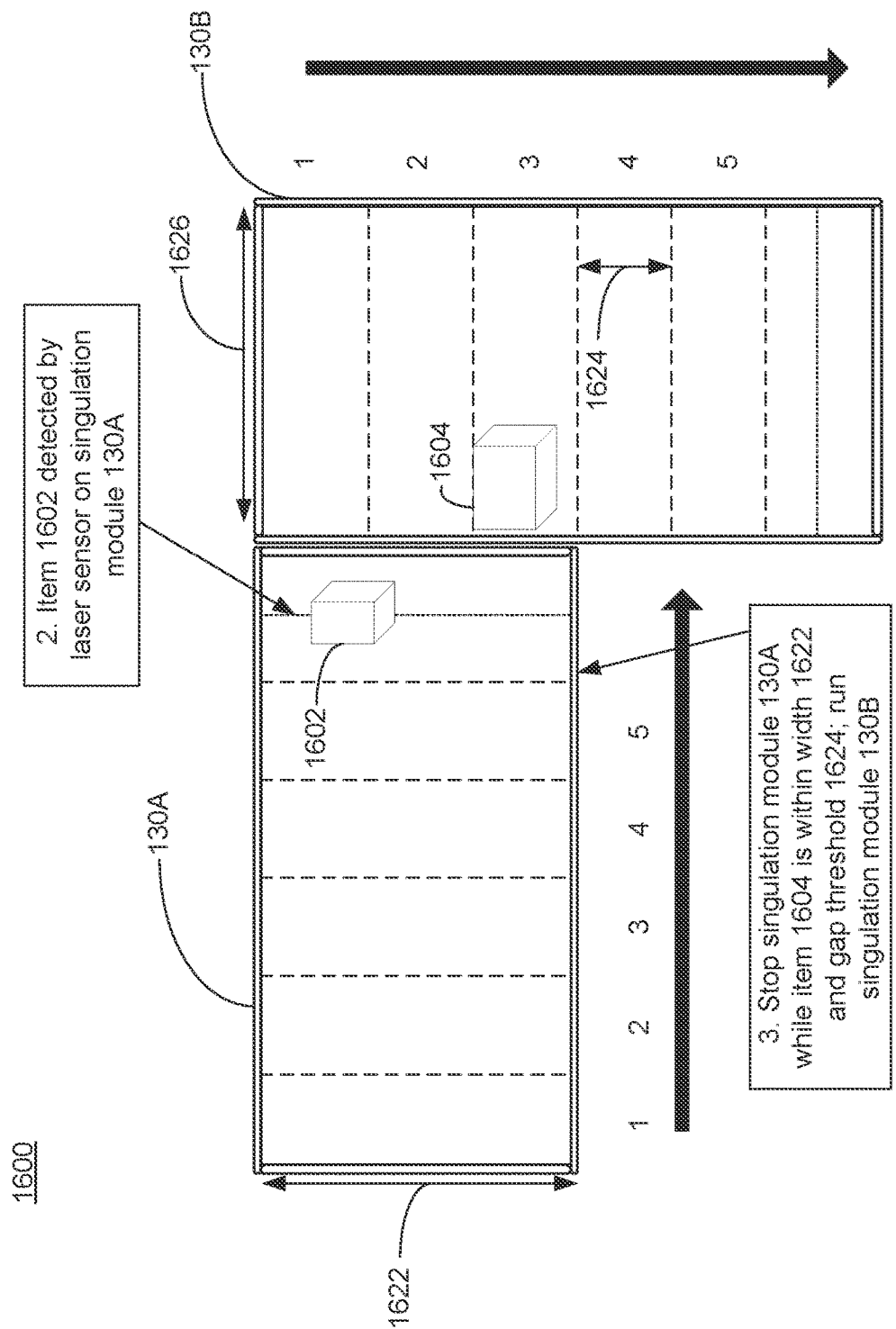

FIGS. 16A-C illustrate an example scenario 1600 of controlling singulation modules 130A-B that are in a perpendicular configuration, according to one embodiment. Here, in FIG. 16A, the master controller 140 runs singulation modules 130A and 130B and can detect items 1602 and 1604 on singulation module 130A. In FIG. 16B, as the item 1604 transitions onto the singulation module 130B, the item 1602 is detected by the laser sensor on singulation module 130A. In some embodiments, the master controller 140 at this point can decide whether to continue running singulation module 130A based on the position of the item 1604 on singulation module 130B. Here, for example, after the master controller 140 detects item 1602 with the laser sensor on singulation module 130A, the master controller 140 determines whether the item 1604 is within a predefined region on singulation module 130B. In this example, the predefined region on singulation module 130B corresponds to zones 1-3 with an area approximately equal to the width 1622 of the singulation module 130A times the width 1626 of the singulation module 130B.

Because the master controller 140 may not be able to determine the exact position of the item 1602 on singulation module 130A along the width 1622, the master controller 140 may refrain from running singulation module 130A (e.g., when item 1602 is detected by the laser sensor on singulation module 130A) until it can determine that the item 1604 (and other items that may be present on singulation module 130B) has cleared the predefined region and the minimum gap distance 1624 from the predefined region. Doing so allows the master controller 140 to ensure that at least a minimum gap distance 1624 exists between items on the singulation module 130B and the singulation module 130A, e.g., in cases where the item 1602 is located on the bottom side edge of the singulation module 130A. Thus, as shown in FIG. 16B, after detecting item 1602 with the laser sensor on singulation module 130A, the master controller 140 stops singulation module 130A while the item 1604 is within width 1622 and minimum gap distance 1624, and runs singulation module 130B. Subsequently, as shown in FIG. 16C, the master controller 140 runs both singulation modules 130A and 130B, e.g., after the item 1604 has cleared the minimum gap distance 1624.

Figure 17A:
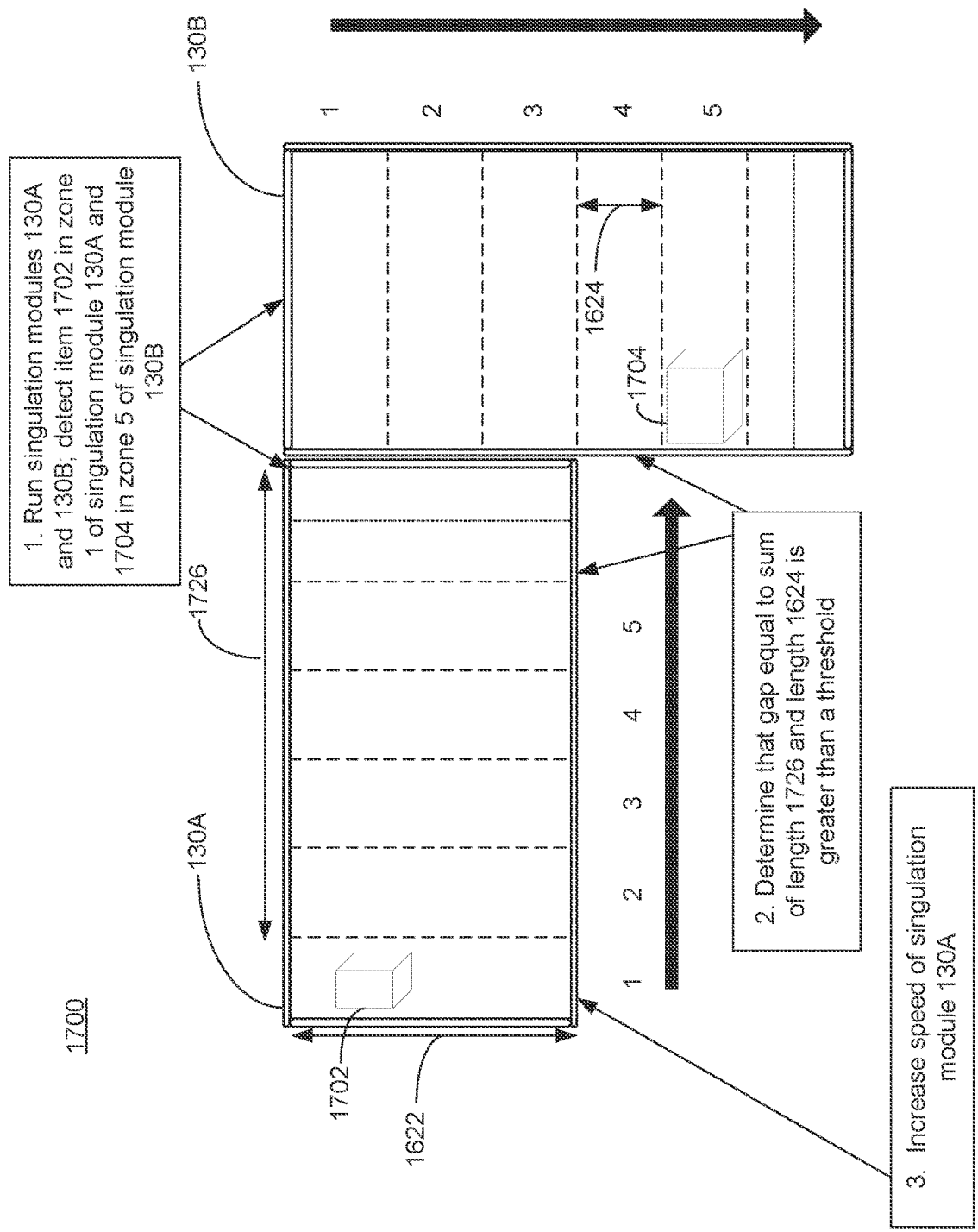
FIGS. 17A-B illustrate another example scenario of controlling singulation modules in a perpendicular configuration, according to one embodiment.
Figure 17B:
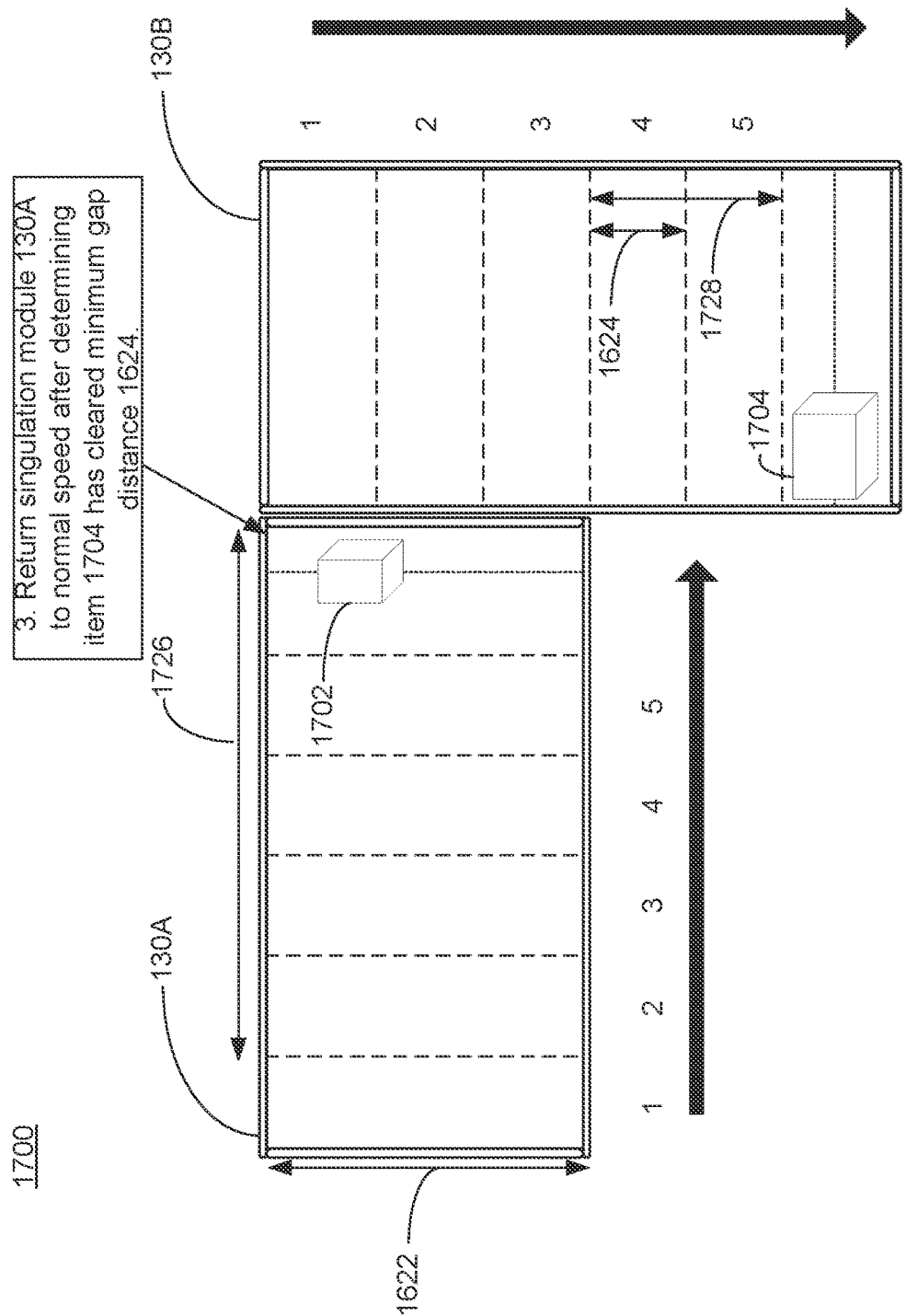

FIGS. 17A-C illustrate an example scenario 1700 of controlling singulation modules 130A-B that are in a perpendicular configuration, according to one embodiment. As shown in FIG. 17A, when item 1704 is in zone 5 of singulation module 130B, the item 1702 is in zone 1 of singulation module 130A. Here, the master controller 140 may determine that the minimum gap between the items 1704 and 1702 is approximately equal to the sum of length 1726 and minimum gap distance 1624, and that the minimum gap is greater than a threshold distance (e.g., for a predetermined rate). In response, the master controller (as shown in FIG. 17B) increases the speed of singulation module 130A, e.g., to decrease at least a portion of the length 1726. In some embodiments, once the item 1702 is detected by the laser sensor on singulation module 130A, the master controller 140 may determine whether any items on singulation module 130B are within the predefined region before transitioning the item 1702 onto the singulation module 130B. As shown in FIG. 17B, the master controller 140 returns the singulation module 130A to normal speed after determining that the item 1704 has cleared the minimum gap distance 1624. Here, for example, the item 1704 is at a distance 1728 away from the predefined region.

Figure 18A:
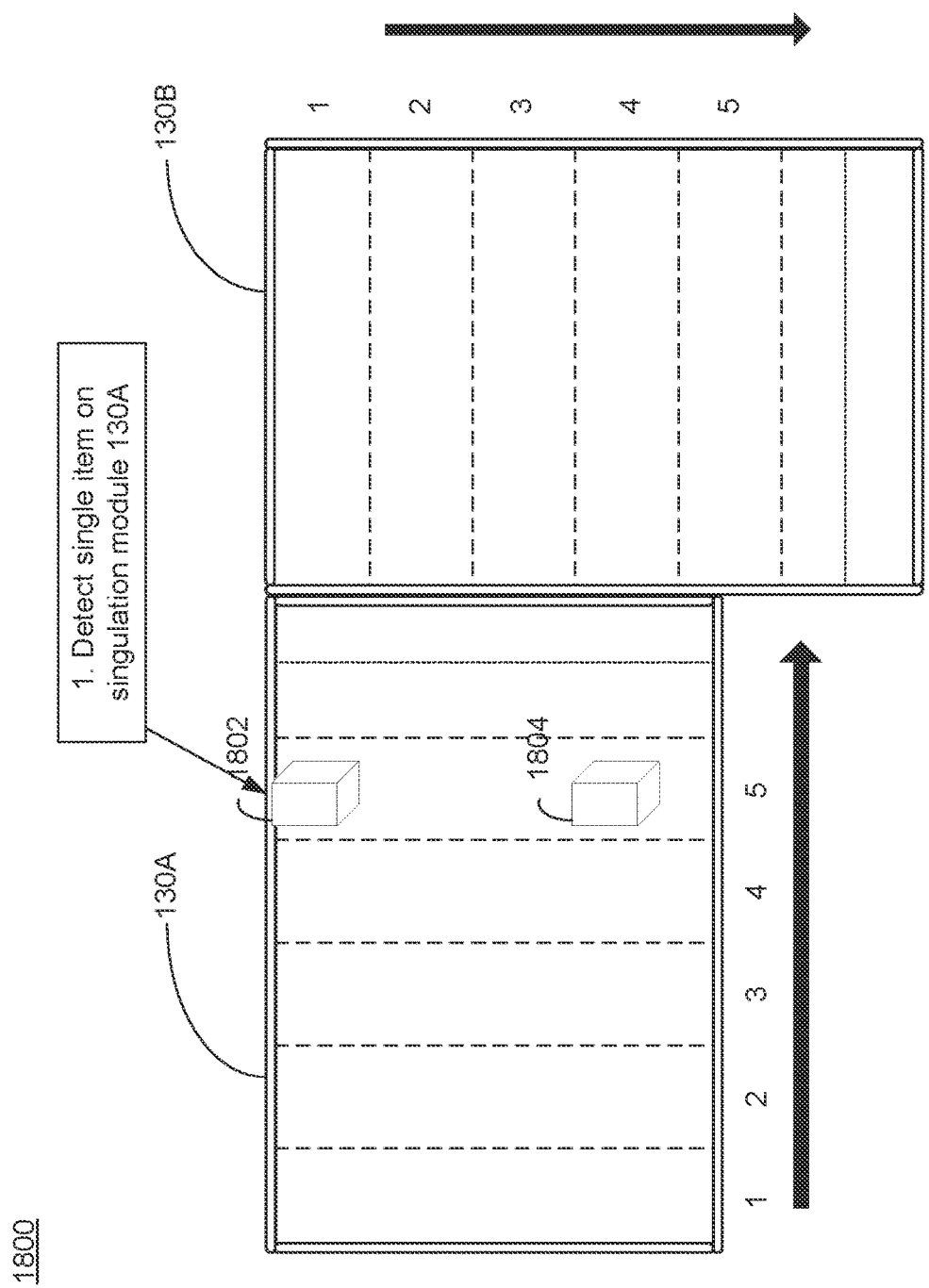
FIGS. 18A-B illustrate an example scenario of item detection when transitioning between singulation modules, according to one embodiment.
Figure 18B:
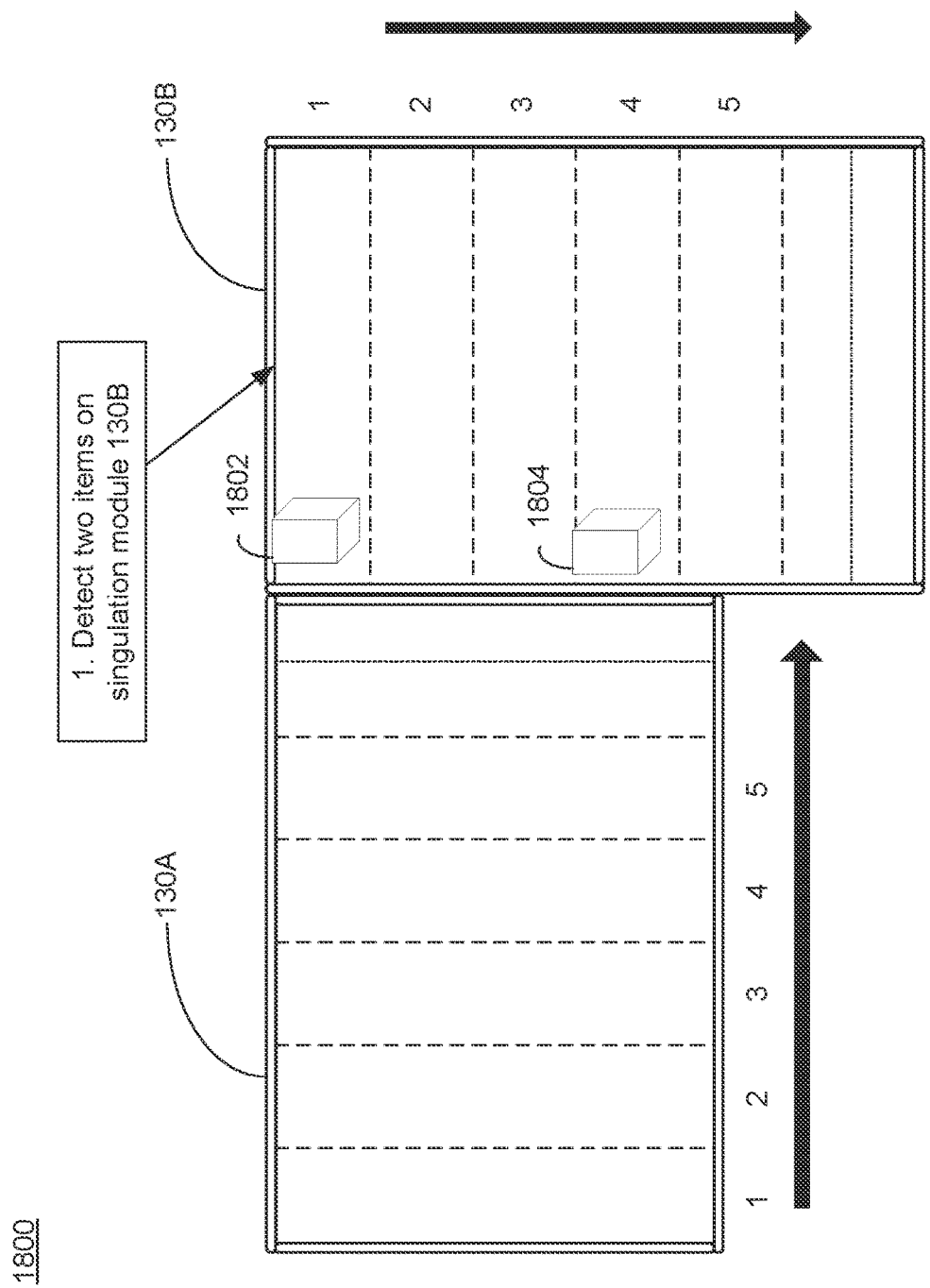

FIGS. 18A-B illustrate an example scenario 1800 of item detection when transitioning between singulation modules 130A-130B in a perpendicular configuration, according to one embodiment. As noted above, in some cases, multiple items may not be detected by the singulation module, e.g., if the items are parallel with respect to one another in the same zone. As shown in FIG. 18A, for example, the singulation module 130A may infer that there is an item present in zone 6 of the singulation module 130A, but may not be able to detect that there are two items 1802 and 1804. To address this problem, embodiments can deploy singulation modules in a perpendicular configuration, e.g., at various locations within the singulation tool 114, to increase the chances for item detection, and in turn singulation. As shown in FIG. 18B, for example, as the items 1802 and 1804 transition from singulation module 130A to singulation module 130B, item 1802 is detected in zone 1 of the singulation module 130B and item 1804 is detected in zone 4 of the singulation module 130B.

Figure 19:
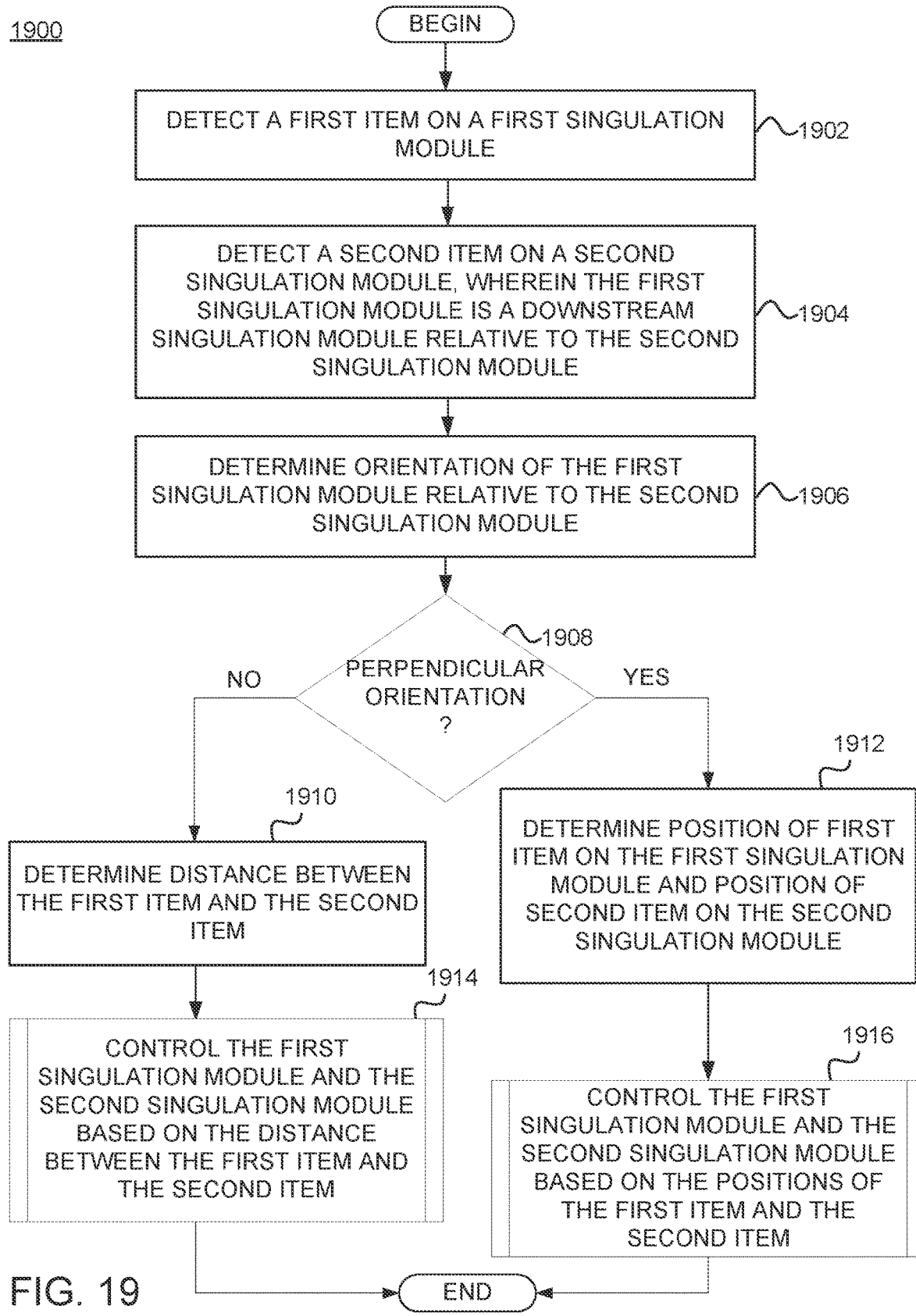
FIG. 19 is a flowchart illustrating a method for singulating items using multiple singulation modules, according to one embodiment.

FIG. 19 is a flowchart illustrating a method 1900 for singulating items using multiple singulation modules (e.g., singulation modules 130, such as apparatus 500), according to one embodiment. The method 1900 may be performed by the control system 102.

The method 1900 begins at block 1902, where the control system 102 detects a first item on a first singulation module (e.g., singulation module 130B). At block 1904, the control system 102 detects a second item on a second singulation module (e.g., singulation module 130A). The first singulation module is a downstream singulation module relative to the second singulation module. At block 1906, the control system 102 determines an orientation (or configuration) of the first singulation module relative to the second singulation module. For example, in one embodiment, the control system 102 determines whether the first and second singulation modules are in a perpendicular orientation or in a linear orientation.

If, at block 1908, the control system 102 determines the first and second singulation modules are not in a perpendicular orientation (e.g., the control system 102 determines the first and second singulation modules are in a linear configuration), the control system 102 determines a distance between the first item and the second item (block 1910). In some embodiments, the control system 102 can determine the distance between the first item and the second item based on at least one of: (1) the speed of each of the first singulation module and the second singulation module and (2) the particular zones triggered by the items (e.g., zone 1 of the first singulation module may have a predefined distance to zone 3 of the second singulation module, etc.). At block 1914, the control system 102 controls the first singulation module and the second singulation module based on the distance between the first item and the second item.

If, at block 1908, the control system 102 determines the first and second singulation modules are in a perpendicular orientation, the control system 102 determines the position of the first item on the first singulation module and the position of the second item on the second singulation module (block 1912). For example, as discussed above with regard to FIGS. 16A-C, the control system 102 can determine the position of the first item (e.g., item 1604) along a length of the first singulation module and determine the position of the second item (e.g., item 1602) along a length of the second singulation module. At block 1916, the control system 102 controls the first singulation module and the second singulation module based on the position of the first item on the first singulation module and the position of the second item on the second singulation module. In one embodiment, for example, as discussed above with regard to FIGS. 16A-C, after the first item transitions to the first singulation module, the control system 102 may continue to run the second singulation module until the second item reaches (and is detected by) the laser sensor on the second singulation module. In this embodiment, the control system 102 may refrain from running the second singulation module, e.g., when the second item reaches the laser sensor on the second singulation module and when the first item is still within a predefined region (and/or a minimum gap distance from the predefined region) on the first singulation module. Similarly, in this embodiment, the control system 102 may run the second singulation module, e.g., when the first item has cleared the minimum gap distance from the predefined region on the first singulation module.

Figure 20:
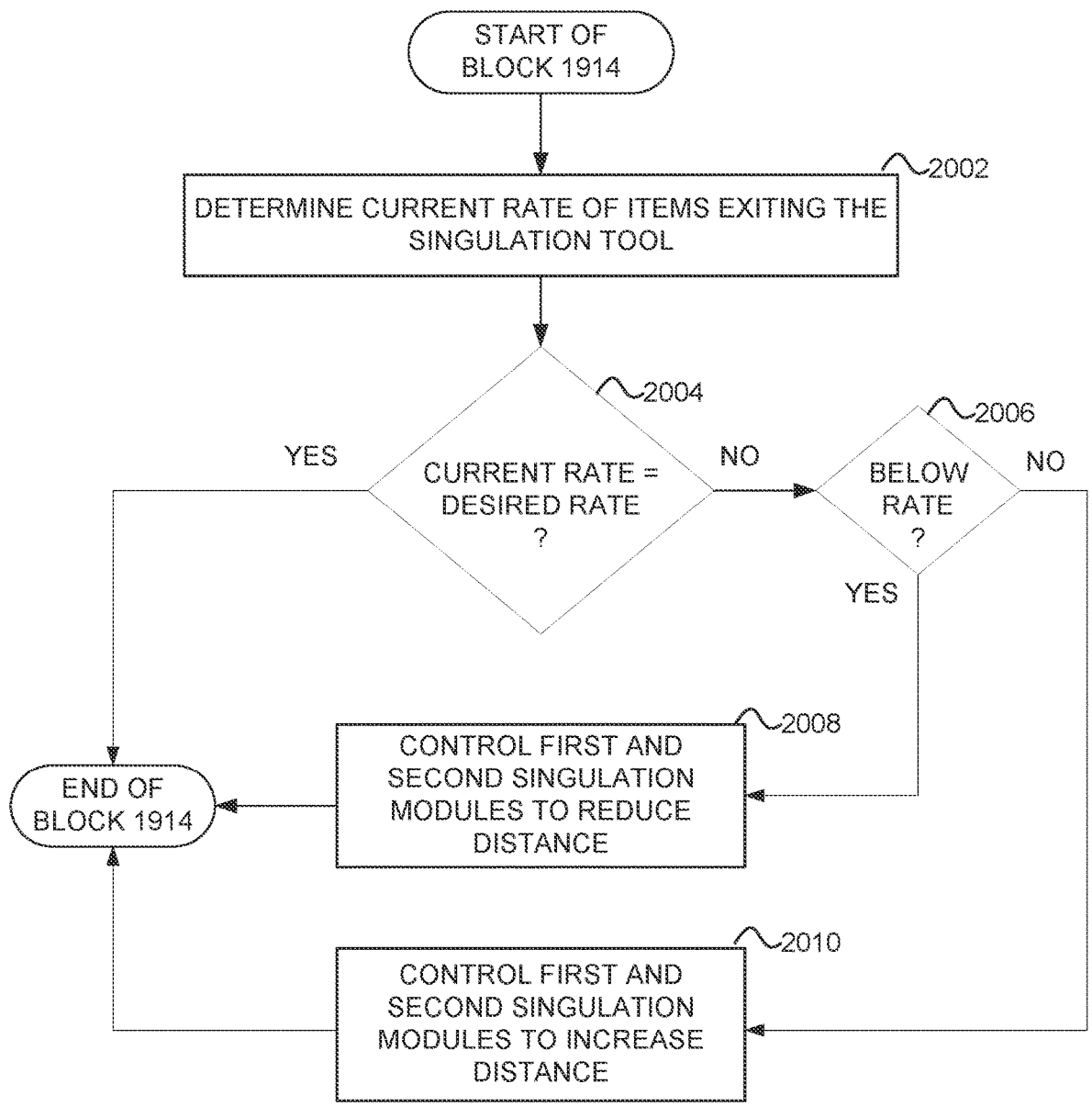
FIG. 20 is a flowchart illustrating a method for controlling singulation modules in a linear configuration, according to one embodiment.

FIG. 20 is a flowchart illustrating a method 2000 for controlling singulation modules in a linear orientation (e.g., singulation modules 130, such as apparatus 500), according to one embodiment. The method 2000 begins at the start of block 1914 of the method 1900. The method 2000 may be performed by the control system 102.

The method 2000 begins at block 2002, where the control system 102 determines a current rate of items exiting the singulation tool (e.g., singulation tool 114). In one embodiment, the control system 102 can determine the current rate based on a number of items detected by the last downstream singulation module (e.g., apparatus 500N) of the singulation tool 114 within a time period. At block 2004, the control system 102 determines if the current rate is equal to the desired rate (or, in some embodiments, within a threshold range of the desired rate). If so, the method ends.

If the current rate is not equal to the desired rate (or is not within a threshold range of the desired rate), the control system 102 determines if the singulation tool is below the desired rate (or above the desired rate) (block 2006). If the singulation tool is below the desired rate, the control system 102 controls the first and second singulation modules to reduce the distance between the first and second items (e.g., in order to increase the current rate) (block 2008). If the singulation tool is not below the desired rate (e.g., the singulation tool is above the desired rate), the control system 102 controls the first and second singulation modules to increase the distance between the first and second items (e.g., in order to reduce the current rate) (block 2010).

Figure 21:
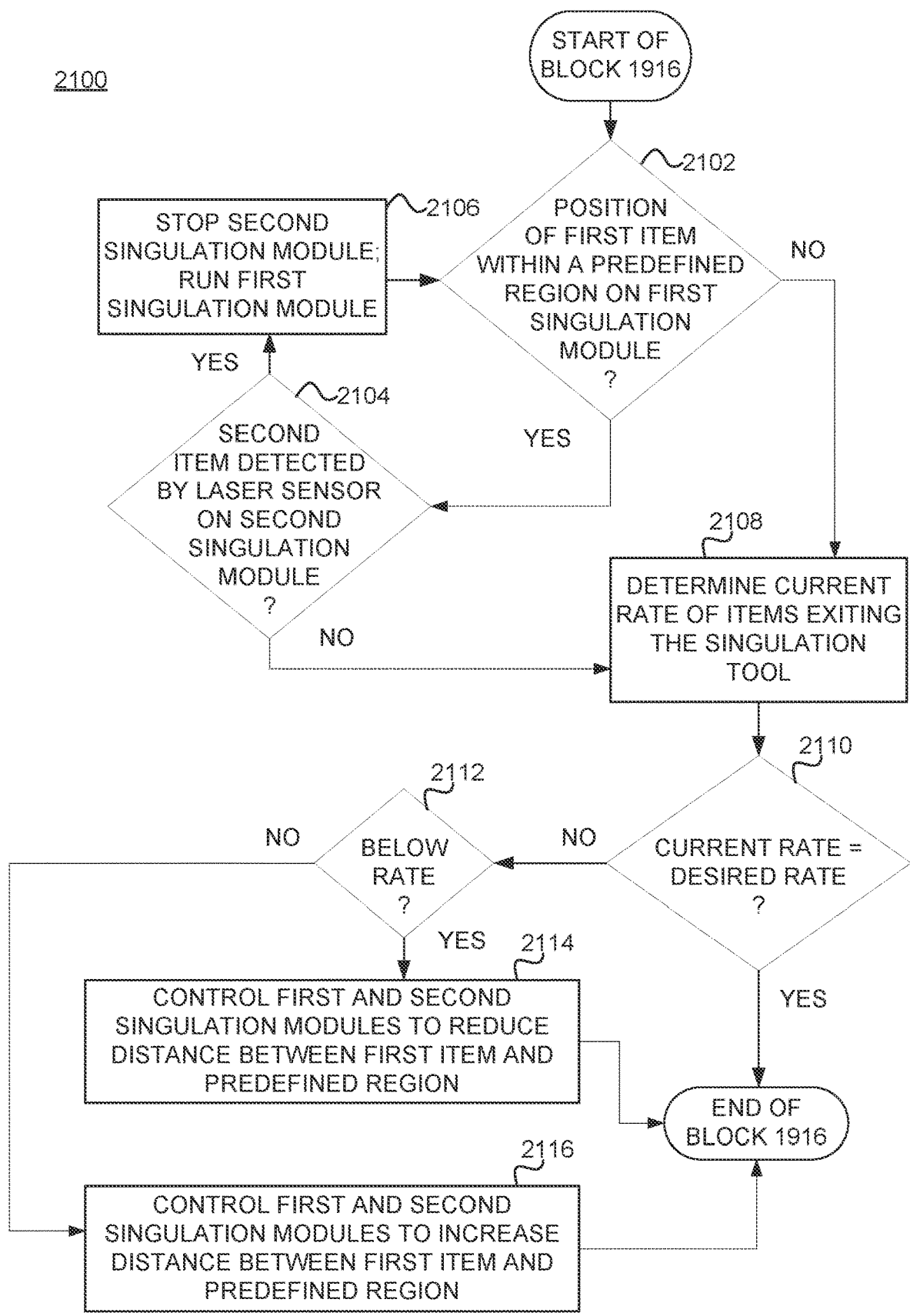
FIG. 21 is a flowchart illustrating a method for controlling singulation modules in a perpendicular configuration, according to one embodiment.

FIG. 21 is a flowchart illustrating a method 2100 for controlling singulation modules in a perpendicular orientation (e.g., singulation modules 130, such as apparatus 500), according to one embodiment. The method 2100 begins at the start of block 1916 of the method 1900. The method 2100 may be performed by the control system 102.

The method 2100 begins at block 2102, where the control system 102 determines whether the position of the first item on the first singulation module is within a predefined region on the first singulation module. For example, in one embodiment, the predefined region may have an area approximately equal to the width of the second singulation module times the width of the first singulation module. The predefined region on the first singulation module may start from a first end of the belt on the first singulation module and extend along a length of the belt on the first singulation module. If, at block 2102, the control system 102 determines the first item is within the predefined region, the control system 102 determines whether the second item has been detected by the laser sensor on the second singulation module (e.g., whether the position of the second item has reached the laser sensor on the second singulation module) (block 2104). If the second item is detected by the laser sensor, the control system 102 stops the second singulation module and continues to run the first singulation module (block 2106).

If the control system 102 determines the second item has not been detected by the laser sensor (block 2104), the method proceeds to block 2106. In one embodiment, the control system 102 may continue to run the second singulation module if the second item has not been detected by the laser sensor on the second singulation module. Similarly, if the control system 102 determines that the first item is not within the predefined region, the method proceeds to block 2108. At block 2108, the control system 102 determines the current rate of items exiting the singulation tool.

If, at block 2110, the control system 102 determines that the current rate is equal to the desired rate (or within a threshold range of the desired rate), the method ends. If, at block 2110, the control system 102 determines that the current rate is not equal to the desired rate (or is not within a threshold range of the desired rate), the control system 102 determines if the singulation tool 114 is below the desired rate (or above the desired rate) (block 2112). If the singulation tool is below the desired rate, the control system 102 controls the first and second singulation modules to reduce the distance between the first item and the predefined region (e.g., in order to increase the current rate) (block 2114). If the singulation tool is not below the desired rate (e.g., the singulation tool is above the desired rate), the control system 102 controls the first and second singulation modules to increase the distance between the first item and the predefined region (e.g., in order to reduce the current rate) (block 2116). When controlling the first and second modules, the control system 102 may ensure that the first item and the second item are separated by at least the minimum gap distance (e.g., minimum gap distance 1624) on the first singulation module (e.g., singulation module 130B).

In some cases, different totes may be associated with different types of items. For example, a first tote may include items having a first size (e.g., 50 textbooks), and a second tote may include items having a second size (e.g., 50 giftcards). In such cases, the operating settings (e.g., speed settings) of the different singulation modules 130 within the singulation tool 114 that are used for singulating items from the first tote may not be suitable for singulating items from the second tote. As such, embodiments provide techniques that can configure operating parameters (e.g., speed, gap distance, etc.) of the singulation modules 130 within the singulation tool 114, based on the type of items that enter the singulation tool 114.

Figure 22:
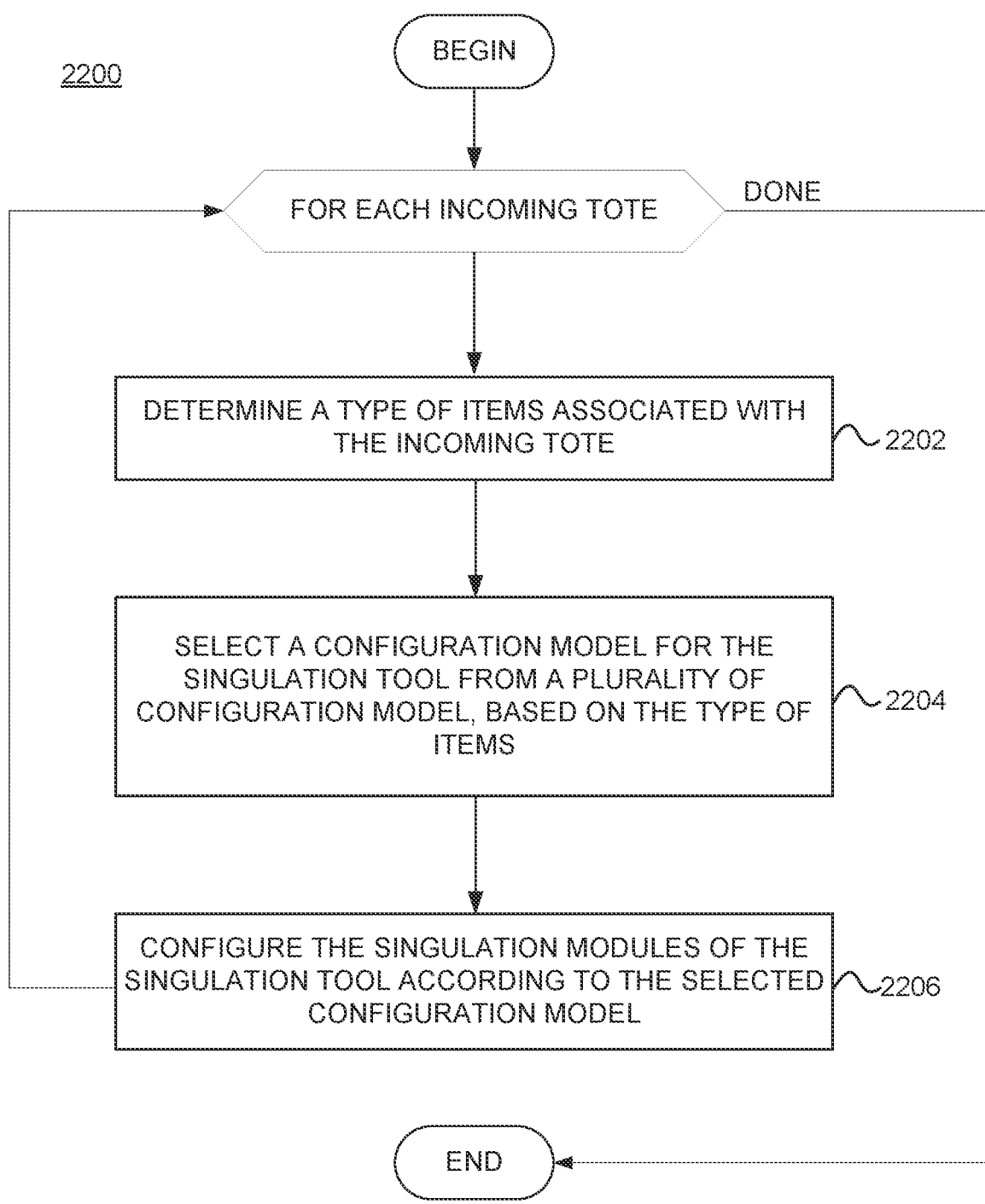
FIG. 22 is a flowchart illustrating a method for configuring singulation modules, according to one embodiment.

FIG. 22 is a flowchart illustrating a method 2100 for configuring singulation modules (e.g., singulation modules 130, such as apparatus 500) based on a type of items, according to one embodiment. The method 2200 may be performed by the control system 102 for each incoming tote.

The method 2200 begins at block 2202, where the control system 102 determines a type of items associated with the incoming tote. In one embodiment, the control system 102 can determine the type of items based on information obtained from a scan of the incoming tote. In one example, the scan may be performed by an operator (e.g., human, machine, etc.) prior to the items being received in the loading area 112.

At block 2204, the control system 102 selects a configuration model for the singulation tool (e.g., singulation tool 114) from a plurality of configuration models, based on the type of items. In one embodiment, the configuration models can be stored in a database, e.g., in the cloud computing service 160. The cloud computing service 160, for example, can use machine learning techniques to continually update the configuration models based on input from other singulation tools 114 (e.g., in the facility). The control system 102 can request the particular configuration model to use for the type of items from the cloud computing service, and receive a response indicating the configuration model. In another embodiment, the configuration model can be selected based on a predefined association between the type of items and a configuration model. In this embodiment, the control system 102 can revert to a default configuration model, e.g., in cases where a predefined association does not exist for a given type of items. At block 2206, the control system 102 configures the singulation modules of the singulation tool according to the selected configuration model.

Figure 23:
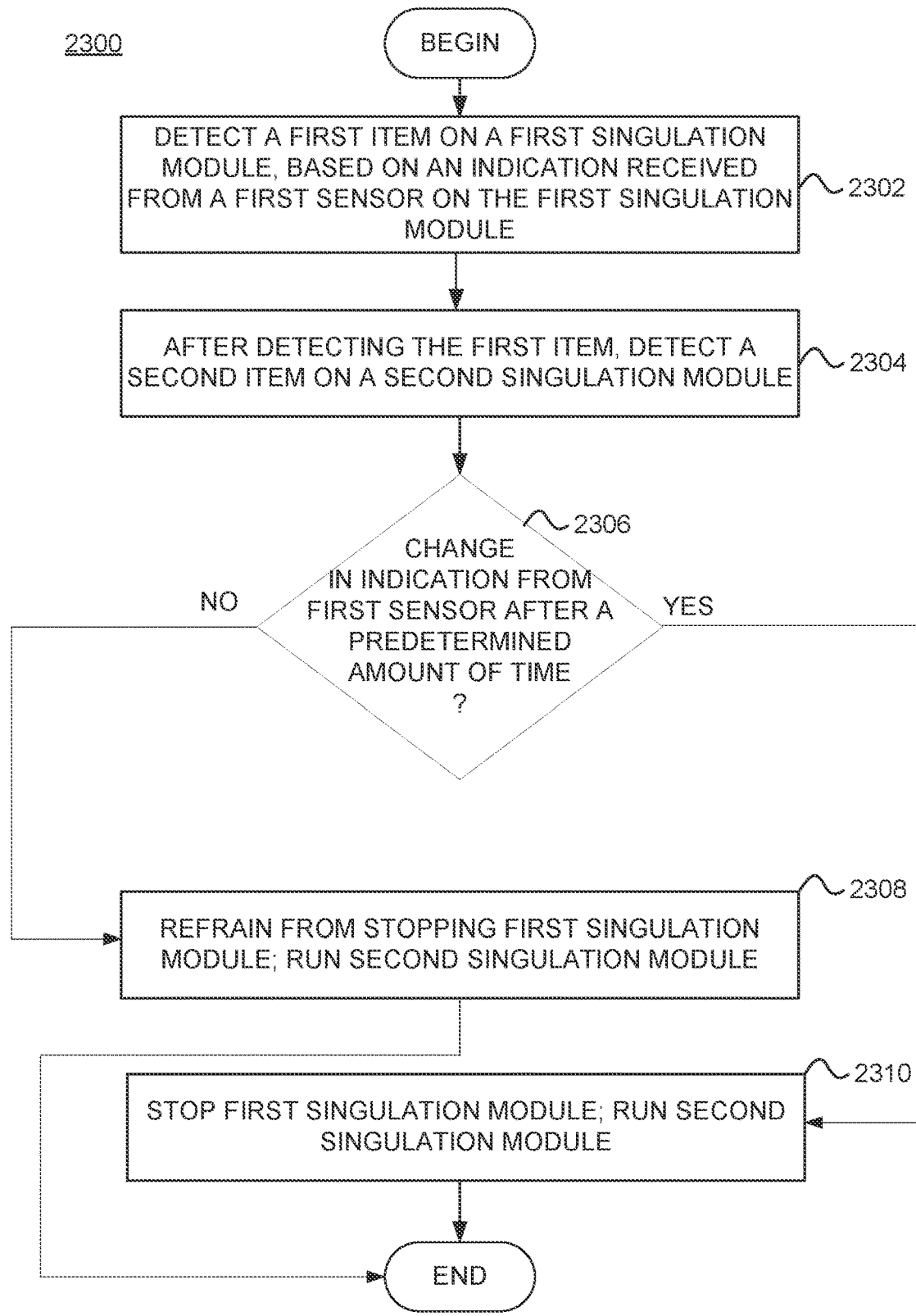
FIG. 23 is a flowchart illustrating a method for controlling singulation modules to prevent jamming conditions, according to one embodiment.

FIG. 23 is a flowchart illustrating a method 2300 for controlling singulation modules (e.g., singulation modules 130, such as apparatus 500) to prevent (or reduce occurrence of) jamming conditions, according to one embodiment. The method 2300 may be performed by the control system 102.

The method 2300 begins at block 2302, where the control system 102 detects a first item (e.g., item 1502) on a first singulation module (e.g., singulation module 130A), based on an indication received from a first sensor on the first singulation module. At block 2304, the control system 102 detects a second item (e.g., item 1502) on a second singulation module (e.g., singulation module 130B) after detecting the first item on the first singulation module. At block 2306, the control system 102 determines if there has been a change in the indication from the first sensor after a predetermined amount of time. If so, the control system 102 stops the first singulation module and runs the second singulation module (block 2310). On the other hand, if there has not been a change, the control system 102 refrains from stopping the first singulation module and runs the second singulation module (block 2308).

Figure 24:
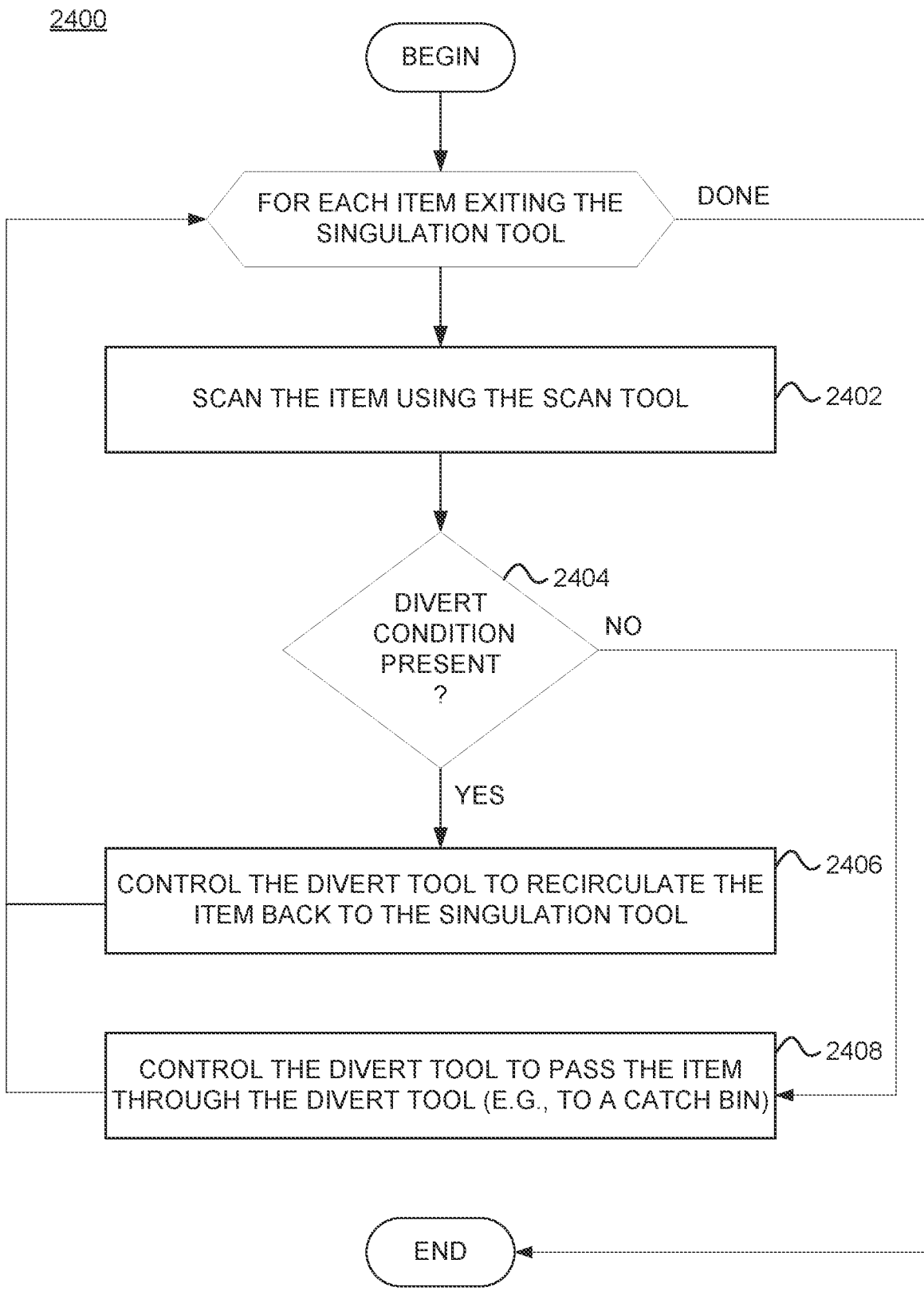
FIG. 24 is a flowchart illustrating a method for recirculating non-singulated items through a singulation tool, according to one embodiment.

FIG. 24 is a flowchart illustrating a method 2400 for recirculating non-singulated items through a singulation tool (e.g., singulation tool 114), according to one embodiment. The method 2400 may be performed by the control system 102.

The method 2400 may be performed for each item exiting the singulation tool. In one embodiment, the control system 102 can receive an indication of each item exiting the singulation tool. In one example, the control system 102 may receive sensor feedback from the last downstream singulation module (e.g., apparatus 500N) indicating presence of an item. In another example, the control system 102 may receive sensor feedback from the scan tool (e.g., scan tool 116) indicating presence of an item.

At block 2402, the control system 102 scans the at least one item, e.g., using the scan tool. At block 2404, the control system 102 determines, based on the scan, if a divert condition is present. The divert condition can include at least one of: (1) detecting multiple valid identifying information (e.g., barcodes) on the item; (2) detecting multiple items within a predetermined time period (or within a specified gap distance); and (3) failure to read identifying information on the item.

In response to detecting a divert condition (block 2404), the control system 102, at block 2406, controls the divert tool (e.g., divert tool 118, such as apparatus 900, apparatus 1000, etc.) to recirculate the item back to the singulation tool 114. For example, in one embodiment, the control system 102 can trigger the divert tool to simultaneously rotate conveyor belts 902 and 904 around their respective hinge points in opposite vertical directions. In this manner, the item can be transitioned from the conveyor belt 902 onto junction segment 122 to be recirculated back through the singulation tool 114.

Figure 10:
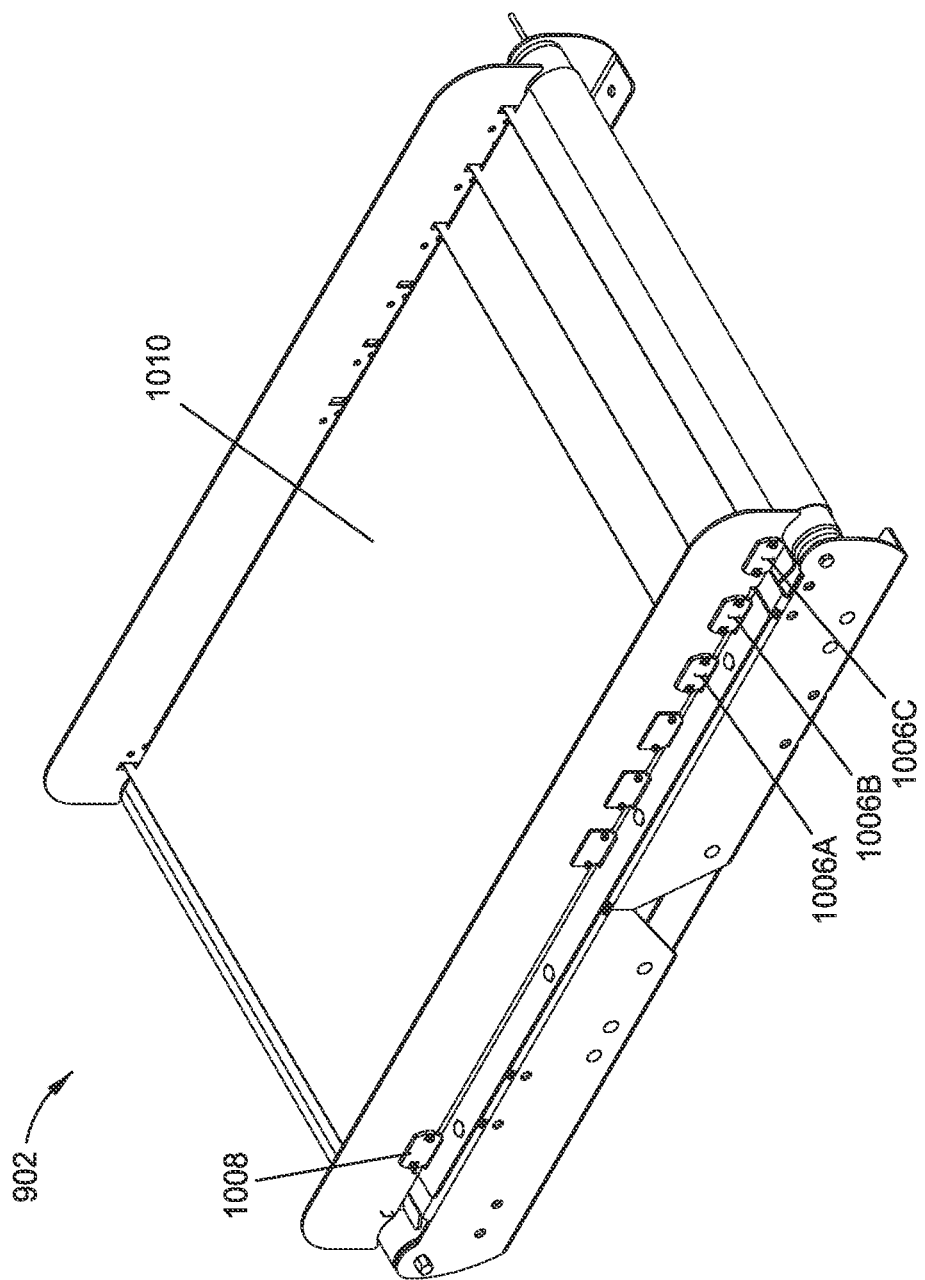
FIG. 10 illustrates a perspective view of an example conveyor belt of a divert tool, according to one embodiment.

If the control system 102 determines that a divert condition is not present, the control system 102, at block 2408, controls the divert tool to pass the item through, e.g., to a catch bin, to another conveyor belt system, etc. In one embodiment, the control system 102 can trigger the divert tool to pass the item through conveyor belts 902 and 904 onto junction segment 120 (e.g., as illustrated in FIG. 10).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
   an apparatus comprising a plurality of conveyors arranged at successively decreasing heights, wherein (i) a first conveyor of the plurality of conveyors is configured to transfer items onto a second conveyor of the plurality of conveyors and (ii) the first conveyor is oriented perpendicularly with respect to the second conveyor; and
   a controller configured to:
      detect a presence of a first item on the first conveyor while a second item is present on the second conveyor;
      in response to detecting the presence of the first item, determine a position of the second item on the second conveyor;
      determine whether the position of the second item is within a predefined region on the second conveyor, wherein the predefined region starts from an end of the second conveyor that is adjacent to the first conveyor;
      determine that the position of the second item is within a minimum gap distance from the predefined region; and
      control the first conveyor and the second conveyor based at least in part on the position of the second item on the second conveyor.

2. The system of claim 1, wherein:
   the second conveyor is configured to transfer the items onto a third conveyor of the plurality of conveyors; and
   the second conveyor is oriented perpendicularly with respect to the third conveyor.

3. The system of claim 2, wherein the controller is further configured to:
   detect a presence of the second item on the second conveyor while a third item is present on the third conveyor;
   in response to detecting the presence of the second item, determine a position of the third item on the third conveyor; and
   control the second conveyor and the third conveyor based at least in part on the position of the third item on the third conveyor.

4. The system of claim 1, wherein the controller is configured to control the first conveyor and the second conveyor by at least one of (i) running the first conveyor or (ii) running the second conveyor, when the controller determines that the position of the second item is outside of the predefined region on the second conveyor.

5. The system of claim 1, wherein the controller is configured to control the first conveyor and the second conveyor by (i) stopping the first conveyor and (ii) running the second conveyor, when the controller determines that the position of the second item is within the predefined region on the second conveyor.

6. The system of claim 1, wherein the controller is configured to control the first conveyor and the second conveyor by increasing a speed of the first conveyor relative to a speed of the second conveyor, when the controller determines that the position of the second item is outside of the predefined region on the second conveyor.

7. The system of claim 1, wherein the predefined region extends for a distance along a length of the second conveyor.

8. The system of claim 7, wherein the distance along the length of the second conveyor is equal to a width of the first conveyor.

9. A computer-implemented method comprising:
   detecting a presence of a first item on a first conveyor of a plurality of conveyors while a second item is present on a second conveyor of a plurality of conveyors, wherein (i) the plurality of conveyors are arranged at successively decreasing heights, (ii) the first conveyor is configured to transfer items onto the second conveyor and (iii) the first conveyor is oriented perpendicularly with respect to the second conveyor;
   in response to detecting the presence of the first item, determining a position of the second item on the second conveyor;
   determining whether the position of the second item is within a predefined region on the second conveyor, wherein the predefined region starts from an end of the second conveyor that is adjacent to the first conveyor;
   determining that the position of the second item is within a minimum gap distance from the predefined region; and
   controlling the first conveyor and the second conveyor based at least in part on the position of the second item on the second conveyor.

10. The computer-implemented method of claim 9, further comprising:
 detecting a presence of the second item on the second conveyor while a third item is present on a third conveyor of the plurality of conveyors, wherein (i) the second conveyor is configured to transfer the items onto the third conveyor and (ii) the second conveyor is oriented perpendicularly with respect to the third conveyor;
 in response to detecting the presence of the second item, determining a position of the third item on the third conveyor; and
 controlling the second conveyor and the third conveyor based at least in part on the position of the third item on the third conveyor.

11. The computer-implemented method of claim 9, wherein controlling the first conveyor and the second conveyor comprises at least one of (i) running the first conveyor or (ii) running the second conveyor, when the position of the second item is outside of the predefined region on the second conveyor.

12. The computer-implemented method of claim 9, wherein controlling the first conveyor and the second conveyor comprises (i) stopping the first conveyor and (ii) running the second conveyor, when the position of the second item is within the predefined region on the second conveyor.

13. The computer-implemented method of claim 9, wherein controlling the first conveyor and the second conveyor comprises increasing a speed of the first conveyor relative to a speed of the second conveyor, when the position of the second item is outside of the predefined region on the second conveyor.

14. The computer-implemented method of claim 9, wherein the predefined region extends for a distance along a length of the second conveyor.

15. The computer-implemented method of claim 14, wherein the distance along the length of the second conveyor is equal to a width of the first conveyor.

16. A non-transitory computer-readable medium storing instructions executable to perform an operation comprising:
 detecting a presence of a first item on a first conveyor of a plurality of conveyors while a second item is present on a second conveyor of a plurality of conveyors, wherein (i) the plurality of conveyors are arranged at successively decreasing heights, (ii) the first conveyor is configured to transfer items onto the second conveyor and (iii) the first conveyor is oriented perpendicularly with respect to the second conveyor;
 in response to detecting the presence of the first item, determining a position of the second item on the second conveyor;
 determining whether the position of the second item is within a predefined region on the second conveyor, wherein the predefined region starts from an end of the second conveyor that is adjacent to the first conveyor;
 determining that the position of the second item is within a minimum gap distance from the predefined region; and
 controlling the first conveyor and the second conveyor based at least in part on the position of the second item on the second conveyor.

17. The non-transitory computer-readable medium of claim 16, wherein controlling the first conveyor and the second conveyor comprises (i) stopping the first conveyor and (ii) running the second conveyor, when the position of the second item is within the predefined region on the second conveyor.

* * * * *